(12) United States Patent
An et al.

(10) Patent No.: US 11,861,125 B2
(45) Date of Patent: Jan. 2, 2024

(54) TRANSPARENT TOUCH DISPLAY DEVICE

(71) Applicant: LG Display Co., Ltd., Seoul (KR)

(72) Inventors: SuChang An, Seoul (KR); JiHyun Jung, Seoul (KR); DeukSu Lee, Seoul (KR); JaeGyun Lee, Seoul (KR); Ruda Rhe, Seoul (KR); Hyangmyoung Gwon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/852,198

(22) Filed: Jun. 28, 2022

(65) Prior Publication Data

US 2023/0004258 A1 Jan. 5, 2023

(30) Foreign Application Priority Data

Jul. 5, 2021 (KR) .................. 10-2021-0087666

(51) Int. Cl.
*G06F 3/044* (2006.01)
(52) U.S. Cl.
CPC .. *G06F 3/0446* (2019.05); *G06F 2203/04111* (2013.01); *G06F 2203/04112* (2013.01)

(58) Field of Classification Search
CPC ..... G06F 3/0446; G06F 3/0448; G06F 3/0412; G06F 2203/04112; G06F 2203/04111
See application file for complete search history.

(56) References Cited

U.S. PATENT DOCUMENTS

2018/0061899 A1* 3/2018 Oh .................. H10K 59/124

* cited by examiner

*Primary Examiner* — Deeprose Subedi
(74) *Attorney, Agent, or Firm* — Seed IP Law Group LLP

(57) ABSTRACT

According to embodiments of the disclosure, a transparent touch display device may comprise a substrate including a display area displaying an image and a non-display area not displaying the image, the display area including a plurality of light emitting areas and a plurality of transmissive areas and a touch sensor including a touch sensor metal disposed while avoiding the plurality of light emitting areas and the plurality of transmissive areas and a transparent electrode disposed in the transmissive areas and electrically connected with the touch sensor metal. The transparent touch display device according to embodiments of the disclosure may provide high transmittance and high touch sensitivity.

31 Claims, 42 Drawing Sheets

TRANSPARENT TOUCH DISPLAY DEVICE

CROSS-REFERENCE TO RELATED APPLICATION

This application claims priority from Korean Patent Application No. 10-2021-0087666, filed on Jul. 5, 2021, which is hereby incorporated by reference for all purposes as if fully set forth herein.

BACKGROUND

Technical Field

Embodiments of the disclosure relate to transparent touch display devices.

Description of Related Art

Nowadays, various types of display devices, such as liquid crystal display devices and organic light emitting display devices, are being developed. Various display technologies and convergence technologies are also being developed to meet various user needs.

For example, there have been gradually under development transparent display devices through which light may be transmitted to allow the background to be seen have gradually for various applications. As another example, in addition to the function of displaying an image or video, touch-based input functions that allow the user to easily and intuitively and conveniently input information or a command have been developed.

BRIEF SUMMARY

To provide touch-based entry in a transparent touch display device, the transparent touch display device may require that touch sensor configurations including touch electrodes and touch routing wires be formed on the panel. However, such touch sensor configurations may degrade the transmittance of the transparent touch display device.

To secure transmittance in the transparent touch display device, a reduction in the area of the touch sensor inevitably ensue, lowering the capacitance for touch sensing and resultantly degrading touch sensitivity. Therefore, a benefit exists for development of a transparent touch display device capable of providing high touch sensitivity as well as high transmittance.

Embodiments of the disclosure may provide a transparent touch display device having high transmittance and high touch sensitivity.

Embodiments of the disclosure may provide a transparent touch display device having a structure capable of increasing the area of the touch sensor without reducing the area of the transmissive areas.

According to embodiments of the disclosure, there may be provided a transparent touch display device, comprising a substrate including a display area displaying an image and a non-display area not displaying the image, the display area including a plurality of light emitting areas and a plurality of transmissive areas, a first pixel electrode disposed in a first light emitting area of a first subpixel among the plurality of light emitting areas, a first light emitting layer on the first pixel electrode, a second pixel electrode disposed in a second light emitting area of a second subpixel positioned in a first direction with respect to the first light emitting area, a second light emitting layer on the second pixel electrode, a first touch sensor metal disposed while avoiding the first light emitting area, a second touch sensor metal disposed while avoiding the second light emitting area, and a transparent electrode disposed in a first transmissive area positioned between the first light emitting area and the second light emitting area and electrically connected with at least one of the first touch sensor metal and the second touch sensor metal.

In the first transmissive area, the touch buffer film may include an opening.

The transparent touch display device may further comprise a common electrode disposed between the first light emitting layer and the encapsulation layer in the first light emitting area and between the second light emitting layer and the encapsulation layer in the second light emitting area.

The common electrode may have an opening in the first transmissive area positioned between the first light emitting area and the second light emitting area.

The transparent touch display device may further comprise a floating metal disposed in the opening of the common electrode and electrically disconnected from the common electrode.

The floating metal may include a same material as the common electrode. A common voltage applied to the common electrode may not be applied to the floating metal.

According to embodiments of the disclosure, there may be provided a transparent touch display device may comprise a substrate including a display area displaying an image and a non-display area not displaying the image, the display area including a plurality of light emitting areas and a plurality of transmissive areas and a touch sensor including a touch sensor metal disposed while avoiding the plurality of light emitting areas and the plurality of transmissive areas and a transparent electrode disposed in the transmissive areas and electrically connected with the touch sensor metal.

According to embodiments of the disclosure, it is possible to provide a transparent touch display device having high transmittance and high touch sensitivity.

According to embodiments of the disclosure, it is possible to provide a transparent touch display device having a structure capable of increasing the area of the touch sensor without reducing the area of the transmissive areas.

According to embodiments of the disclosure, it is possible to enhance touch sensitivity by placing the transparent electrode in the transmissive area to thereby increase the capacitance for touch sensing (e.g., finger capacitance or mutual-capacitance).

According to embodiments of the disclosure, it is possible to increase transmittance by removing the common electrode and insulation film (touch buffer film or touch inter-layer insulation film) from the transmissive area, e.g., by forming an opening in the common electrode and insulation film (touch buffer film or touch inter-layer insulation film) in the transmissive area.

According to embodiments of the disclosure, as the common electrode is removed from the transmissive area, an opening is formed in the common electrode positioned under the transparent electrode in the transmissive area, so that the overlap capacitance between the transparent electrode and the common electrode does not occur in the transmissive area, thereby rendering it possible to reduce parasitic capacitance. Therefore, touch sensitivity may be enhanced.

BRIEF DESCRIPTION OF THE SEVERAL VIEWS OF THE DRAWINGS

The above and other technical benefits, features, and advantages of the present disclosure will be more clearly understood from the following detailed description, taken in conjunction with the accompanying drawings, in which.

DETAILED DESCRIPTION

Figure 1:
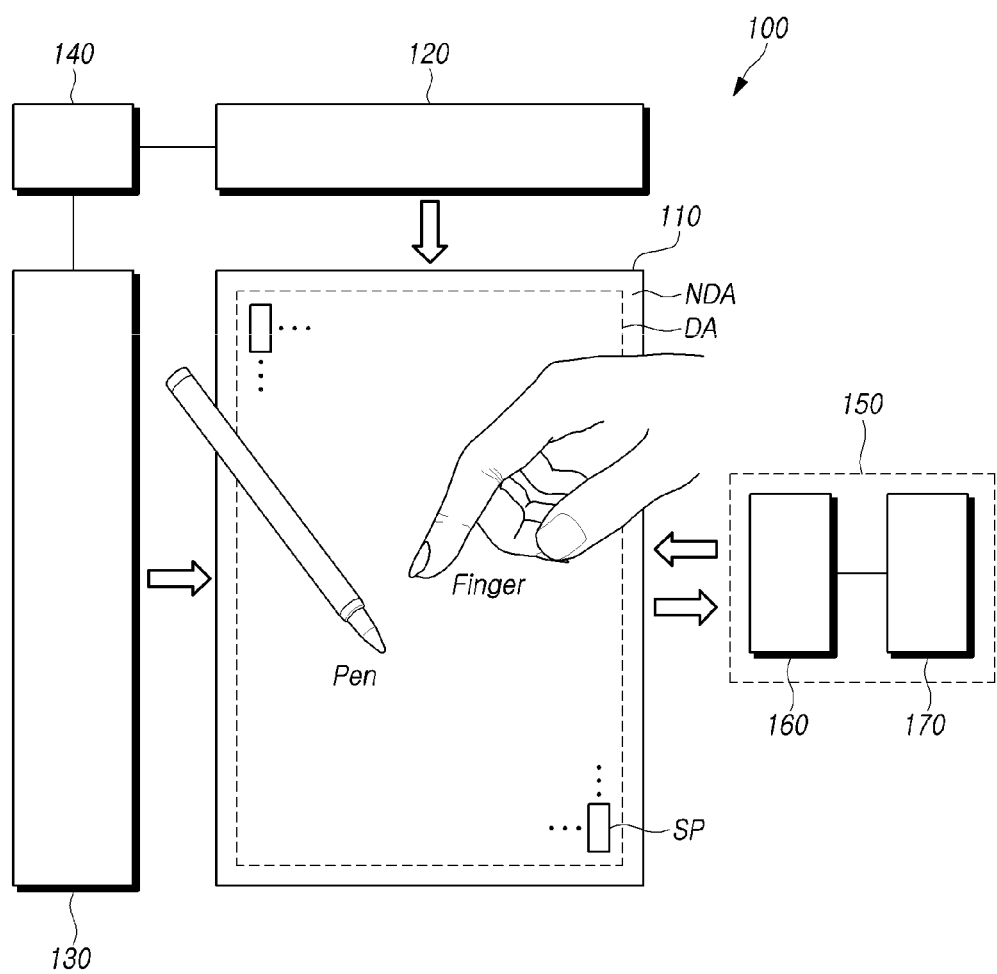
FIG. 1 is a view illustrating a system configuration of a transparent touch display device according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location and thickness of the components illustrated in various drawings submitted herewith are part of the present disclosure.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range (e.g., about 5% to 10%) that may be caused by various factors (e.g., process factors, internal or external impact, noise, etc.) even when a relevant description is not specified. Further, the term "may" fully encompasses all the meanings of the term "can".

Hereinafter, embodiments of the present disclosure are described in detail with reference to the accompanying drawings.

FIG. 1 is a view illustrating a system configuration of a transparent touch display device 100 according to embodiments of the disclosure.

Referring to FIG. 1, a transparent touch display device 100 may include a display panel 110 and display driving circuits for driving the display panel 110, as components for displaying images.

The display driving circuits may include a data driving circuit 120, a gate driving circuit 130, and a display controller 140.

The display panel 110 may include a display area DA in which images are displayed and a non-display area NDA in which no image is displayed. The non-display area NDA may be an outer area of the display area DA and be referred to as a bezel area. The whole or part of the non-display area NDA may be an area visible from the front surface of the transparent touch display device 100 or an area that is bent and not visible from the front surface of the transparent touch display device 100.

The display panel 110 may include a plurality of subpixels SP. The display panel 110 may further include various types of signal lines to drive the plurality of subpixels SP.

The transparent touch display device 100 according to embodiments of the disclosure may be a liquid crystal display device or a self-emission display device in which the display panel 110 emits light by itself. When the transparent touch display device 100 according to the embodiments of the disclosure is a self-emission display device, each of the plurality of subpixels SP may include a light emitting element.

For example, the transparent touch display device 100 according to embodiments of the disclosure may be an organic light emitting diode display in which the light emitting element is implemented as an organic light emitting diode (OLED). As another example, the transparent touch display device 100 according to embodiments of the disclosure may be an inorganic light emitting display device in which the light emitting element is implemented as an inorganic material-based light emitting diode. As another example, the transparent touch display device 100 according to embodiments of the disclosure may be a quantum dot display device in which the light emitting element is implemented as a quantum dot which is self-emission semiconductor crystal.

The structure of each of the plurality of subpixels SP may vary according to the type of the transparent touch display device 100. For example, when the transparent touch display device 100 is a self-emission display device in which the subpixels SP emit light by themselves, each subpixel SP may include a light emitting element that emits light by itself, one or more transistors, and one or more capacitors.

For example, various types of signal lines may include a plurality of data lines transferring data signals (also referred to as data voltages or image signals) and a plurality of gate lines transferring gate signals (also referred to as scan signals).

The plurality of data lines and the plurality of gate lines may cross each other. Each of the plurality of data lines may be disposed while extending in a first direction. Each of the plurality of gate lines may be disposed while extending in a second direction.

Here, the first direction may be a column direction and the second direction may be a row direction. Alternatively, the first direction may be the row direction, and the second direction may be the column direction.

The data driving circuit 120 is a circuit for driving the plurality of data lines and may supply data signals to the plurality of data lines. The gate driving circuit 130 is a circuit for driving the plurality of gate lines and may supply gate signals to the plurality of gate lines. The display controller 140 is a device for controlling the data driving circuit 120 and the gate driving circuit 130 and may control driving timings for the plurality of data lines and driving timings for the plurality of gate lines.

The display controller 140 may supply a data driving control signal to the data driving circuit 120 to control the data driving circuit 120 and may supply a gate driving control signal to the gate driving circuit 130 to control the gate driving circuit 130.

The data driving circuit 120 may supply data signals to the plurality of data lines according to the driving timing control of the display controller 140. The data driving circuit 120 may receive digital image data from the display controller 140 and may convert the received image data into analog data signals and output the analog data signals to the plurality of data lines.

The gate driving circuit 130 may supply gate signals to the plurality of gate lines GL according to the timing control of the display controller 140. The gate driving circuit 130 may receive a first gate voltage corresponding to a turn-on level voltage and a second gate voltage corresponding to a turn-off level voltage, along with various gate driving control signals (e.g., start signal and reset signal), generate gate signals, and supply the generated gate signals to the plurality of gate lines.

For example, the data driving circuit 120 may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110. The gate driving circuit 130 may be disposed on the substrate or may be connected to the substrate. In other words, the gate driving circuit 130 that is of a GIP type may be disposed in the non-display area NDA of the substrate. The gate driving circuit 130 that is of a chip-on-glass (COG) type or chip-on-film (COF) type may be connected to the substrate.

Meanwhile, at least one of the data driving circuit 120 and the gate driving circuit 130 may be disposed in the display area DA of the display panel 110. For example, at least one of the data driving circuit 120 and the gate driving circuit 130 may be disposed not to overlap the subpixels SP or to overlap all or some of the subpixels SP.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The display controller 140 may be implemented as a separate component from the data driving circuit 120, or the display controller 140 and the data driving circuit 120 may be integrated into an integrated circuit (IC).

The display controller 140 may be a timing display controller used in typical display technology, a control device that may perform other control functions as well as the functions of the timing display controller, or a control device other than the timing controller, or may be a circuit in the control device. The display controller 140 may be implemented as various circuits or electronic components, such as an integrated circuit (IC), a field programmable gate array (FPGA), an application specific integrated circuit (ASIC), or a processor.

The display controller 140 may be mounted on a printed circuit board or a flexible printed circuit and may be electrically connected with the data driving circuit 120 and the gate driving circuit 130 through the printed circuit board or the flexible printed circuit.

The display controller 140 may transmit/receive signals to/from the data driving circuit 120 according to one or more predetermined interfaces. The interface may include, e.g., a low voltage differential signaling (LVDS) interface, an EPI interface, and a serial peripheral interface (SP).

To provide a touch sensing function as well as an image display function, the transparent touch display device 100 according to embodiments of the disclosure may include a touch panel and a touch sensing circuit 150 that senses the touch panel to detect whether a touch occurs by a touch object, such as a finger or pen, or the position of the touch.

The touch sensing circuit 150 may include a touch driving circuit 160 that drives and senses the touch panel and generates and outputs touch sensing data and a touch controller 170 that may detect an occurrence of a touch or the position of the touch using touch sensing data.

The touch panel may include a plurality of touch electrodes as touch sensors. The touch panel may further include a plurality of touch routing lines for electrically connecting the plurality of touch electrodes and the touch driving circuit 160. The touch panel or touch electrode is also referred to as a touch sensor.

The touch panel may exist outside or inside the display panel 110. When the touch panel exists outside the display panel 110, the touch panel is referred to as an external type. When the touch panel is of the external type, the touch panel and the display panel 110 may be separately manufactured or may be combined during an assembly process. The external-type touch panel may include a substrate and a plurality of touch electrodes on the substrate. When the touch panel exists inside the display panel 110, the touch panel is referred to as an internal type. When the touch panel is of the internal type, the touch panel may be formed in the display panel 110 during a manufacturing process of the display panel 110.

The touch driving circuit 160 may supply a touch driving signal to at least one of the plurality of touch electrodes and may sense at least one of the plurality of touch electrodes to generate touch sensing data.

The touch sensing circuit 150 may perform touch sensing in a self-capacitance sensing scheme or a mutual-capacitance sensing scheme.

When the touch sensing circuit 150 performs touch sensing in the self-capacitance sensing scheme, the touch sensing circuit 150 may perform touch sensing based on capacitance between each touch electrode and the touch object (e.g., finger or pen).

According to the self-capacitance sensing scheme, each of the plurality of touch electrodes may serve both as a driving touch electrode and as a sensing touch electrode. The touch driving circuit 160 may drive all or some of the plurality of touch electrodes and sense all or some of the plurality of touch electrodes.

When the touch sensing circuit 150 performs touch sensing in the mutual-capacitance sensing scheme, the touch sensing circuit 150 may perform touch sensing based on capacitance between the touch electrodes.

According to the mutual-capacitance sensing scheme, the plurality of touch electrodes are divided into driving touch electrodes and sensing touch electrodes. The touch driving circuit 160 may drive the driving touch electrodes and sense the sensing touch electrodes.

The touch driving circuit 160 and the touch controller 170 included in the touch sensing circuit 150 may be implemented as separate devices or as a single device.

The touch driving circuit 160 and the data driving circuit 120 may be implemented as separate devices or as a single device.

Figure 2A:
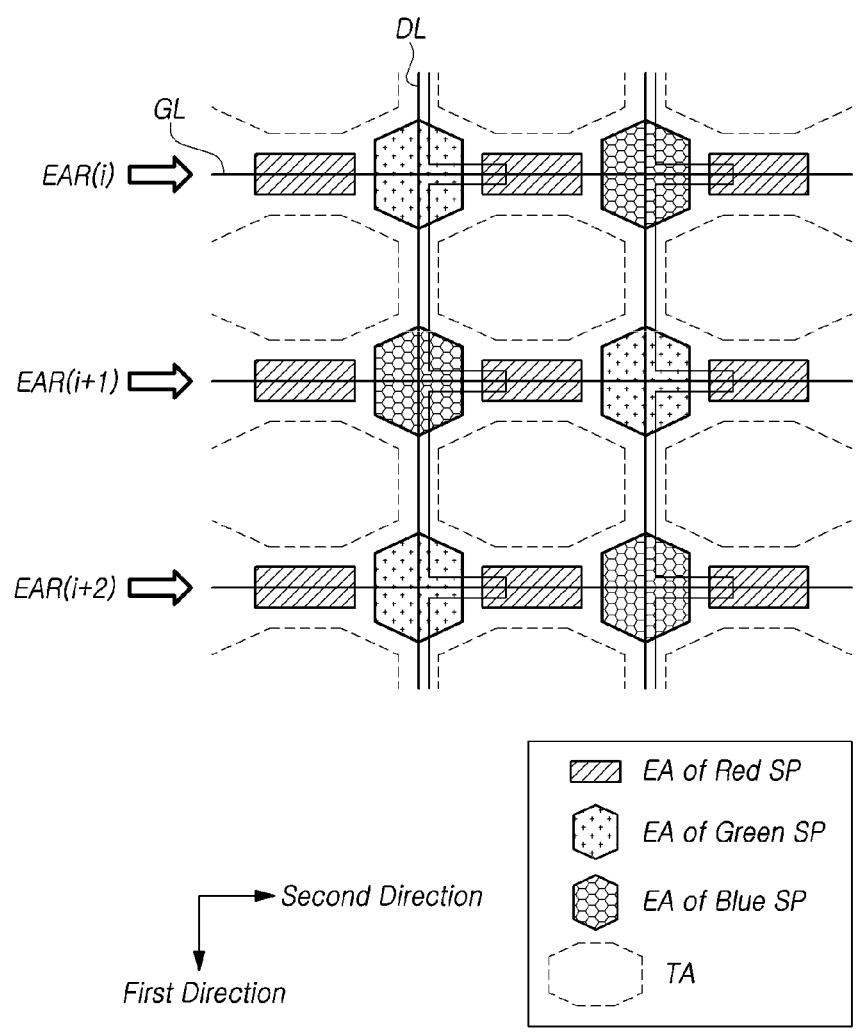
FIGS. 2A, 2B, and 2C are views illustrating examples of an arrangement of light emitting areas and transmissive areas in a transparent touch display device according to embodiments of the disclosure.
Figure 2B:
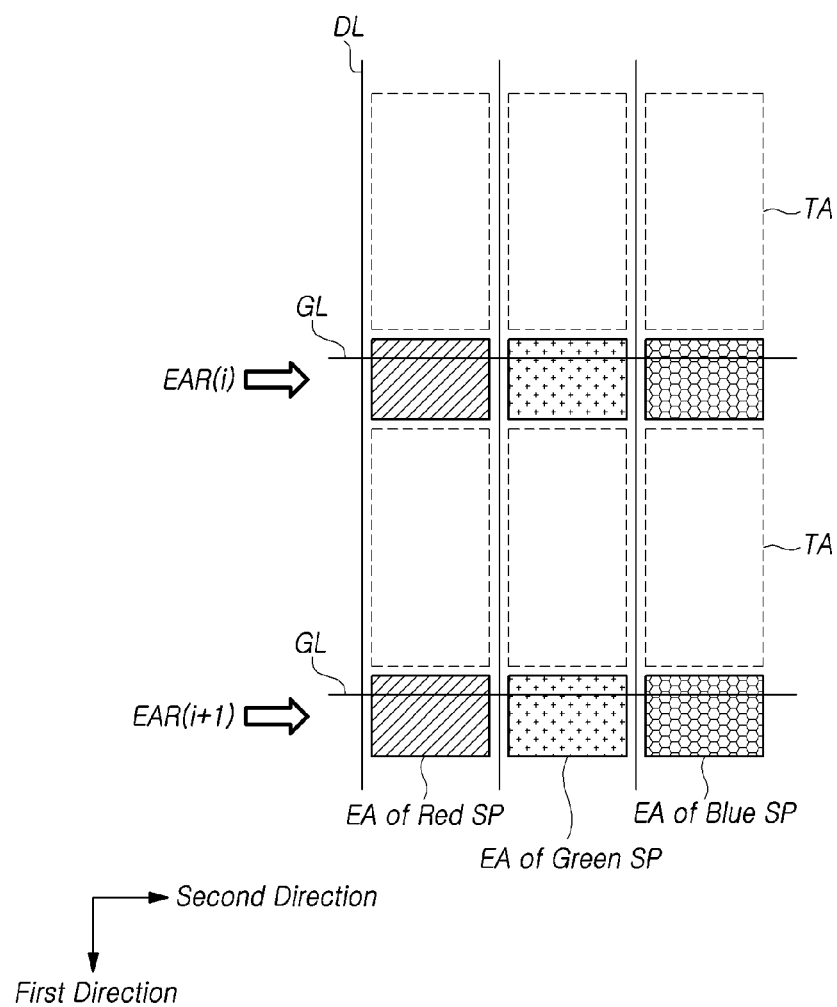
Figure 2C:
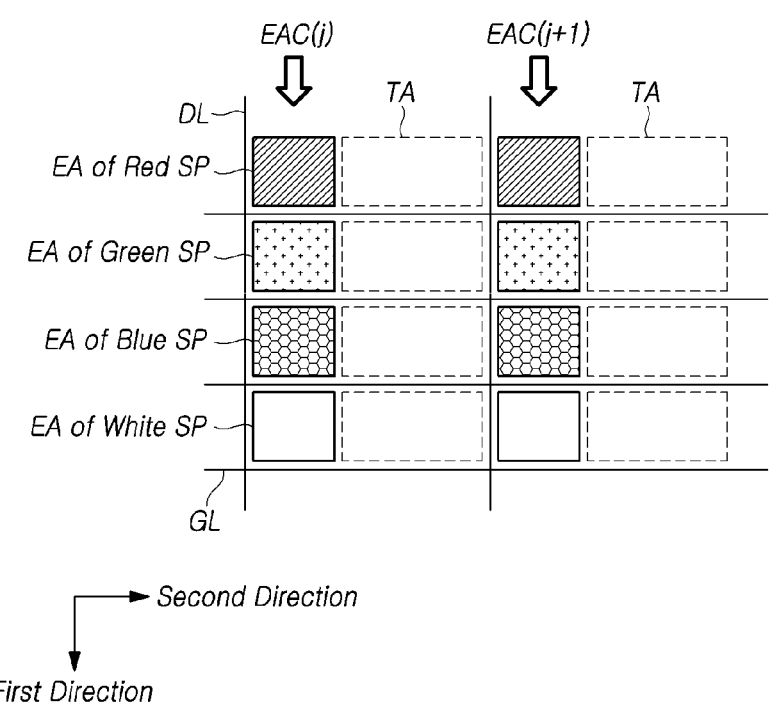

FIGS. 2A, 2B, and 2C are views illustrating examples of an arrangement of light emitting areas EA and transmissive areas TA in a transparent touch display device 100 according to embodiments of the disclosure.

Referring to FIG. 2A, the subpixels SP of the transparent touch display device 100 may include subpixels emitting three colors of light. In other words, the subpixels SP of the transparent touch display device 100 may include a first color subpixel emitting a first color of light, a second color subpixel emitting a second color of light, and a third color subpixel emitting a third color of light.

For example, each of the first color, the second color, and the third color may be one of red, green, and blue. Hereinafter, for convenience of description, it may be assumed that the first color is red, the second color is green or blue, and the third color is blue or green.

The subpixels SP of the transparent touch display device 100 may include subpixels emitting four or more colors of light. In other words, the subpixels SP of the transparent touch display device 100 may include a first color subpixel emitting a first color of light, a second color subpixel emitting a second color of light, a third color subpixel emitting a third color of light, and a fourth color subpixel emitting a fourth color of light.

For example, each of the first color, the second color, the third color, and the fourth color may be one of red, green, blue, and white.

Referring to FIG. 2A, the display panel 110 of the transparent touch display device 100 may include a plurality of light emitting areas EA of subpixels SP and a plurality of transmissive areas TA adjacent to the plurality of light emitting areas EA.

The light emitting area EA of the subpixel SP may correspond to the area where the pixel electrode (or pixel electrode layer) is disposed. The light emitting area EA of the subpixel SP may correspond to an area where the pixel electrode, the light emitting layer, and the common electrode constituting the light emitting element of the subpixel SP overlap.

Based on the light emitting characteristics of the light emitting element ED for each color, the area of the light emitting area EA for each color may be designed in various ways.

The area of the light emitting area EA of the first color subpixel Red SP, the area of the light emitting area EA of the second color subpixel Green SP, and the area of the light emitting area EA of the third color subpixel Blue SP are all the same or similar within a predetermined range.

Alternatively, as shown in FIG. 2A, the area of the light emitting area EA of the first color subpixel Red SP may be smaller than the area of the light emitting area EA of the second color subpixel Green SP and the area of the light emitting area EA of the third color subpixels Blue SP. The area of the light emitting area EA of the second color subpixel Green SP and the area of the light emitting area EA of the third color subpixel Blue SP may be the same or similar within a predetermined range.

Based on the desired transmittance and the area of each light emitting area EA, the area of each transmissive area TA may be determined.

As the ratio of the area of the transmissive areas TA to the area of the emission areas EA increases, the transmittance of the display panel 110 may increase. As the ratio of the area of the transmissive areas TA to the area of the emission areas EA decreases, the transmittance of the display panel 110 may decrease. The transmittance and transmissive area TA described herein may also be referred to as transparency and transparent area.

Each of the transmissive areas TA included in the display panel 110 may be the same. Alternatively, the area of some of the transmissive areas TA included in the display panel 110 may be different from the area of the others.

The light emitting areas EA and the transmissive areas TA may be arranged in various patterns.

Referring to FIG. 2A, the ith light emitting area row EAR(i), the i+1th light emitting area row EAR(i+1), and the i+2th light emitting area row EAR(i+2) may be arranged adjacent to each other in a first direction (e.g., a column direction).

Referring to FIG. 2A, in any ith light emitting area row EAR(i), the light emitting areas EA of the first color subpixels Red SP may be arranged in a second direction (e.g., a row direction). Between the light emitting areas EA of the first color subpixels Red SP, the light emitting area EA of the second color subpixel Green SP and the light emitting area EA of the third color subpixel Blue SP may be alternately arranged.

In the i+1th light emitting area row EAR(i+1), the light emitting areas EA of the first color subpixels Red SP may be arranged in a second direction (e.g., a row direction). Between the light emitting areas EA of the first color subpixels Red SP, the light emitting area EA of the third color subpixel Blue SP and the light emitting area EA of the second color subpixel Green SP may be alternately arranged.

In the i+2th light emitting area row EAR(i+2), the light emitting areas EA of the first color subpixels Red SP may be arranged in the second direction (e.g., the row direction). Between the light emitting areas EA of the first color subpixels Red SP, the light emitting area EA of the second color subpixel Green SP and the light emitting area EA of the third color subpixel Blue SP may be alternately arranged.

Transmissive areas TA may be arranged between light emitting area rows EAR(i), EAR(i+1), and EAR(i+2) adjacent to each other in the first direction (e.g., the column direction). For example, the transmissive areas TA may be arranged between the ith light emitting area row EAR(i) and the i+1th light emitting area row EAR(i+1). The transmissive areas TA may be arranged between the i+1th light emitting area row EAR(i+1) and the i+2th light emitting area row EAR(i+2).

Referring to FIG. 2A, the transmissive area TA disposed between the light emitting areas EA of the first color subpixels Red SP disposed adjacent to each other in the first direction (e.g., the column direction) may extend up to the area between the light emitting area EA of the second color subpixel Green SP and the light emitting area EA of the third color subpixel Blue SP disposed adjacent to each other in the first direction (e.g., the row direction).

Referring to FIG. 2A, data lines DL may be disposed to overlap at least a part of the light emitting areas EA of the second color subpixel Greens SP and at least a part of the light emitting areas EA of the third color subpixels Blue SP.

Each of the data lines DL may be disposed to extend in the first direction (e.g., the column direction). Each of the data lines DL may be disposed while avoiding the transmissive areas TA. Each of the data lines DL may pass between two transmissive areas TA adjacent to each other in the second direction.

Each of the gate lines GL may be disposed to extend in the second direction (e.g., the row direction). The gate lines GL may be disposed to overlap at least a part of the ith light emitting area row EAR(i), the i+1th light emitting area row EAR(i+1), and the i+2th light emitting area row EAR(i+2). Each of the gate lines GL may pass between two transmissive areas TA adjacent to each other in the first direction.

Referring to the example of FIG. 2B, in each light emitting area row EAR(i) and EAR(i+1), the light emitting area EA of the first color subpixel Red SP, the light emitting area EA of the second color subpixel Green SP, and the light emitting area EA of the third color subpixel Blue SP may be arranged adjacent to each other in the second direction (e.g., the row direction).

Referring to the example of FIG. 2B, the transmissive areas TA may be disposed between the light emitting area rows EAR(i) and EAR(i+1) adjacent to each other.

Referring to the example of FIG. 2B, each of the data lines DL may be disposed to extend in the first direction (e.g., the column direction). Each of the data lines DL may be disposed while avoiding the transmissive areas TA. Each of the gate lines GL may be disposed to extend in the second direction (e.g., the row direction). The gate lines GL may be disposed to overlap at least a part of each light emitting area row EAR(i) and EAR(i+1).

Referring to FIG. 2C, in each light emitting area column EAR(j) and EAR(j+1), the light emitting area EA of the first color subpixel Red SP, the light emitting area EA of the second color subpixel Green SP, the light emitting area EA of the third color subpixel Blue SP, and the light emitting area EA of the fourth color subpixel White SP may be arranged adjacent to each other in the first direction (e.g., the column direction).

Referring to the example of FIG. 2C, the transmissive areas TA may be disposed between the two light emitting area columns EAR(j) and EAR(j+1) adjacent to each other in the second direction (e.g., the row direction).

Referring to the example of FIG. 2C, each of the data lines DL may be disposed to extend in the first direction (e.g., the column direction). Each of the data lines DL may be disposed while avoiding the transmissive areas TA. Each of the gate lines GL may be disposed to extend in the second direction (e.g., the row direction). The gate lines GL may be disposed between the light emitting area rows EA Row. The gate lines GL may be disposed between the transmissive areas TA.

Figure 3:
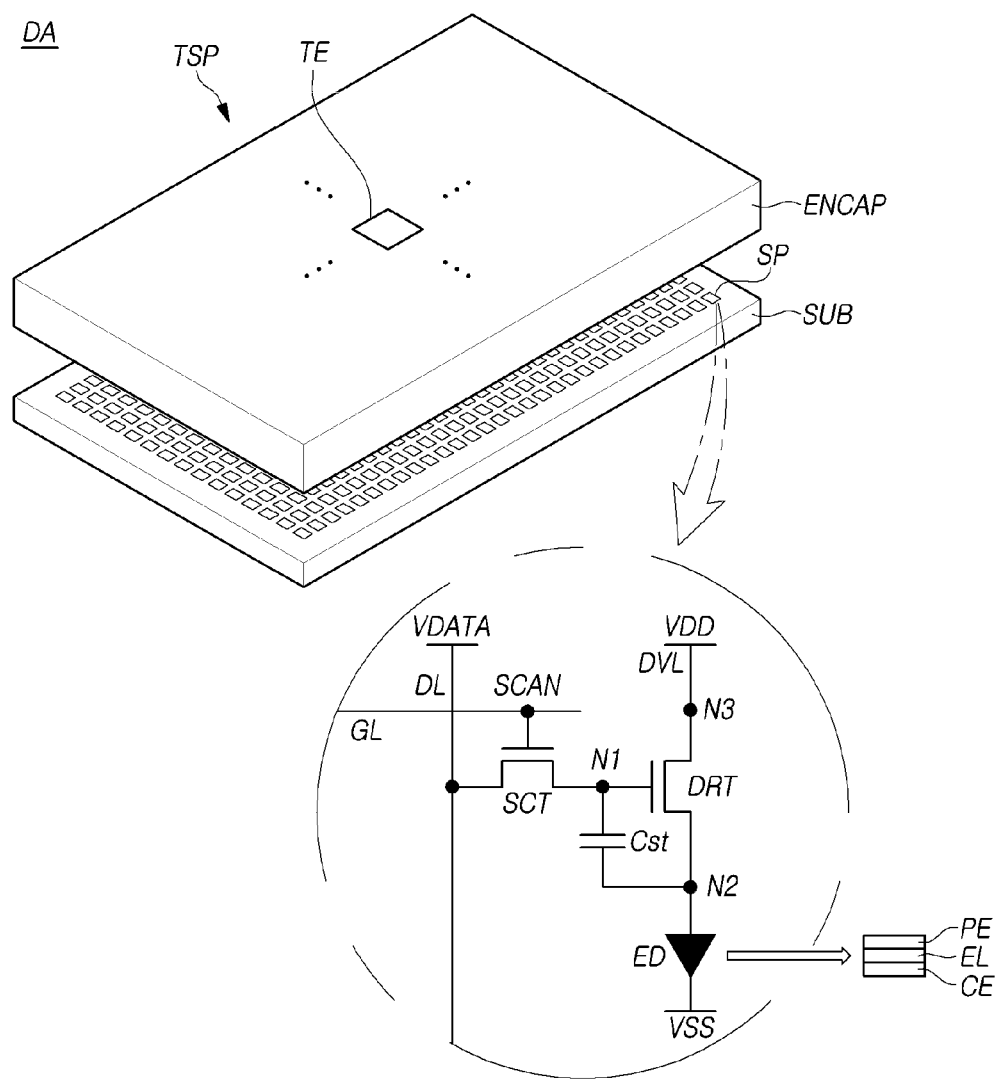
FIG. 3 is a view schematically illustrating a structure of a display panel of a transparent touch display device according to embodiments of the disclosure.

FIG. 3 is a view schematically illustrating a structure of a display panel of a transparent touch display device according to embodiments of the disclosure.

Referring to FIG. 3, the display panel 110 of the transparent touch display device 100 may have a built-in touch panel TSP. In other words, in the transparent touch display device 100, the touch panel TSP may be of a built-in type embedded in the display panel 110. The built-in touch panel TSP is also referred to as an in-cell type or on-cell type touch panel TSP.

Each subpixel SP in the display area DA of the display panel 110 may include a light emitting element ED, a driving transistor DRT for driving the light emitting element ED, a scan transistor SCT for transferring a data voltage VDATA to a first node N1 of the driving transistor DRT, and a storage capacitor Cst for maintaining a constant voltage during one frame.

The driving transistor DRT may include the first node N1 to which the data voltage may be applied, a second node N2 electrically connected with the light emitting element ED, and a third node N3 to which a driving voltage VDD is applied from a driving voltage line DVL. The first node N1 may be a gate node, the second node N2 may be a source node or a drain node, and the third node N3 may be the drain node or the source node.

The light emitting element ED may include a pixel electrode PE (or a pixel electrode layer PE), a light emitting layer EL, and a common electrode CE (or a common electrode layer CE). The pixel electrode PE may be disposed in each subpixel SP and may be electrically connected to the second node N2 of the driving transistor DRT of each subpixel SP. The common electrode CE may be jointly disposed in a plurality of subpixels SP, and a base voltage VSS may be applied to the common electrode CE. For example, the light emitting element ED may be an organic light emitting diode (OLED), an inorganic light emitting diode, or a quantum dot light emitting element. In this case, when the light emitting element ED is an organic light emitting diode, the light emitting layer EL of the light emitting element ED may include an organic light emitting layer including an organic material.

The scan transistor SCT may be on/off controlled by a scan signal SCAN, which is a gate signal, applied via the gate line GL and be electrically connected between the first node N1 of the driving transistor DRT and the data line DL.

The storage capacitor Cst may be electrically connected between the first node N1 and second node N2 of the driving transistor DRT.

Each subpixel SP may have a 2T (transistor) 1C (capacitor) structure which includes two transistors DRT and SCT and one capacitor Cst as shown in FIG. 3 and, in some cases, each subpixel SP may further include one or more transistors or one or more capacitors.

The capacitor Cst may be an external capacitor intentionally designed to be outside the driving transistor DRT, but not a parasite capacitor (e.g., Cgs or Cgd) which is an internal capacitor that may be present between the first node N1 and the second node N2 of the driving transistor DRT.

Each of the driving transistor DRT and the scan transistor SCT may be an n-type transistor or a p-type transistor.

Since the circuit elements (particularly, the light emitting element ED) in each subpixel SP are vulnerable to external moisture or oxygen, an encapsulation layer ENCAP may be disposed on the display panel 110 to prevent penetration of external moisture or oxygen into the circuit elements (particularly, the light emitting element ED).

Meanwhile, in the transparent touch display device 100, the touch panel TSP may be formed on the encapsulation layer ENCAP. In other words, in the transparent touch display device 100, the touch sensor included in the touch panel TSP may be disposed on the encapsulation layer ENCAP. The touch sensor may include a plurality of touch electrodes TE.

Upon touch sensing, a touch driving signal or a touch sensing signal may be applied to at least one of the plurality of touch electrodes TE included in the touch sensor. Accordingly, upon touch sensing, a potential difference may be formed between the touch electrodes TE and the common electrode CE disposed with the encapsulation layer ENCAP interposed therebetween, causing unnecessary parasitic capacitance. The parasitic capacitance may degrade touch sensitivity.

In one embodiment, the distance between the touch electrode TE and the common electrode CE may be designed to be a predetermined value (e.g., 5 μm) or more considering, e.g., panel thickness, panel manufacturing process, and display performance, so as to reduce the parasitic capacitance. To that end, the thickness of the encapsulation layer ENCAP may be at least 5 μm or more, as an example.

Figure 4:
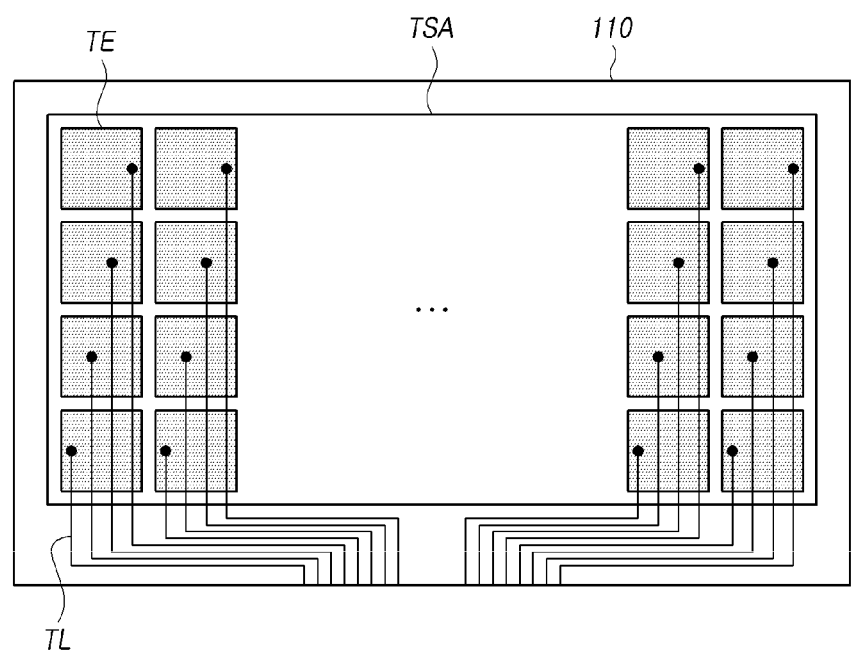
FIG. 4 is a view illustrating an example of a self-capacitance-type touch sensor structure of a transparent touch display device according to embodiments of the disclosure.

FIG. 4 is a view illustrating an example of a self-capacitance-type touch sensor structure of a transparent touch display device 100 according to embodiments of the disclosure.

Referring to FIG. 4, the transparent touch display device 100 according to embodiments of the disclosure may include a touch sensor in the touch sensing area TSA of the display panel 110. The touch sensor may include a plurality of touch electrodes TE, X-TE, and Y-TE.

Referring to FIG. 4, the transparent touch display device 100 according to embodiments of the disclosure may include a self-capacitance type touch sensor to sense a touch based on self-capacitance.

Referring to FIG. 4, the self-capacitance type touch sensor may include a plurality of touch electrodes TE separated from each other and disposed in the touch sensing area TSA.

Referring to FIG. 4, the self-capacitance type touch sensor may further include a plurality of touch routing lines TL for electrically connecting each of the plurality of touch electrodes TE to the touch driving circuit 160.

Referring to FIG. 4, In the self-capacitance type touch sensor, the plurality of touch electrodes TE does not electrically cross each other. In the self-capacitance type touch sensor, each of the plurality of touch electrodes TE may be one touch node corresponding to touch coordinates.

Referring to FIG. 4, when sensing a touch based on self-capacitance, the touch driving circuit 160 may supply a touch driving signal to at least one of the plurality of touch electrodes TE and may sense the touch electrode TE to which the touch driving signal is supplied.

The sensing value for the touch electrode TE to which the touch driving signal is supplied is a value corresponding to capacitance or a change in capacitance in the touch electrode TE to which the touch driving signal is supplied. The capacitance in the touch electrode TE to which the touch driving signal is supplied may be a capacitance between the touch electrode TE to which the touch driving signal is supplied and a touch object, such as a finger.

Figure 5A:
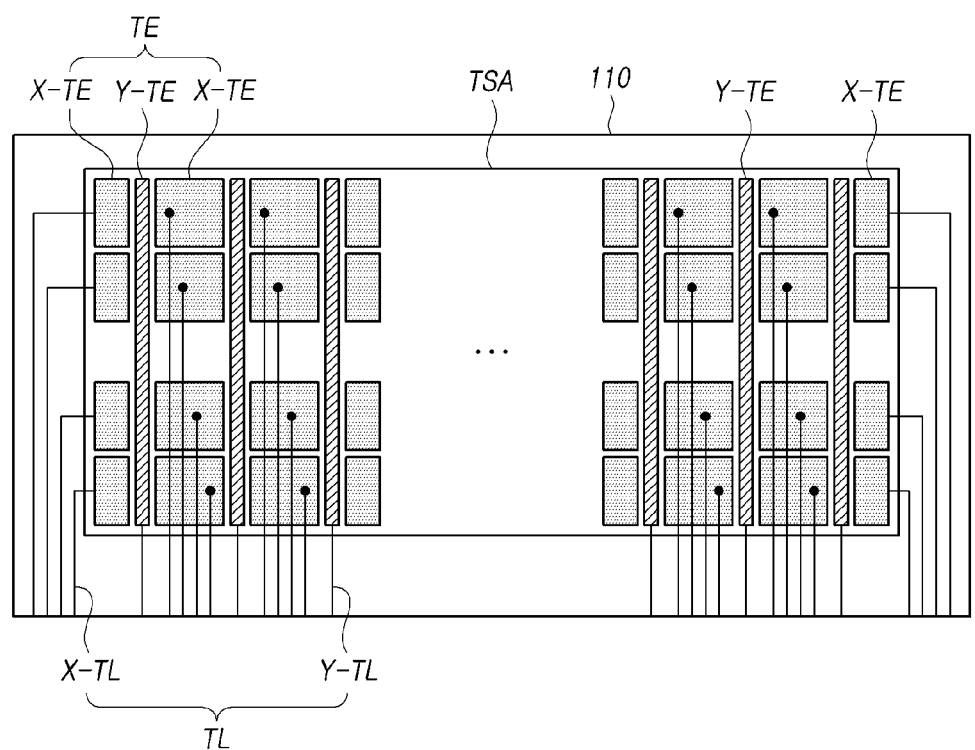
FIG. 5A is a view illustrating an example of a mutual-capacitance-type touch sensor structure of a transparent touch display device according to embodiments of the disclosure.

FIG. 5A is a view illustrating an example of a mutual-capacitance-type touch sensor structure of a transparent touch display device 100 according to embodiments of the disclosure.

Referring to FIG. 5A, the mutual-capacitance type touch sensor may include a plurality of first touch electrode lines and a plurality of second touch electrode lines.

Referring to FIG. 5A, each of the plurality of first touch electrode lines may include a plurality of touch electrodes X-TE disposed in the same row and electrically connected to each other. Each of the plurality of second touch electrode lines may be a touch electrode Y-TE disposed in one column.

Alternatively, each of the plurality of first touch electrode lines may be one touch electrode X-TE disposed in one row. Alternatively, each of the plurality of second touch electrode lines may include a plurality of touch electrodes Y-TE disposed in the same column and electrically connected to each other.

The touch electrodes X-TE included in each of the plurality of first touch electrode lines and electrically connected may be electrically connected within the display panel 110.

In a different scheme, the touch electrodes X-TE included in each of the plurality of first touch electrode lines and electrically connected may be electrically separated in the display panel 110 and may be electrically connected inside the touch driving circuit 160.

The plurality of first touch electrode lines may be disposed in different rows and may be electrically separated from each other. The plurality of second touch electrode lines may be disposed in different columns and may be electrically separated from each other.

The plurality of first touch electrode lines and the plurality of second touch electrode lines may cross and overlap each other. Accordingly, the plurality of first touch electrode lines and the plurality of second touch electrode lines may correspond to each other to form capacitances (mutual-capacitances).

Referring to FIG. 5A, the mutual-capacitance type touch sensor may include a plurality of touch routing lines TL, X-TL, and Y-TL for electrically connecting each of the plurality of touch electrodes TE, X-TE, and Y-TE to the touch driving circuit 160.

Referring to FIG. 5A, in the mutual-capacitance type touch sensor, points where a plurality of first touch electrode lines and a plurality of second touch electrode lines overlap may be touch nodes corresponding to touch coordinates.

Referring to FIG. 5A, upon sensing a touch based on mutual-capacitance, the touch driving circuit 160 may supply a touch driving signal to at least one of the plurality of first touch electrode lines and sense each of the plurality of second touch electrode lines.

In this case, the plurality of first touch electrode lines may be driving touch electrode lines (also referred to as transmitting touch electrode lines), and the plurality of second touch electrode lines may be sensing touch electrode lines (also referred to as receiving touch electrode lines).

The sensing value sensed by the touch driving circuit 160 through each of the second touch electrode lines is a value corresponding to a capacitance or a change in capacitance between the first and second touch electrode lines.

Alternatively, upon sensing a touch based on mutual-capacitance, the touch driving circuit 160 may supply a touch driving signal to at least one of the plurality of second touch electrode lines and sense each of the plurality of first touch electrode lines.

In this case, the plurality of second touch electrode lines may be driving touch electrode lines (also referred to as transmitting touch electrode lines), and the plurality of first touch electrode lines may be sensing touch electrode lines (also referred to as receiving touch electrode lines).

The sensing value sensed by the touch driving circuit 160 through each of the first touch electrode lines is a value corresponding to a capacitance (mutual-capacitance) or a change in capacitance between the first and second touch electrode lines.

Figure 5B:
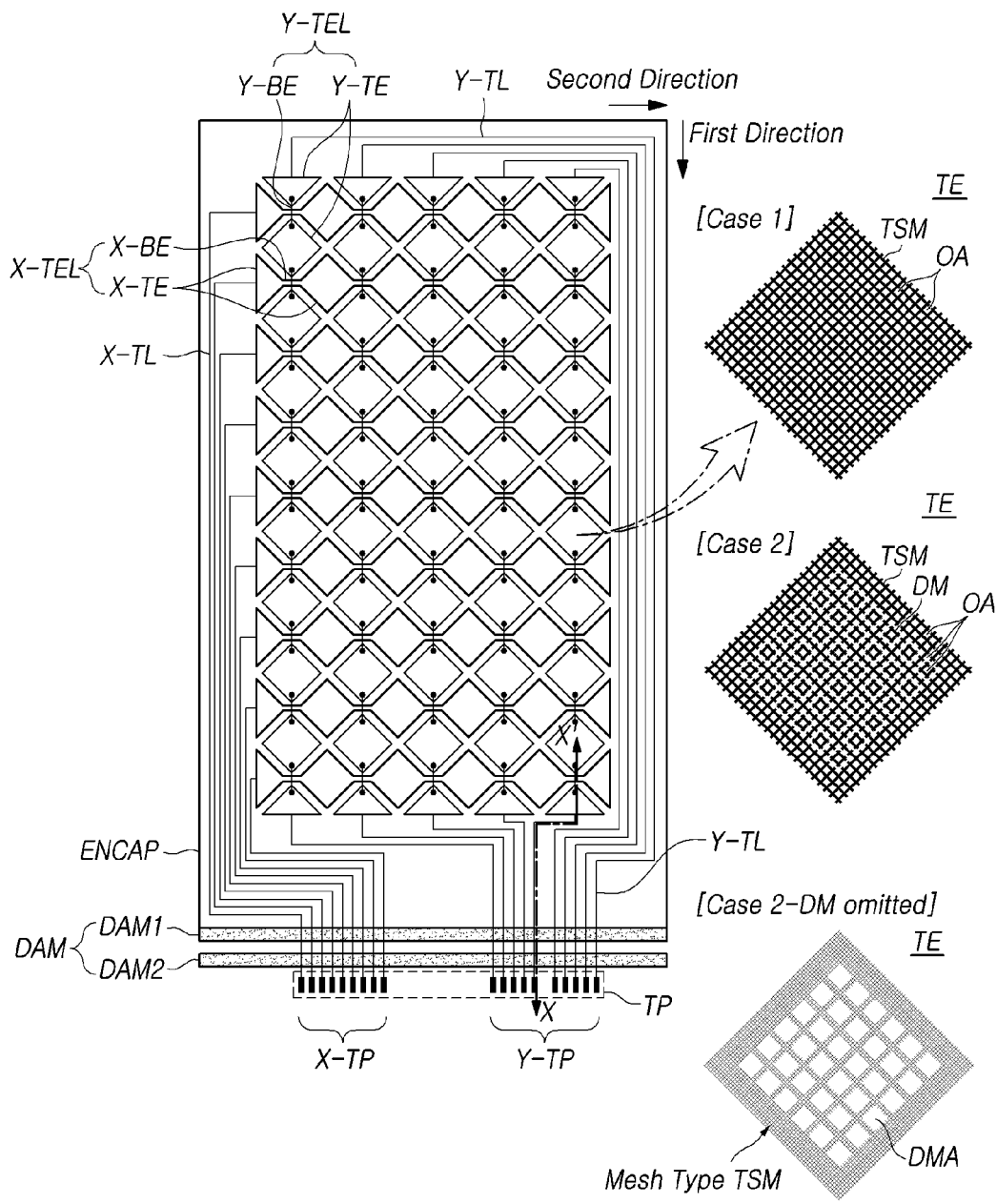
FIG. 5B is a view illustrating another example of a mutual-capacitance-type touch sensor structure of a transparent touch display device according to embodiments of the disclosure.

FIG. 5B is a plan view illustrating a display panel 110 of a transparent touch display device 100 according to embodiments of the disclosure.

Referring to FIG. 5B, when the transparent touch display device 100 performs touch sensing based on mutual capacitance, the touch sensor structure of the transparent touch display device 100 may include a plurality of first touch electrode lines X-TEL and a plurality of second touch electrode lines Y-TEL. Here, the plurality of first touch electrode lines X-TEL and the plurality of second touch electrode lines Y-TEL may be positioned on the encapsulation layer ENCAP.

The plurality of first touch electrode lines X-TEL and the plurality of second touch electrode lines Y-TEL may cross each other. Each of the plurality of second touch electrode lines Y-TEL may be disposed in the first direction (e.g., the column direction). Each of the plurality of first touch electrode lines X-TEL may be disposed in the second direction (e.g., the row direction) different from the first direction.

In the disclosure, the first direction and the second direction may be relatively different from each other. For example, the first direction may be a y-axis direction (column direction), and the second direction may be an x-axis direction (row direction). Conversely, the first direction may be the x-axis direction (row direction) and the second direction may be the y-axis direction (column direction). The first direction and the second direction may be, or may not be, perpendicular to each other.

In the disclosure, row and column are relative terms, and from a point of view, the terms "row" and "column" may be interchangeably used. The first direction may be a direction parallel to a direction in which the data line DL is disposed, and the second direction may be a direction parallel to a direction in which the gate line GL is disposed.

According to the example of the structure of the touch sensor of FIG. 5B, each of the plurality of first touch electrode lines X-TEL may include a plurality of touch electrodes X-TE electrically connected to each other, and each of the plurality of second touch electrode lines Y-TEL may include a plurality of touch electrodes Y-TE electrically connected to each other.

The plurality of first touch electrode lines X-TEL and the plurality of second touch electrode lines Y-TEL, respectively, may play different roles.

The plurality of first touch electrode lines X-TEL may be driving touch electrode lines driven by allowing a touch driving signal to be applied thereto by the touch driving circuit 160, and the plurality of second touch electrode lines Y-TEL may be sensing touch electrode lines sensed by the touch driving circuit 160.

In this case, the plurality of touch electrodes X-TE constituting each of the plurality of first touch electrode lines X-TEL may be driving touch electrodes, and the plurality of touch electrodes Y-TE constituting each of the plurality of second touch electrode lines Y-TEL may be sensing touch electrodes.

Conversely, the plurality of first touch electrode lines X-TEL may be sensing touch electrode lines sensed by the touch driving circuit 160, and the plurality of second touch electrode lines Y-TEL may be driving touch electrode lines driven by allowing a touch driving signal to be applied thereto by the touch driving circuit 160.

In this case, the plurality of touch electrodes X-TE constituting each of the plurality of first touch electrode lines X-TEL may be sensing touch electrodes, and the plurality of touch electrodes Y-TE constituting each of the plurality of second touch electrode lines Y-TEL may be driving touch electrodes.

The touch sensor may include a plurality of touch routing lines X-TL and Y-TL in addition to the plurality of first touch electrode lines X-TEL and the plurality of second touch electrode lines Y-TEL.

The plurality of touch routing lines X-TL and Y-TL may include one or more first touch routing lines X-TL connected to each of the plurality of first touch electrode lines X-TEL, and one or more second touch routing lines Y-TL connected to each of the plurality of second touch electrode lines Y-TEL.

Referring to FIG. 5B, each of the plurality of first touch electrode lines X-TEL may include a plurality of touch electrodes X-TE disposed in the same row (or column) and electrically connected and first touch bridge electrodes X-BE electrically connecting touch electrodes X-TE adjacent to each other in the second direction.

As shown in FIG. 5B, the first touch bridge electrode X-BE connecting the two adjacent touch electrodes X-TE may be a metal integrated with the two adjacent touch electrodes X-TE. Alternatively, the first touch bridge electrode X-BE connecting the two adjacent touch electrodes X-TE may be positioned on a different layer from the two adjacent touch electrodes X-TE and may be electrically connected to the two adjacent touch electrodes X-TE through a contact hole.

Referring to FIG. 5B, each of the plurality of second touch electrode lines Y-TEL may include a plurality of touch electrodes Y-TE disposed in the same column (or row) and electrically connected and second touch bridge electrodes Y-BE electrically connecting two touch electrodes Y-TE adjacent to each other in the first direction.

As shown in FIG. 5B, the second touch bridge electrode Y-BE connecting the two adjacent touch electrodes Y-TE may be positioned on a different layer from the two adjacent touch electrodes Y-TE and may be electrically connected to the two adjacent touch electrodes Y-TE through a contact hole. Alternatively, the second touch bridge electrode Y-BE connecting the two adjacent touch electrodes Y-TE may be a metal integrated with the two adjacent touch electrodes Y-TE.

In an area where the first touch electrode line X-TEL and the second touch electrode line Y-TEL cross each other (touch electrode line crossing area), the first touch bridge electrode X-BE and the second touch bridge electrode Y-BE may cross each other. In the touch electrode line crossing area, when the first touch bridge electrode X-BE and the second touch bridge electrode Y-BE cross each other, the first touch bridge electrode X-BE and the second touch bridge electrode Y-BE may be positioned on different layers.

Accordingly, to arrange the plurality of first touch electrode lines X-TEL and the plurality of second touch electrode lines Y-TEL to cross each other, the plurality of touch electrodes X-TE, the plurality of first touch bridge electrodes X-BE, the plurality of touch electrodes Y-TE, the plurality of second touch electrode lines Y-TEL, and the plurality of second touch bridge electrodes Y-BE may be positioned on two or more layers.

Referring to FIG. 5B, each of the plurality of first touch electrode lines X-TEL may be electrically connected to a corresponding first touch pad X-TP in the touch pad unit TP (or touch pad circuit TP) through one or more first touch routing lines X-TL. Each of the plurality of second touch electrode lines Y-TEL may be electrically connected to a corresponding second touch pad Y-TP in the touch pad unit TP through one or more second touch routing lines Y-TL.

The touch sensor may include a plurality of touch electrodes X-TE constituting each of the plurality of first touch electrode lines X-TEL and a plurality of touch electrodes Y-TE constituting each of the plurality of second touch electrode lines Y-TEL and may further include a plurality of first touch bridge electrodes X-BE and a plurality of second touch bridge electrodes Y-BE and may further include a plurality of first touch routing lines X-TL and a plurality of second touch routing lines Y-TL.

Some of the components constituting the touch sensor may include a touch sensor metal TSM, and others thereof may include a touch bridge metal. The touch sensor metal TSM and the touch bridge metal may be metals positioned on different layers.

For example, the plurality of touch electrodes X-TE configuring each of the plurality of first touch electrode lines X-TEL and the plurality of touch electrodes configuring each of the plurality of second touch electrode lines Y-TEL may include the touch sensor metal TSM.

For example, either (e.g., first touch bridge electrodes X-BE) the plurality of first touch bridge electrodes X-BE or the plurality of second touch bridge electrodes Y-BE may include the touch sensor metal TSM, and the others (e.g., the second touch bridge electrodes Y-BE) may include the touch bridge metal positioned on a different layer from the touch sensor metal TSM.

For example, both of the plurality of first touch routing lines X-TL and the plurality of second touch routing lines Y-TL may include the touch sensor metal TSM. Alternatively, both of the plurality of first touch routing lines X-TL and the plurality of second touch routing lines Y-TL may include the touch bridge metal. Alternatively, either the plurality of first touch routing lines X-TL or the plurality of second touch routing lines Y-TL may include the touch sensor metal TSM, and the others may include the touch bridge metal.

As shown in FIG. 5B, the plurality of touch electrodes X-TE and the plurality of first touch bridge electrodes X-BE constituting the plurality of first touch electrode lines X-TEL may be disposed on the encapsulation layer ENCAP positioned on the common electrode CE. The plurality of touch electrodes Y-TE and the plurality of second touch bridge electrodes Y-BE constituting the plurality of second touch electrode lines Y-TEL may be disposed on the encapsulation layer ENCAP.

As shown in FIG. 5B, each of the plurality of first touch routing lines X-TL electrically connected to the plurality of first touch electrode lines X-TEL may be disposed on the encapsulation layer ENCAP while extending up to where the encapsulation layer ENCAP is not present and may be electrically connected to the plurality of first touch pads X-TP. Each of the plurality of second touch routing lines Y-TL electrically connected to the plurality of second touch electrode lines Y-TEL may be disposed on the encapsulation layer ENCAP while extending up to where the encapsulation layer ENCAP is not present and be electrically connected to the plurality of second touch pads Y-TP. The encapsulation layer ENCAP may be positioned in the display area DA and, in some cases, may extend up to the non-display area NDA.

As described above, to prevent any layer (e.g., the encapsulation layer in the OLED panel) in the display area DA from collapsing, a dam portion DAM may be present in the border area between the display area DA and the non-display area NDA or in the non-display area NDA which is positioned around the display area DA. In other words, the dam portion DAM may be positioned near the outermost end of the encapsulation layer ENCAP.

The dam portion DAM may include one or more dams DAM1 and DAM2. For example, as shown in FIG. 5B, the dam portion DAM may include a primary dam DAM1 and a secondary dam DAM2. The secondary dam DAM2 may be a dam positioned further outside the primary dam DAM1. Unlike in the example shown in FIG. 5B, the dam portion DAM may include only the primary dam DAM1 or, in some cases, the dam portion DAM may include one or more additional dams as well as the primary dam DAM1 and the secondary dam DAM2.

Referring to FIG. 5B, the encapsulation layer ENCAP may be positioned on the inner side of the dam portion DAM. Alternatively, the encapsulation layer ENCAP may be positioned on the inner side of the dam portion DAM and may be positioned to extend to the upper portion and/or lower portion of the dam portion DAM. The encapsulation layer ENCAP may be further extended to be positioned on the outer side of the dam portion DAM.

In the display panel 110 of the transparent touch display device 100, each of the touch electrodes TE, X-TE, and Y-TE may be a plate-shaped touch sensor metal TSM without an opening. In this case, each touch electrode TE may be a transparent electrode. In other words, each touch electrode TE may be formed of a transparent electrode material to allow the light emitted from the plurality of subpixel SPs disposed thereunder to be transmitted upwards.

Alternatively, as shown in FIG. 5B, each touch electrode TE disposed in the display panel 110 may be of a mesh type as in case 1. To that end, each touch electrode TE may be formed of a touch sensor metal TSM patterned in a mesh type and having a plurality of openings OA. The touch sensor metal TSM of each touch electrode TE is a portion substantially corresponding to the touch electrode TE and may be a portion to which a touch driving signal is applied or a portion where a touch sensing signal is detected. The touch sensor metal TSM corresponding to each touch electrode TE may be positioned on a bank which is disposed in an area other than the light emitting areas EA of the subpixels SP.

As shown in FIG. 5B, when each touch electrode TE is a touch sensor metal TSM patterned in a mesh type as in case 2, the area where the touch electrode TE is formed may have a plurality of openings OA. Each of the plurality of openings OA present in each touch electrode TE may correspond to the light emitting areas EA of one or more subpixels SP or one or more transmissive areas TA. In other words, the plurality of openings OA may serve as a path along which the light emitted from the plurality of subpixels SP disposed thereunder passes upward to thereby create the light emitting area EA or may serve as a light transmissive area to thereby create the transmissive area TA.

For example, the contour of the touch electrode TE may be shaped as a diamond or rhombus or may come in other various shapes, such as a triangle, pentagon, or hexagon. Each of the plurality of openings OA may have various shapes depending on the shape of the touch electrode TE or the mesh shape of the touch sensor metal TSM.

Referring to FIG. 5B, as in case 2, in the area of each touch electrode TE, one or more dummy metals DM disconnected from the mesh-type touch sensor metal TSM may be present. The dummy metal DM may be positioned to be surrounded by the touch sensor metal TSM, within the area of the touch electrode TE. Unlike the touch sensor metal TSM, the dummy metal DM is a portion to which a touch driving signal is not applied nor is a touch sensing signal detected, and may be a floating metal. Although the touch sensor metal TSM is electrically connected with the touch driving circuit 160, the dummy metal DM is not electrically connected with the touch driving circuit 160.

In the area of each of all the touch electrodes TE, one or more dummy metals DM may be present, with them disconnected from the touch sensor metal TSM. Unlike this, one or more dummy metals D may be present while being disconnected from the touch sensor metal TSM, only in the area of each of some of the touch electrodes TE, and no dummy metal DM may be present in the area of others of the touch electrodes TE.

In relation to the role of the dummy metal DM, in the case where one or more dummy metals DM are absent and only the touch sensor metal TSM is present in a mesh type in the area of the touch electrode TE, a visibility issue may arise in which the contour of the touch sensor metal TSM is shown on the screen. In contrast, where one or more dummy metals DM are present in the area of the touch electrode TE as shown in FIG. 5B, the visibility issue that the contour of the touch sensor metal TSM is shown on the screen may be prevented.

The magnitude of capacitance may be adjusted per touch electrode TE by adjusting the presence or absence of dummy metal DM or the number (dummy metal ratio) of dummy metals DM per touch electrode TE, thereby enhancing touch sensitivity.

The touch sensor metal TSM formed in the area of one touch electrode TE may be cut (or etched out) at some spots and may thus be formed as the dummy metal DM. In other words, the touch sensor metal TSM and the dummy metal DM may be formed of the same material on the same layer.

Referring to FIG. 5B, in case 2, if only the touch sensor metal TSM is shown with the plurality of dummy metals DM omitted from the area of one touch electrode TE, a plurality of dummy areas DMA may be present in the area where the touch sensor metal TSM is disposed. The plurality of dummy areas DMA are areas corresponding to the plurality of dummy metals DM.

Figure 6:
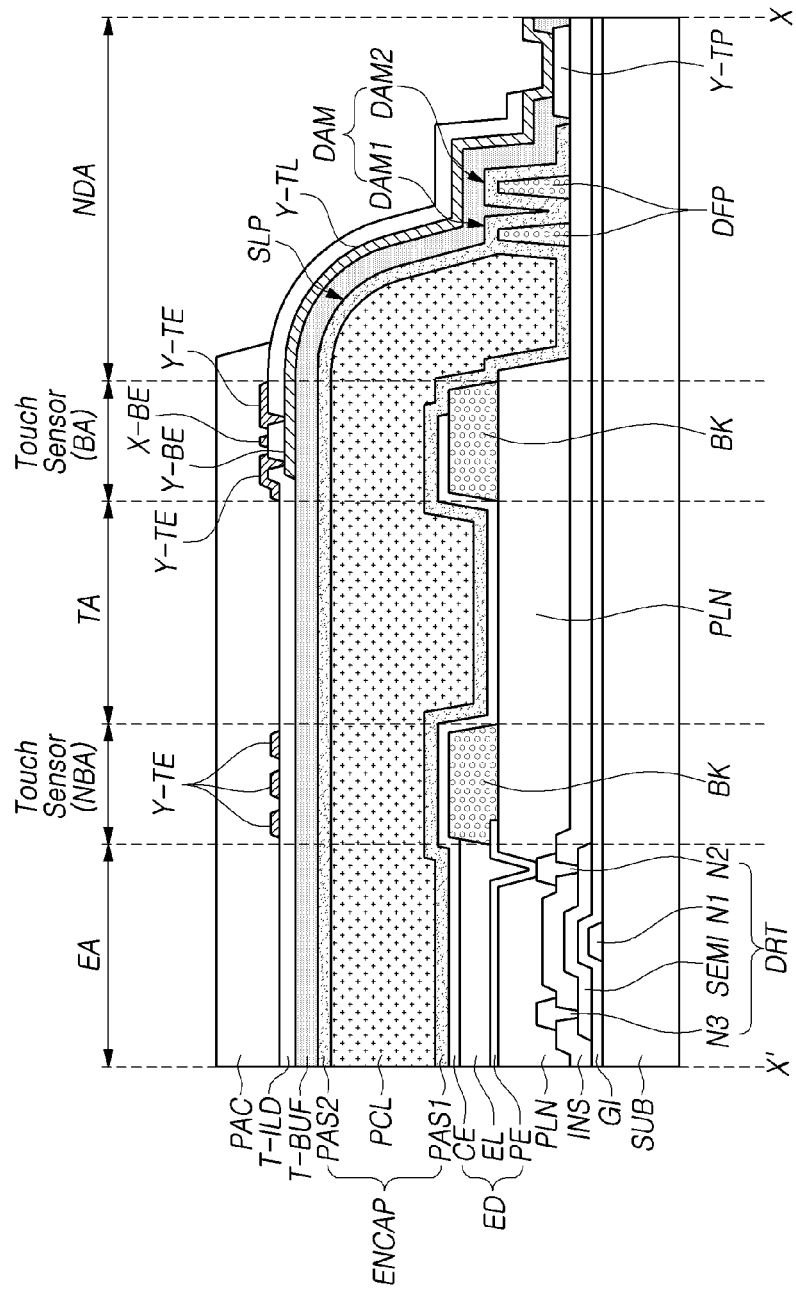
FIG. 6 is a cross-sectional view illustrating a display panel of a transparent touch display device according to embodiments of the disclosure.

FIG. 6 is a cross-sectional view illustrating a display panel 110 of a transparent touch display device 100 according to embodiments of the disclosure. FIG. 6 is a cross-sectional view taken along line X-X' of FIG. 5B.

For convenience of description, FIG. 6 illustrates four areas included in the X'-X area. The four areas may include a light emitting area EA, a bridge area BA of a touch sensor arrangement area, a transmissive area TA, and a non-bridge area NBA of a touch sensor arrangement area. The bridge area BA of the touch sensor arrangement area may mean an area where the first touch bridge electrode X-BE and the second touch bridge electrode Y-BE cross each other. The non-bridge area NBA of the touch sensor arrangement area may mean an area where the first touch bridge electrode X-BE and the second touch bridge electrode Y-BE do not exist.

The area where the touch electrode TE is formed may include a plurality of light emitting areas EA and a plurality of transmissive areas TA. For example, a pixel electrode PE and a light emitting layer EL constituting the light emitting element ED may be disposed in each light emitting area EA. A common electrode CE may be disposed on the light emitting layer EL.

A touch sensor may be disposed in the area where the touch electrode TE is formed. For example, the area where the touch electrode TE is formed may include the area NBA where the touch electrodes Y-TE are disposed and the area BA where the touch electrodes Y-TE and the touch bridge electrode Y-BE connecting the touch electrodes Y-TE are formed. The touch electrodes Y-TE may include a touch sensor metal TSM, and the touch bridge electrode Y-BE may include a touch bridge metal positioned on a different layer from the touch sensor metal TSM. In some cases, the touch bridge metal may be positioned on the same layer as the touch sensor metal TSM.

The area where the touch electrode TE is formed may include a transmissive area TA. To enhance transmittance, a metal constituting the touch sensor, such as the touch sensor metal TSM and the touch bridge metal, may not be disposed in the transmissive area TA.

As is described below, a transparent electrode (or a transparent electrode layer) electrically connected to the touch sensor metal TSM may be additionally disposed in the transmissive area TA to enhance touch sensitivity.

Further, to enhance transmittance, an opening of the touch buffer film T-BUF and/or the touch inter-layer insulation film T-ILD may be present in the transmissive area TA.

To enhance transmittance, an opening of the common electrode CE may be present in the transmissive area TA. In some cases, a floating metal electrically floated from the common electrode CE may be present in the opening of the common electrode CE.

Hereinafter, the cross-sectional structure of FIG. 6 is described in more detail.

In each subpixel SP in the display area DA, the driving transistor DRT is disposed on the substrate SUB and includes a first node N1 corresponding to the gate electrode, a second node N2 corresponding to the source electrode or drain electrode, a third node N3 corresponding to the drain node or source electrode, and a semiconductor layer SEMI.

The first node N1 and the semiconductor layer SEMI may overlap each other, with a gate insulation film GI disposed therebetween. The second node N2 of the driving transistor DRT may be formed on an insulating layer INS and contact one side of the semiconductor layer SEMI. The third node N3 of the driving transistor DRT may be formed on the insulating layer INS and contact the other side of the semiconductor layer SEMI of the driving transistor DRT.

The light emitting element ED may include a pixel electrode PE corresponding to the anode electrode, a light emitting layer EL formed on the pixel electrode E, and a common electrode CE formed on the light emitting layer EL and corresponding to the cathode electrode.

The pixel electrode PE may be electrically connected to the second node N2 of the driving transistor DRT exposed through a contact hole passing through the planarization film PLN.

The light emitting layer EL may be formed on the pixel electrode PE of the light emitting area EA provided by the bank BK. The common electrode CE may be formed to face the pixel electrode PE with the light emitting layer EL interposed therebetween.

The encapsulation layer ENCAP may block penetration of external moisture or oxygen into the light emitting element ED which is vulnerable to external moisture or oxygen. The encapsulation layer ENCAP may be a single layer or may include a plurality of layers PAS1, PCL, and PAS2 as shown in FIG. 6.

For example, where the encapsulation layer ENCAP is formed of multiple layers PAS1, PCL, and PAS2, the encapsulation part ENCAP may include one or more inorganic encapsulation layers PAS1 and PAS2 and one or more organic encapsulation layer PCL. As a specific example, the encapsulation layer ENCAP may be configured by sequentially stacking the first inorganic encapsulation layer PAS1, the organic encapsulation layer PCL, and the second inorganic encapsulation layer PAS2.

The first inorganic encapsulation layer PAS1 may be formed on the substrate SUB where the common electrode CE is formed to be closest to the light emitting element ED. For example, the first inorganic encapsulation layer PAS1 may be formed of an inorganic insulation material capable of low-temperature deposition, such as, e.g., silicon nitride (SiNx), silicon oxide (SiOx), silicon oxynitride (SiON), or aluminum oxide ($Al_2O_3$). The first inorganic encapsulation layer PAS1 may prevent damage to the light emitting layer EL including the organic material vulnerable to high-temperature atmosphere upon deposition.

The organic encapsulation layer PCL may be formed in a smaller area than the first inorganic encapsulation layer PAS1. The organic encapsulation layer PCL may be formed to expose two opposite ends of the first inorganic encapsulation layer PAS1. The organic encapsulation layer PCL serves to mitigate stress between the layers due to a warping of the transparent touch display device 100 which may be an OLED device, while reinforcing the planarization performance. The organic encapsulation layer PCL may be formed of, e.g., an acrylic resin, epoxy resin, polyimide, polyethylene, silicon oxycarbonate (SiOC), or other organic insulation materials.

Referring to FIG. 6, the dam portion DAM may include a primary dam DAM1 closer to the display area DA and a secondary dam DAM2 closer to the touch pad unit TP. For example, the dam portion DAM may be positioned between the display area DA and the touch pad unit TP where a plurality of first touch pads X-TP and a plurality of second touch pads Y-TP are formed in the non-display area NDA.

The one or more dams DAM1 and DAM2 disposed in the dam portion DAM may prevent the liquid-state organic encapsulation layer PCL from collapsing to the non-display area NDA and resultantly penetrating into the pad area, where the touch pad unit TP is formed, when the liquid-phase organic encapsulation layer PCL is dropped to the display area DA. This effect may be further increased when the dam portion DAM includes a plurality of dams DAM1 and DAM2 as shown in FIG. 6.

Each of the primary dam DAM1 and the secondary dam DAM2 included in the dam portion DAM may be formed in a single-layer structure or multi-layer structure. Each of the primary dam DAM1 and the secondary dam DAM2 may be basically formed in a dam formation pattern DFP.

The dam formation pattern DFP may be formed of the same material as the bank BK for separating the subpixels SP from each other, or may be formed of the same material as a spacer for maintaining an inter-layer spacing. The dam formation pattern DFP may be formed simultaneously with the bank BK or the spacer, so that the dam structure may be formed without a process for adding a mask and a cost increase.

The primary dam DAM1 and/or the secondary dam DAM2 may be structured so that the first inorganic encapsulation layer PAS1 and/or the second inorganic encapsulation layer PAS2 are stacked on the dam formation pattern DFP as shown in FIG. 6.

The organic encapsulation layer PCL including an organic material may be positioned only on an inside surface of the primary dam DAM1 as shown in FIG. 6. Unlike this, the organic encapsulation layer PCL containing an organic material may also be positioned over at least the primary dam DAM1 of the primary dam DAM1 and the secondary dam DAM2.

The first and second inorganic encapsulation layers PAS1 and PAS2 may also be positioned over at least the first dam DAM1 of the first and second dams DAM1 and DAM2. The first and second inorganic encapsulation layers PAS1 and PAS2 may also be positioned on an outer side surface of at least the first dam DAM1 of the first and second dams DAM1 and DAM2.

The second inorganic encapsulation layer PAS2 may be formed over the substrate SUB, where the organic encapsulation layer PCL is formed, to cover or overlay the upper surface and side surfaces of each of the organic encapsulation layer PCL and the first inorganic encapsulation layer PAS1. The second inorganic encapsulation layer PAS2 reduces or blocks penetration of external moisture or oxygen into the first inorganic encapsulation layer PAS1 and the organic encapsulation layer PCL.

A touch buffer film T-BUF may be disposed on the encapsulation layer ENCAP. The touch buffer film T-BUF may be positioned between the touch sensor metal TSM and the common electrode CE of the light emitting element ED.

In one embodiment, the touch buffer film T-BUF may be designed to maintain a predetermined minimum spacing (e.g., 5 µm) between the touch sensor metal TSM and the common electrode CE of the light emitting element ED. Thus, it is possible to reduce or prevent the parasitic capacitance formed between the touch sensor metal TSM and the common electrode CE of the light emitting element ED and hence prevent deterioration of touch sensitivity due to parasitic capacitance. The touch buffer film T-BUF may block off penetration, into the organic material-containing light emitting layer EL, of external moisture or the chemical (e.g., developer or etchant) used upon manufacturing the touch sensor metal TSM disposed on the touch buffer film T-BUF.

The touch buffer film T-BUF is formed of an organic insulation material with a low permittivity of 1 to 3 and formed at a low temperature which is not more than a predetermined temperature (e.g., 100° C.) to prevent damage to the light emitting layer EL containing the organic material vulnerable to high temperature. For example, the touch buffer film T-BUF may be formed of an acrylic-based, epoxy-based, or siloxane-based material. The touch buffer film T-BUF with planarizability, formed of an organic insulation material, may prevent fracture of the touch sensor metal TSM formed on the touch buffer film T-BUF and damage to each encapsulation layer PAS1, PCL, and PAS2 in the encapsulation layer ENCAP due to a warping of the OLED device.

According to a mutual-capacitance-based touch sensor structure, the first touch electrode line X-TEL and the second touch electrode line Y-TEL may be formed on the touch buffer film T-BUF, and the first touch electrode line X-TEL and the second touch electrode line Y-TEL may be disposed to cross each other.

Each of the plurality of second touch electrode lines Y-TEL may include a plurality of second touch bridge electrodes Y-BE electrically connecting the plurality of touch electrodes Y-TE and the plurality of touch electrodes Y-TE. As shown in FIG. 6, the plurality of touch electrodes Y-TE and the plurality of second touch bridge electrodes Y-BE may be positioned on different layers, with a touch inter-layer insulation film ILD disposed therebetween.

The plurality of touch electrodes Y-TE may be disposed adjacent to each other in the first direction (y-axis direction) and may be spaced apart from each other at a predetermined interval.

Each of the plurality of touch electrodes Y-TE may be electrically connected to another touch electrode Y-TE adjacent in the first direction (y-axis direction) through the second touch bridge electrode Y-BE.

The second touch bridge electrode Y-BE may be formed on the touch buffer film T-BUF and be exposed via the touch contact hole passing through the touch inter-layer insulation film ILD and be electrically connected with two touch electrodes Y-TE adjacent in the first direction (y axis direction). All or at least a part of the second touch bridge electrode Y-BE may be disposed to overlap the bank BK. Thus, it is possible to prevent a reduction in the aperture ratio due to the second touch bridge electrode Y-BE.

Each of the plurality of first touch electrode lines X-TEL may include a plurality of touch electrodes X-TE and a plurality of first touch bridge electrodes X-BE electrically connecting the plurality of touch electrodes X-TE. The first touch bridge electrode X-BE may be disposed on the same plane as the touch electrode X-TE and be electrically connected with two touch electrodes X-TE adjacent thereto in the second direction (x axis direction) without a separate contact hole or be integrated with the two touch electrodes X-TE adjacent thereto each other in the second direction (x axis direction). All or at least a part of the first touch bridge electrode X-BE may be disposed to overlap the bank BK. Thus, it is possible to prevent a reduction in the aperture ratio due to the first touch bridge electrode X-BE.

The second touch electrode line Y-TEL may be electrically connected with the touch driving circuit 160 via the second touch routing line Y-TL and the second touch pad Y-TP. Likewise, the first touch electrode line X-TEL may be electrically connected with the touch driving circuit 160 via the first touch routing line X-TL and the first touch pad X-TP.

Referring to the example of FIG. 6, the encapsulation layer ENCAP may include an outer inclined surface SLP. The transparent touch display device 100 may further include the dam portion DAM positioned in the area where the outer inclined surface SLP of the encapsulation layer ENCAP ends, the touch pad unit TP positioned in the non-display area NDA and positioned further outside the dam portion DAM, and the second touch routing line Y-TL electrically connecting some touch electrode Y-TE of the plurality of touch electrodes TE and the second touch pad Y-TP of the touch pad unit TP.

The second touch routing line Y-TL may descend along the outer inclined surface SLP of the encapsulation layer ENCAP, pass the upper portion of the dam DAM, and be electrically connected with the second touch pad Y-TP of the touch pad unit TP. The second touch routing line Y-TL may include one or more of a touch sensor metal TSM and a touch bridge metal. For example, the second touch routing line Y-TL may be disposed on a single layer including the touch sensor metal TSM or may be disposed on a single layer including the touch bridge metal, or may be disposed on two layers including both of the touch sensor metal TSM and the touch bridge metal.

The second touch routing line Y-TL may be electrically connected with the touch electrode Y-TE via the contact hole or be integrated with the touch electrode Y-TE. The second touch routing line Y-TL may extend up to the non-display area NDA and be electrically connected with the second touch pad Y-TP via the top and side of the encapsulation layer ENCAP and the top and side of the dam DAM. Thus, the second touch routing line Y-TL may be electrically connected with the touch driving circuit 160 via the second touch pad Y-TP. The second touch routing line Y-TL may transfer the touch sensing signal from the touch electrode Y-TE to the touch driving circuit 160 or may receive the touch driving signal from the touch driving circuit 160 and transfer the touch driving signal to the touch electrode Y-TE.

The first touch routing line X-TL may be electrically connected with the touch electrode X-TE via the contact hole or be integrated with the touch electrode X-TE. The first touch routing line X-TL may extend up to the non-display area NDA and be electrically connected with the first touch pad X-TP via the top and side of the encapsulation layer ENCAP and the top and side of the dam DAM. Thus, the first touch routing line X-TL may be electrically connected with the touch driving circuit 160 via the first touch pad X-TP. The first touch routing line X-TL may receive the touch driving signal form the touch driving circuit 160 and transfer the touch driving signal to the touch electrode X-TE and may transfer the touch sensing signal from the touch electrode X-TE to the touch driving circuit 160.

Referring to FIG. 6, a protection film PAC may be disposed on the touch electrode X-TE and the touch electrode Y-TE. The touch protection film PAC may extend up to before or after the dam DAM and may thus be disposed even on the first touch routing line X-TL and the second touch routing line Y-TL.

The cross-sectional view of FIG. 6 illustrates a conceptual structure. Depending on the direction or position in which it is viewed, the position, thickness, or width of each pattern (e.g., various layers or electrodes) may be varied, and the connection structure of various patterns may be varied, and an additional layer other than the layers shown may be present as well, or some of the layers may be omitted or combined. For example, the width of the bank BK may be narrower than that shown in the drawings, and the height of the dam portion DAM may be higher or lower than shown.

Figure 12:
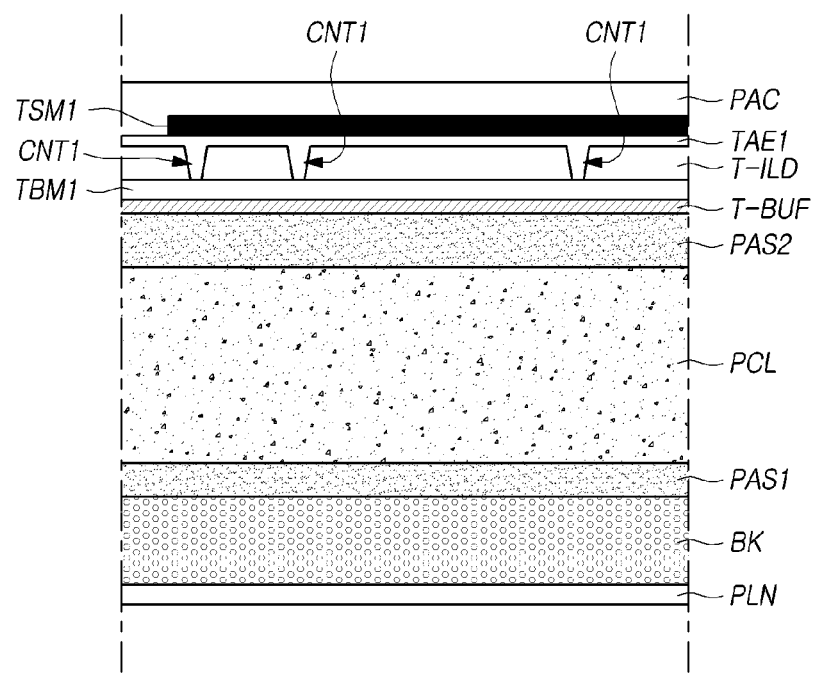
FIG. 12 is a view illustrating an example of a cross-sectional structure of a PTS1 area of FIG. 7C.
Figure 13:
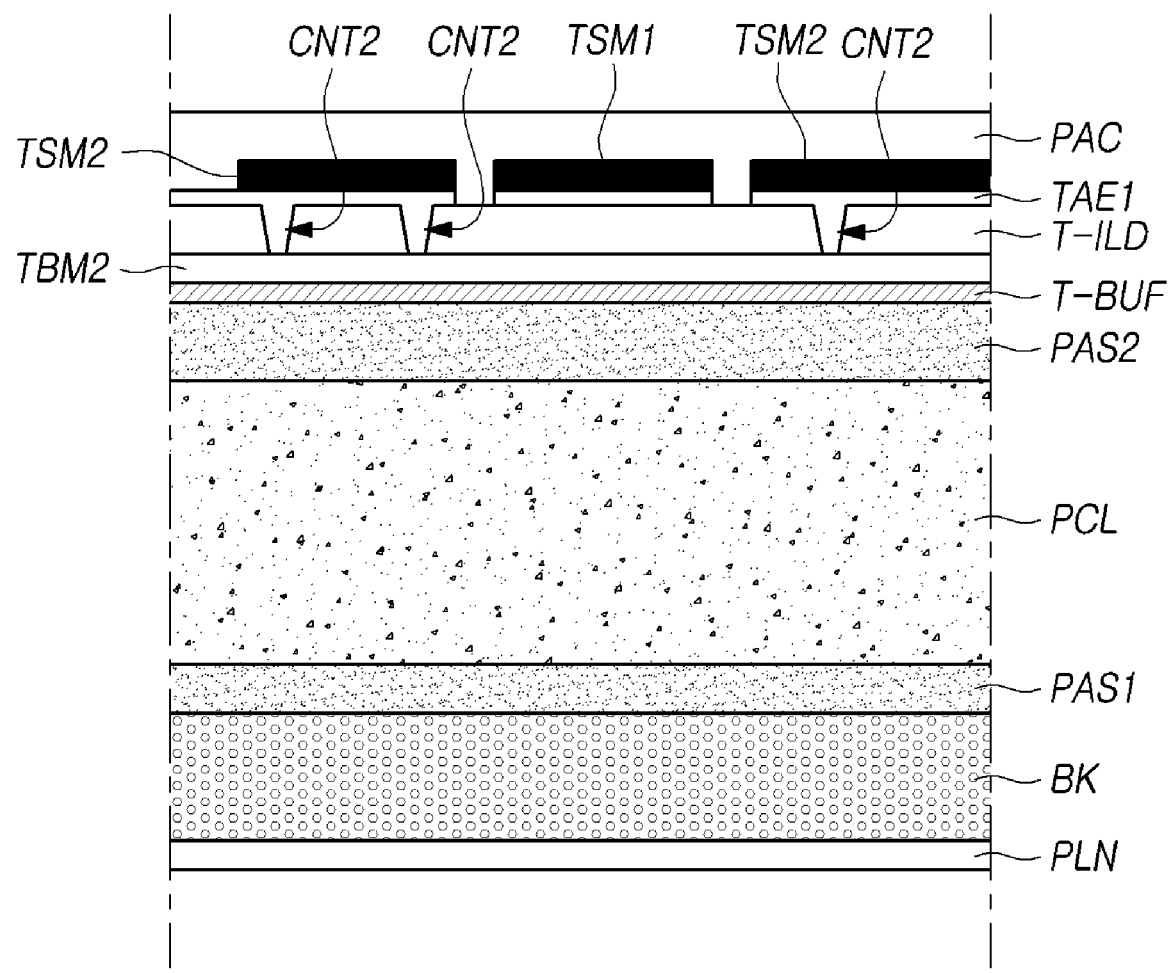
FIG. 13 is a view illustrating an example of a cross-sectional structure of a PTS2 area of FIG. 7C.
Figure 14:
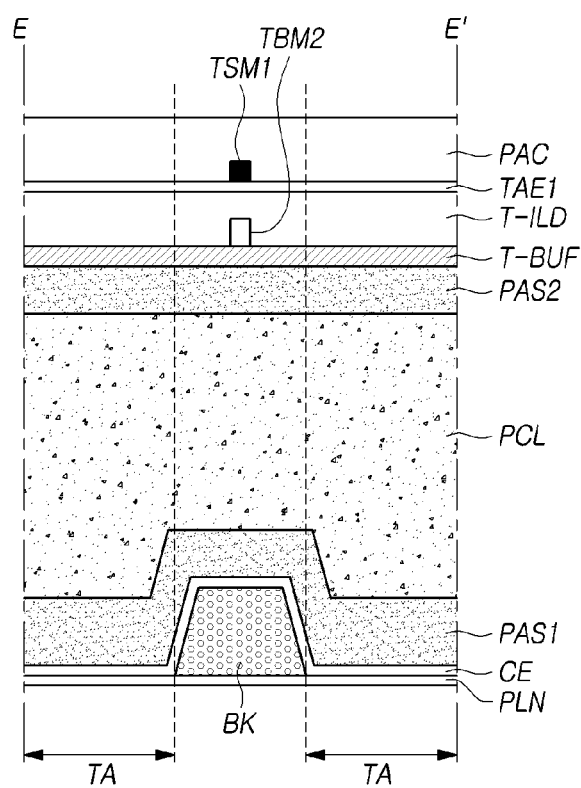
FIG. 14 is a view illustrating an example of a cross-sectional structure taken along line E-E' of FIG. 7B.
Figure 15:
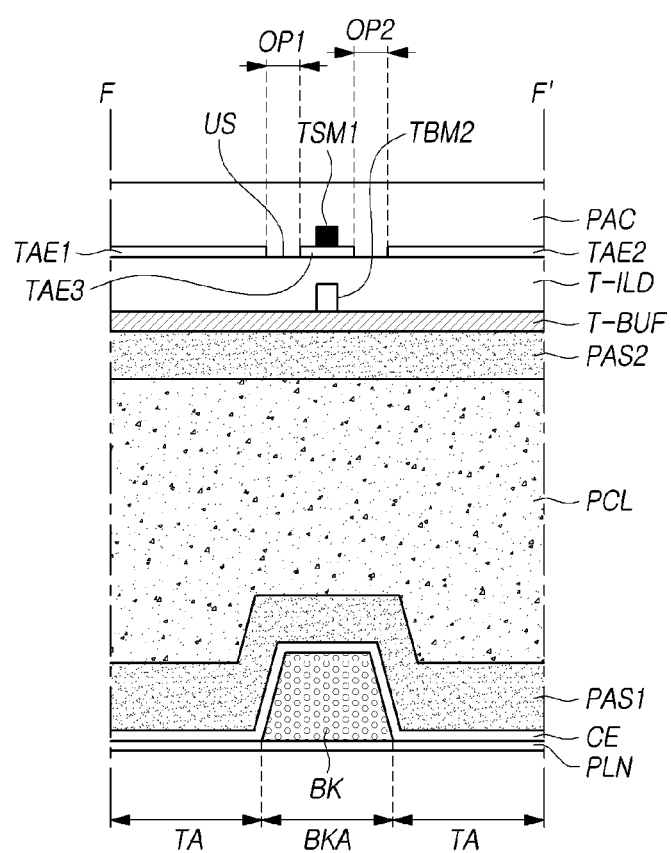
FIG. 15 is a view illustrating a cross-sectional structure taken along line F-F' of FIG. 7B.

FIGS. 7A to 7D are views illustrating examples of a planar structure of an area in which a first touch electrode TE #1 and a second touch electrode TE #2 are arranged in a transparent touch display device 100 according to embodiments of the disclosure. FIG. 7E is a view illustrating a first touch bridge metal TBM1 and a second touch bridge metal TBM2 in the examples of the planar structures of FIGS. 7A to 7D. FIGS. 8A to 8F are views illustrating examples of the cross-sectional structure taken along line A-A' of FIG. 7A. FIGS. 9A to 9F are views illustrating examples of the cross-sectional structure taken along line B-B' of FIG. 7A. FIGS. 10A to 10F are views illustrating examples of the cross-sectional structure taken along line C-C' of FIG. 7A. FIGS. 11A to 11F are views illustrating examples of the cross-sectional structure taken along line D-D' of FIG. 7B. FIG. 12 is a view illustrating an example of a cross-sectional structure of a PTS1 area of FIG. 7C. FIG. 13 is a view illustrating an example of a cross-sectional structure of a PTS2 area of FIG. 7C. FIG. 14 is a view illustrating an example of a cross-sectional structure taken along line E-E' of FIG. 7B. FIG. 15 is a view illustrating a cross-sectional structure taken along line F-F' of FIG. 7B.

Referring to FIGS. 7A to 7D, a display panel 110 of a transparent touch display device 100 according to embodiments of the disclosure may include a substrate SUB defined with a display area DA where an image is displayed and a non-display area DA where an image is not displayed.

Referring to FIGS. 7A to 7D, a plurality of subpixels SP may be disposed in the display area DA. The display area DA may include a plurality of light emitting areas EA and a plurality of transmissive areas TA.

According to the example shown in FIGS. 7A to 7D, the plurality of subpixels SP disposed in the area where the first touch electrode TE #1 and the second touch electrode TE #2 are formed in the display area DA may include a first subpixel SP1, a second subpixel SP2, a third subpixel SP3, a fourth subpixel SP4, a fifth subpixel SP5, a sixth subpixel SP6, a seventh subpixel SP7, and an eighth subpixel SP8.

The first subpixel SP1, the third subpixel SP3, the fifth subpixel SP5, the seventh subpixel SP7, and the eighth subpixel SP8 may be disposed in the area where the first touch electrode TE #1 is formed. In other words, the first subpixel SP1, the third subpixel SP3, the fifth subpixel SP5, the seventh subpixel SP7, and the eighth subpixel SP8 may overlap the area of the first touch electrode TE #1.

The second subpixel SP2, the fourth subpixel SP4, and the sixth subpixel SP6 may be disposed in the area where the second touch electrode TE #2 is formed. In other words, the second subpixel SP2, the fourth subpixel SP4, and the sixth subpixel SP6 may overlap the area of the second touch electrode TE #2.

A pixel electrode PE and a light emitting layer EL may be disposed in the area of each of the first to eighth subpixels SP1 to SP8, and a common electrode CE may be disposed in the entire area of the first to eighth subpixels SP1 to SP8.

Referring to FIGS. 7A to 7D, the plurality of light emitting areas EA may include a first light emitting area EA1 of the first subpixel SP1, a second light emitting area EA2 of the second subpixel SP2, a third light emitting area EA3 of the third subpixel SP3, a fourth light emitting area EA4 of the fourth subpixel SP4, a fifth light emitting area EA5 of the fifth subpixel SP5, a sixth light emitting area EA6 of the sixth subpixel SP6, a seventh light emitting area EA7 of the seventh subpixel SP7, and an eighth light emitting area EA8 of the eighth subpixel SP8.

The first light emitting area EA1 of the first subpixel SP1, the third light emitting area EA3 of the third subpixel SP3, the fifth light emitting area EA5 of the fifth subpixel SP5, the seventh light emitting area EA7 of the seventh subpixel SP7, and the eighth light emitting area EA8 of the eighth subpixel SP8 may be disposed in the area where the first touch electrode TE #1 is formed.

The second light emitting area EA2 of the second subpixel SP2, the fourth light emitting area EA4 of the fourth subpixel SP4, and the sixth light emitting area EA6 of the sixth subpixel SP6 may be disposed in the area where the second touch electrode TE #2 is formed.

Referring to FIGS. 7A to 7D, the touch sensor included in the transparent touch display device 100 according to embodiments of the disclosure may include touch sensor metals TSM1 and TSM2 disposed while avoiding the plurality of light emitting areas EA and the plurality of transmissive areas TA and transparent electrodes TAE1 and TAE2 disposed in the transmissive areas TA and electrically connected with the touch sensor metals TSM1 and TSM2.

Referring to FIGS. 7A to 7D, a plurality of subpixels SP and a plurality of light emitting areas EA may be disposed in each of an ith light emitting area row EAR(i), an i+1th light emitting area row EAR(i+1), an i+2th light emitting area row EAR(i+2), and an i+3th light emitting area row EAR(i+3).

Referring to FIGS. 7A to 7D, the transmissive area TA may be disposed between the ith light emitting area row EAR(i) and the i+1th light emitting area row EAR(i+1), the transmissive area TA may be disposed between the i+1th light emitting area row EAR(i+1) and the i+2th light emitting area row EAR(i+2), and the transmissive area TA may be disposed between the i+2th light emitting area row EAR(i+2) and the i+3th light emitting area row EAR(i+3).

Figure 7A:
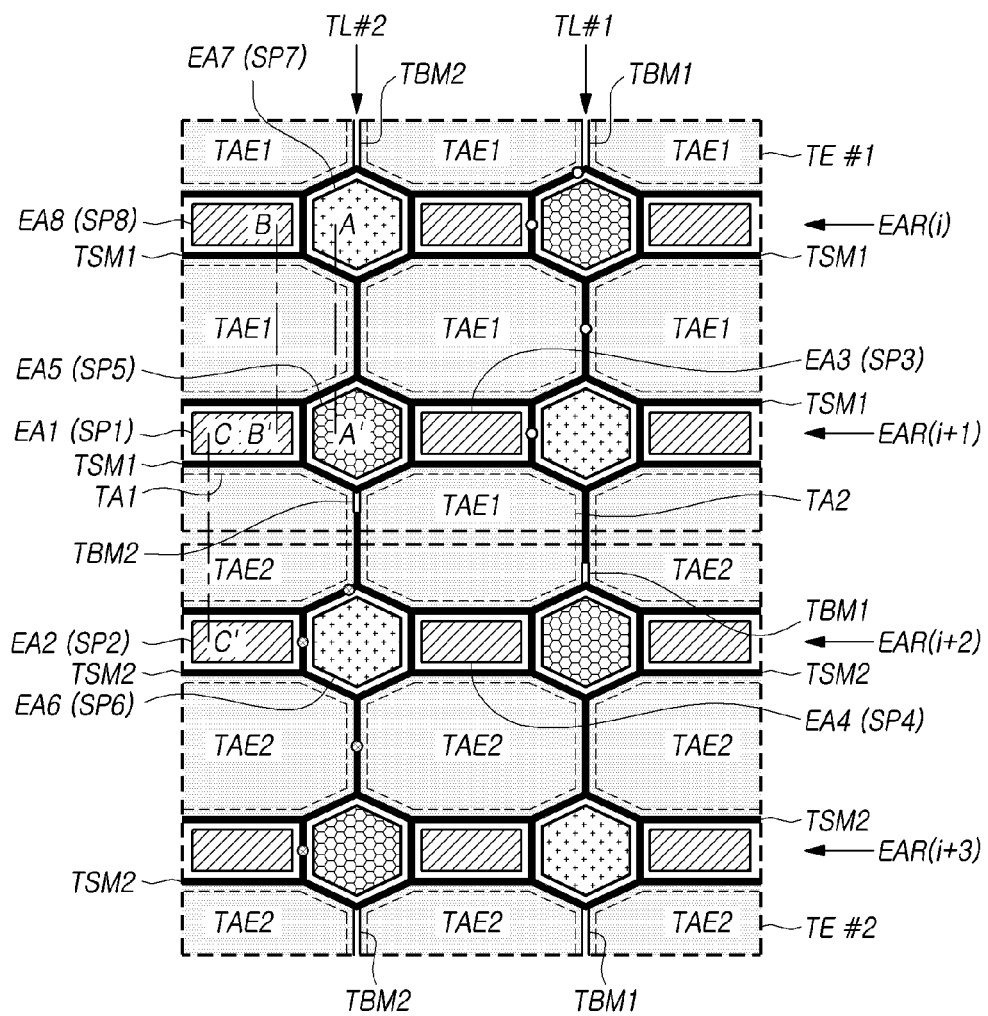
FIGS. 7A, 7B, 7C, and 7D are views illustrating examples of a planar structure of an area in which a first touch electrode and a second touch electrode are arranged in a transparent touch display device according to embodiments of the disclosure.
Figure 7B:
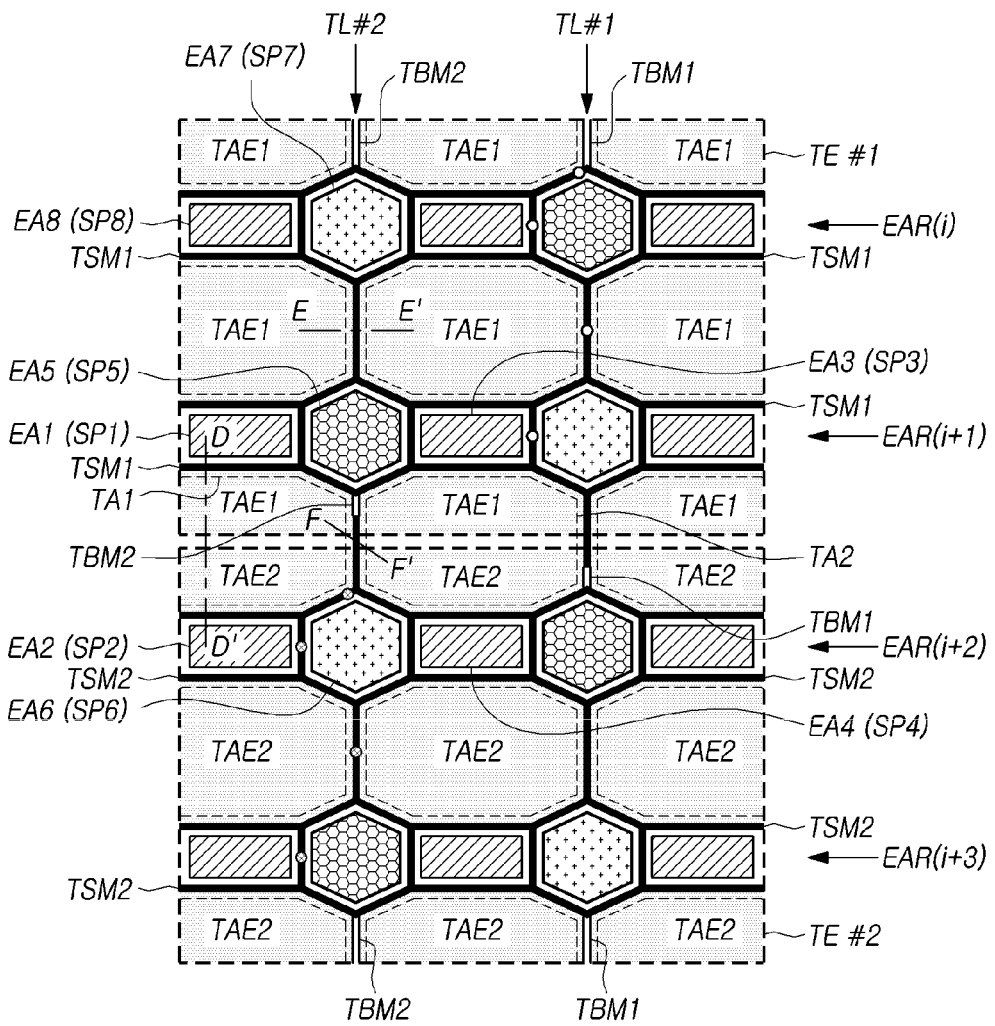

The arrangement structure of the touch sensor metals TSM1 and TSM2 and the touch bridge metals TBM1 and TBM2 in FIG. 7A is equal to the arrangement structure of the touch sensor metals TSM1 and TSM2 and the touch bridge metals TBM1 and TBM2 in FIG. 7B. The connection positions and connection structures of the touch sensor metals TSM1 and TSM2 and the touch bridge metals TBM1 and TBM2 in FIG. 7A are equal to the connection positions and connection structures of the touch sensor metals TSM1 and TSM2 and the touch bridge metals TBM1 and TBM2 in FIG. 7B. FIGS. 7A and 7B differ only in the transparent electrode arrangement structure in the border area between the first touch electrode TE #1 and the second touch electrode TE #2.

Figure 7C:
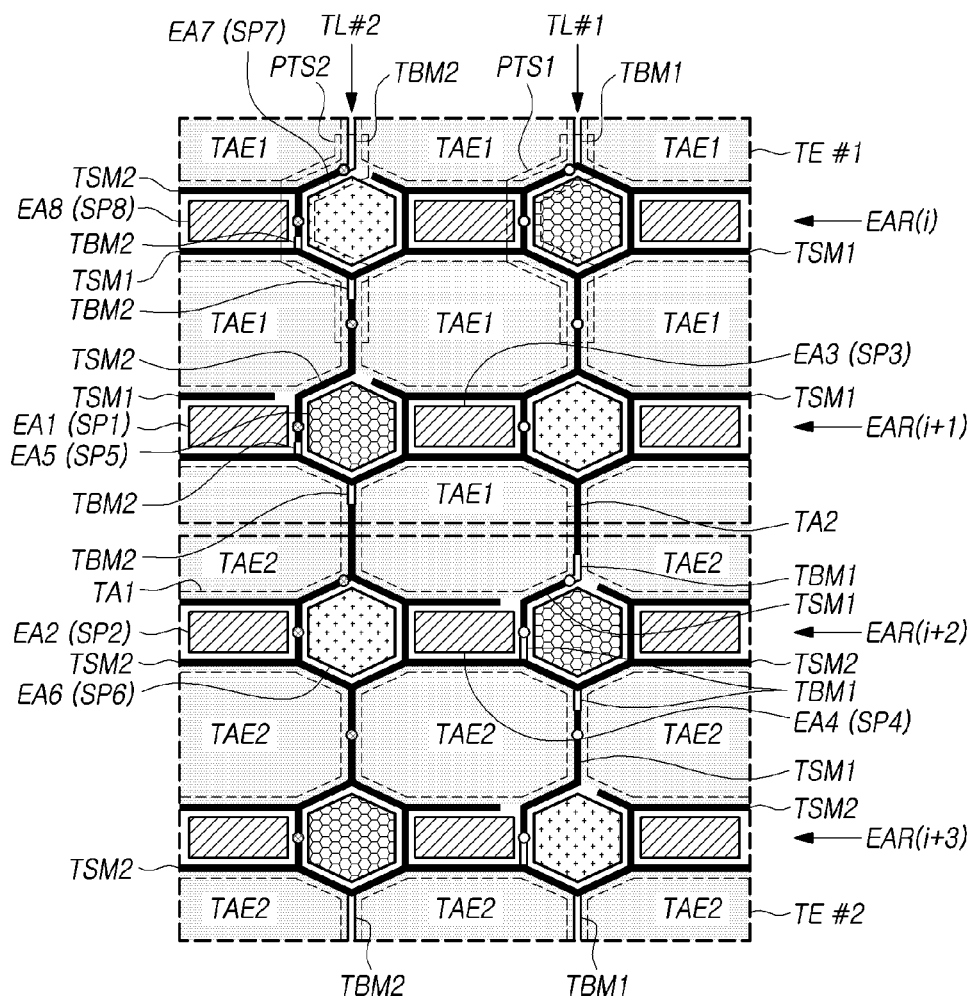
Figure 7D:
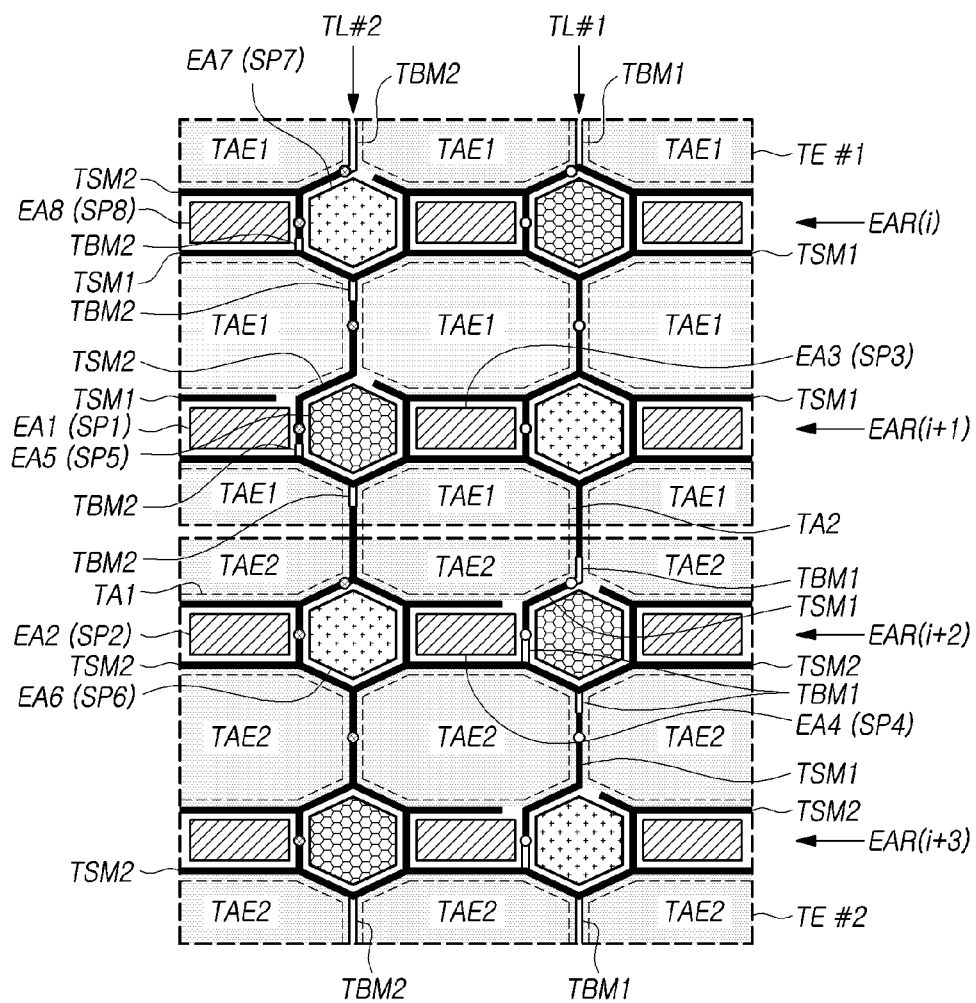
Figure 7E:
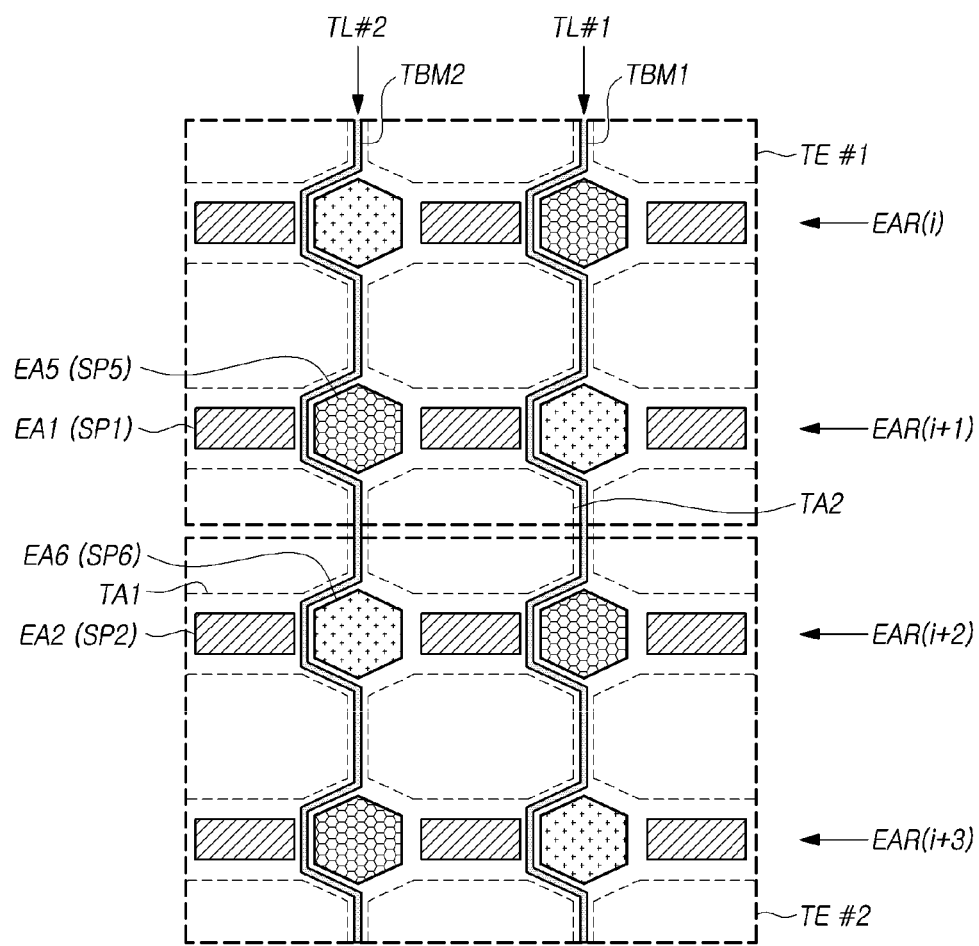
FIG. 7E is a view illustrating a first touch bridge metal and a second touch bridge metal in the examples of the planar structures of FIGS. 7A to 7D.

The arrangement structure of the touch sensor metals TSM1 and TSM2 and the touch bridge metals TBM1 and TBM2 in FIG. 7C is equal to the arrangement structure of the touch sensor metals TSM1 and TSM2 and the touch bridge metals TBM1 and TBM2 in FIG. 7D. The connection positions and connection structures of the touch sensor metals TSM1 and TSM2 and the touch bridge metals TBM1 and TBM2 in FIG. 7C are equal to the connection positions and connection structures of the touch sensor metals TSM1 and TSM2 and the touch bridge metals TBM1 and TBM2 in FIG. 7D. FIGS. 7C and 7D differ only in the transparent electrode arrangement structure in the border area between the first touch electrode TE #1 and the second touch electrode TE #2.

The arrangement structures of the touch sensor metals TSM1 and TSM2 and the touch bridge metals TBM1 and TBM2 in FIGS. 7A and 7B are different from the arrangement structures of the touch sensor metals TSM1 and TSM2 and the touch bridge metals TBM1 and TBM2 in FIGS. 7C and 7D.

The connection positions and connection structures of the touch sensor metals TSM1 and TSM2 and the touch bridge metals TBM1 and TBM2 in FIGS. 7A and 7B are different from the connection positions and connection structures of the touch sensor metals TSM1 and TSM2 and the touch bridge metals TBM1 and TBM2 in FIGS. 7C and 7D.

Referring to FIGS. 7A to 7D, transparent electrodes TAE1 and TAE2 may be disposed in each of the transmissive areas TA. For example, the first transparent electrode TAE1 may be disposed in the transmissive areas TA included in the area where the first touch electrode TE #1 is formed, and the second transparent electrode TAE2 may be disposed in the transmissive areas TA included in the area where the second touch electrode TE #2 is formed.

Referring to FIGS. 7A to 7D, at least one of the transparent electrodes TAE1 and TAE2 disposed in the transmissive areas TA may extend below the adjacent touch sensor metals TSM1 and TSM2. Accordingly, the touch sensor metals TSM1 and TSM2 overlap and connect to the transparent electrodes TAE1 and TAE2, so that the touch electrodes TE #1 and TE #2 may have a double metal structure.

Referring to FIGS. 8A to 8F, 9A to 9F, 10A to 10F, and 11A to 11F, the common electrode CE may be disposed not only in the light emitting areas EA but also in the transmissive areas TA.

Referring to FIGS. 8A, 8D, 9A, 9D, 10A, 10D, 11A, and 11D, the common electrode CE may be disposed not only in the light emitting areas EA but also in the transmissive areas TA.

Referring to FIGS. 8B, 8E, 9B, 9E, 10B, 10E, 11B, and 11E, the common electrode CE may have openings OPEN_CE in the transmissive areas TA. In other words, the positions of the openings OPEN_CE of the common electrode CE may correspond to the positions of the transmissive areas TA.

Referring to FIGS. 8C, 8F, 9C, 9F, 10C, 10F, 11C, and 11F, a floating metal FM may be disposed in each of the openings OPEN_CE of the common electrode CE.

Referring to FIGS. 8A to 8C, 9A to 9C, 10A to 10C, and 11A to 11C, a touch buffer film T-BUF and a touch inter-layer insulation film T-ILD may be disposed not only in the light emitting areas EA but also in the transmissive areas TA.

Referring to FIGS. 8D to 8F, 9D to 9F, 10D to 10F, and 11D to 11F, in the transmissive areas TA, the touch buffer film T-BUF and the touch inter-layer insulation film T-ILD may have openings. In other words, the positions of the openings of the touch buffer film T-BUF and the touch inter-layer insulation film T-ILD may correspond to the positions of the transmissive areas TA.

Referring to FIGS. 8E, 8F, 9E, 9F, 10E, 10F, 11E, and 11F, the positions of the openings of the touch buffer film T-BUF and the touch inter-layer insulation film T-ILD may correspond to the positions of the openings OPEN_CE of the common electrode CE.

Referring to FIGS. 7A to 7E, in the area where the first touch electrode TE #1 and the second touch electrode TE #2 are disposed, the touch sensor may include touch bridge electrodes as well as the first touch electrode TE #1 and the second touch electrode TE #2 and, in some cases, may further include touch routing lines TL #1 and TL #2.

The touch bridge electrodes and/or the touch routing lines TL #1 and TL #2 may include touch bridge metals TBM1 and TBM2.

Referring to FIGS. 7A to 7E, the first touch bridge metal TBM1 may be electrically connected to the first touch sensor metal TSM1 constituting the first touch electrode TE #1. The touch bridge electrode constituting the first touch electrode TE #1 or the first touch routing line TL #1 electrically connected to the first touch electrode TE #1 may include the first touch bridge metal TBM1.

Referring to FIGS. 7A to 7E, the second touch bridge metal TBM2 may be electrically connected to the second touch sensor metal TSM2 constituting the second touch electrode TE #2. The touch bridge electrode constituting the second touch electrode TE #2 or the second touch routing line TL #2 electrically connected to the second touch electrode TE #2 may include the second touch bridge metal TBM2.

Referring to FIG. 7E, the first touch bridge metal TBM1 and the second touch bridge metal TBM2 may be disposed while avoiding the first light emitting area EA1, the first transmissive area TA1, and the second light emitting area EA2.

The touch bridge metals TBM1 and TBM2 may be disposed to overlap a portion of the touch sensor metals TSM1 and TSM2.

The plurality of subpixels SP may include subpixels SP emitting three or four colors of light.

For example, referring to FIGS. 7A to 7E, the plurality of subpixels SP may include subpixels SP emitting a first color of light, subpixels SP emitting a second color of light, and subpixels SP emitting a third color of light. For example, it may be assumed that the first color is red, the second color is green or blue, and the third color is blue or green.

Referring to FIGS. 7A to 7E, the size of the light emitting areas EA of the subpixels SP emitting the first color of light among the three colors is smaller than the size of the light emitting areas EA of the subpixels SP emitting the second color of light and is smaller than the size of the light emitting areas EA of the subpixels SP emitting the third color of light.

Referring to FIGS. 7A to 7E, the size of the light emitting areas EA of the subpixels SP emitting the second color of light may be equal to the size of the light emitting areas EA of the subpixels SP emitting the third color of light.

Referring to FIGS. 7A to 7E, the light emitting areas EA of the subpixels SP emitting the second color of light and the light emitting areas EA of the subpixels SP emitting the third color of light may be alternately arranged.

Referring to FIGS. 7A to 7E, each of the touch bridge metals TBM1 and TBM2 may be disposed between the light emitting area EA of the subpixel SP emitting the first color of light and the light emitting area EA of the subpixel SP emitting the second color of light, between the light emitting area EA of the subpixel SP emitting the first color of light and the light emitting area EA of the subpixel SP emitting the third color of light, and between adjacent transmissive areas TA.

Referring to FIG. 7E, as an example, the first touch bridge metal TBM1 may be disposed between the first light emitting area EA1 and the fifth light emitting area EA5, between the first transmissive area TA1 and the second transmissive area TA2, and between the second light emitting area EA2 and the sixth light emitting area EA6.

Referring to FIGS. 7A to 7D and 7E, the first touch bridge metal TBM1 may overlap and electrically connect to the first touch sensor metal TSM1, and the first touch bridge metal TBM1 may overlap and be electrically insulated from the second touch sensor metal TSM2.

Referring to FIGS. 8A to 8F, 9A to 9F, 10A to 10F, and 11A to 11F, a bank BK may be disposed adjacent to the light emitting layer EL of each of the subpixels SP, and an encapsulation layer ENCAP may be disposed on the light emitting layer EL of each of the subpixels SP and the second bank BK.

Referring to FIGS. 8A to 8F, 9A to 9F, 10A to 10F, and 11A to 11F, the first touch sensor metal TSM1, the second touch sensor metal TSM2, and the transparent electrodes TAE1 and TAE2 may be positioned on the encapsulation layer ENCAP.

Referring to FIGS. 8A to 8F, 9A to 9F, 10A to 10F, and 11A to 11F, all or at least a part of each of the first touch sensor metal TSM1 and the second touch sensor metal TSM2 may overlap a bank area BKA where the bank BK is disposed. In some embodiments, the bank area BKA may be between a light emitting area EA and a transmissive area TA.

Referring to FIGS. 8A to 8F, 9A to 9F, 10A to 10F, and 11A to 11F, a touch buffer film T-BUF may be disposed on the encapsulation layer ENCAP, and a touch inter-layer insulation film T-ILD may be disposed on the touch buffer film T-BUF.

The first and second touch bridge metals TBM1 and TBM2 may be positioned between the touch buffer film T-BUF and the touch inter-layer insulation film T-ILD. All or at least a part of each of the first touch sensor metal TSM1 and the second touch sensor metal TSM2 may overlap the bank BK. All or at least a part of the first and second touch bridge metals TBM1 and TBM2 may overlap the bank BK.

The first and second touch sensor metals TSM1 and TSM2 may be positioned on the touch inter-layer insulation film T-ILD.

FIGS. 8A to 8F show a cross-sectional structure from point A of the seventh light emitting area EA7 of the seventh subpixel SP7 in FIG. 7A to point A' of the fifth light emitting area EA5 of the fifth subpixel SP5. The color (e.g., green or blue) of the light emitted from the seventh light emitting area EA7 of the seventh subpixel SP7 may differ from the color (e.g., blue or green) of the light emitted from the fifth light emitting area EA5 of the fifth subpixel SP5.

Referring to FIGS. 8A to 8F, the touch buffer layer T-BUF may be disposed on the encapsulation layer ENCAP, and the second touch bridge metal TBM2 may be disposed on the touch buffer layer T-BUF. All or at least a part of the second touch bridge metal TBM2 may be disposed to overlap the bank BK. The second touch bridge metal TBM2 may not be disposed in the transmissive area TA.

Referring to FIGS. 8A to 8F, the touch inter-layer insulation film T-ILD may be disposed on the second touch bridge metal TBM2, and the first transparent electrode TAE1 may be disposed on the touch inter-layer insulation film T-ILD. The first transparent electrode TAE1 may also be disposed in the transmissive area TA.

Referring to FIGS. 8A to 8F, the first touch sensor metal TSM1 may be disposed on the first transparent electrode TAE1. The first touch sensor metal TSM1 may directly contact the first transparent electrode TAE1 and may be electrically connected to the first transparent electrode TAE1. Accordingly, the first touch sensor metal TSM1 and the first transparent electrode TAE1 may constitute the first touch electrode TE #1.

Referring to FIG. 8A to 8F, all or at least a part of the first touch sensor metal TSM1 may be disposed to overlap the bank BK. But the first touch sensor metal TSM1 may not be disposed in the transmissive area TA.

Referring to FIG. 8A to 8F, all or at least a part of the second touch bridge metal TBM2 may overlap the first touch sensor metal TSM1. However, the second touch bridge metal TBM2 is not electrically connected to the first touch sensor metal TSM1. In other words, the second touch bridge metal TBM2 and the first touch sensor metal TSM1 may be insulated from each other. The second touch bridge metal TBM2 may be electrically connected to the second touch sensor metal TSM2 included in the second touch electrode TE #2.

Figure 8A:
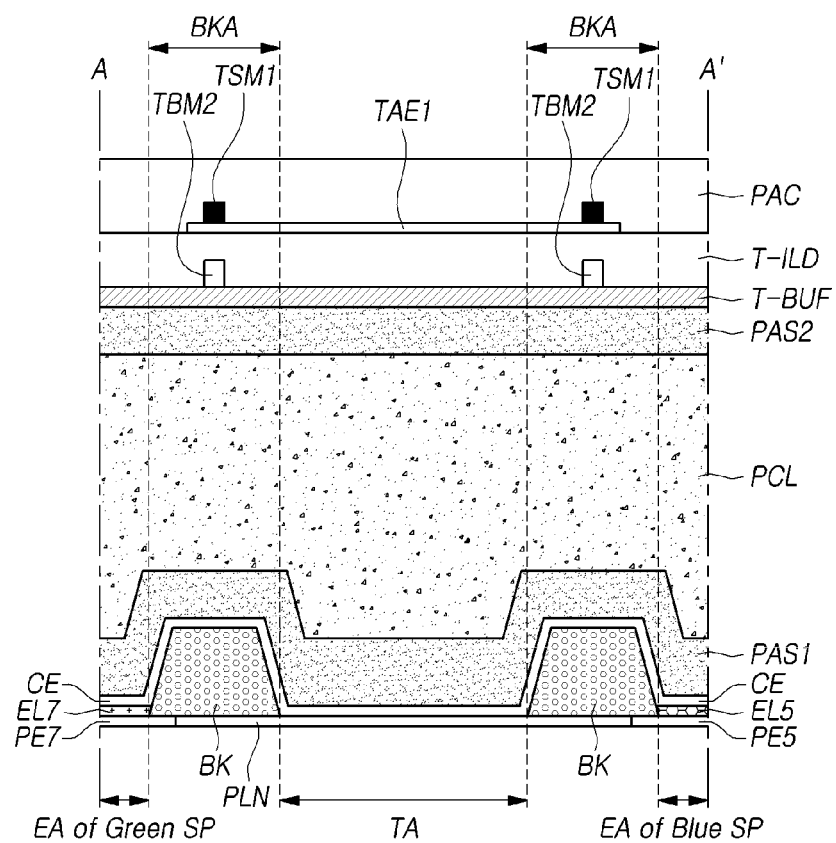
FIGS. 8A, 8B, 8C, 8D, 8E, and 8F are views illustrating examples of the cross-sectional structure taken along line A-A' of FIG. 7A.
Figure 8B:
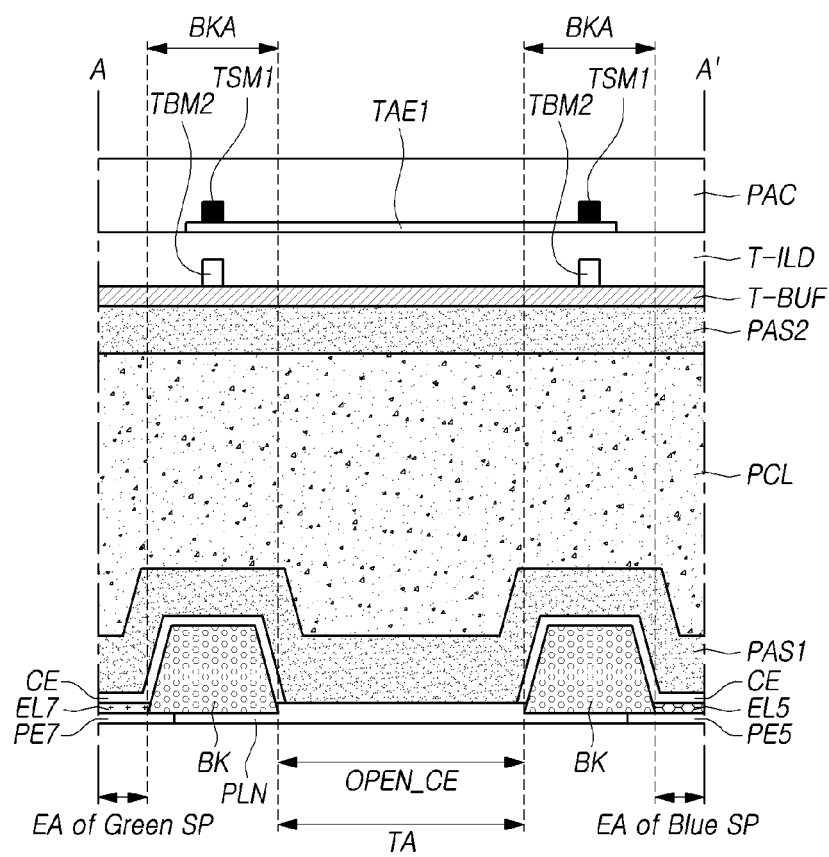
Figure 8C:
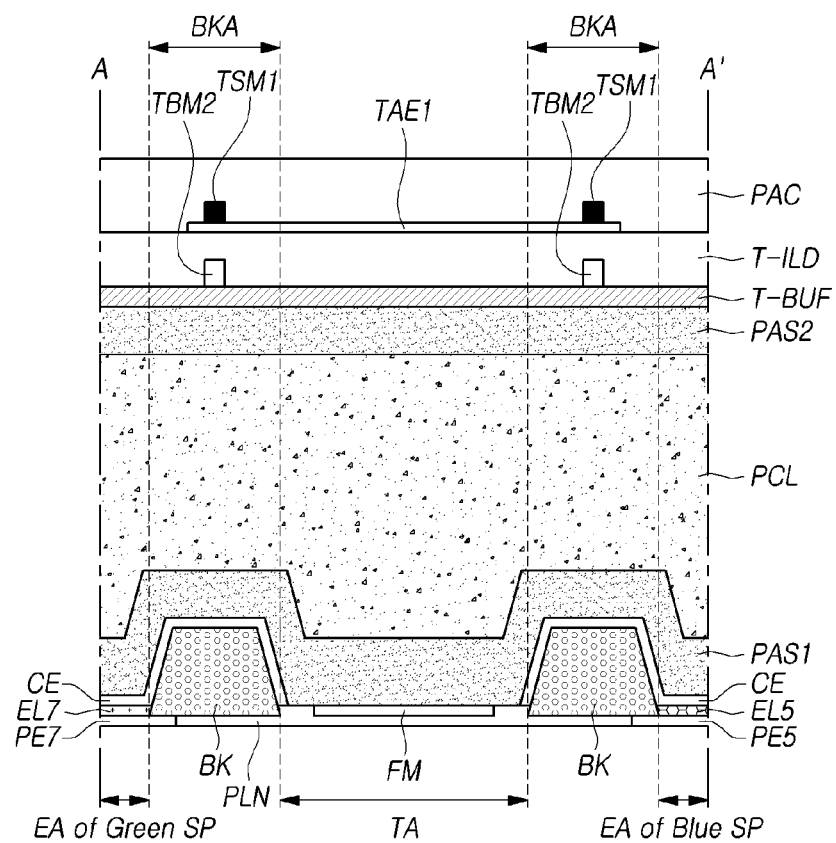
Figure 8D:
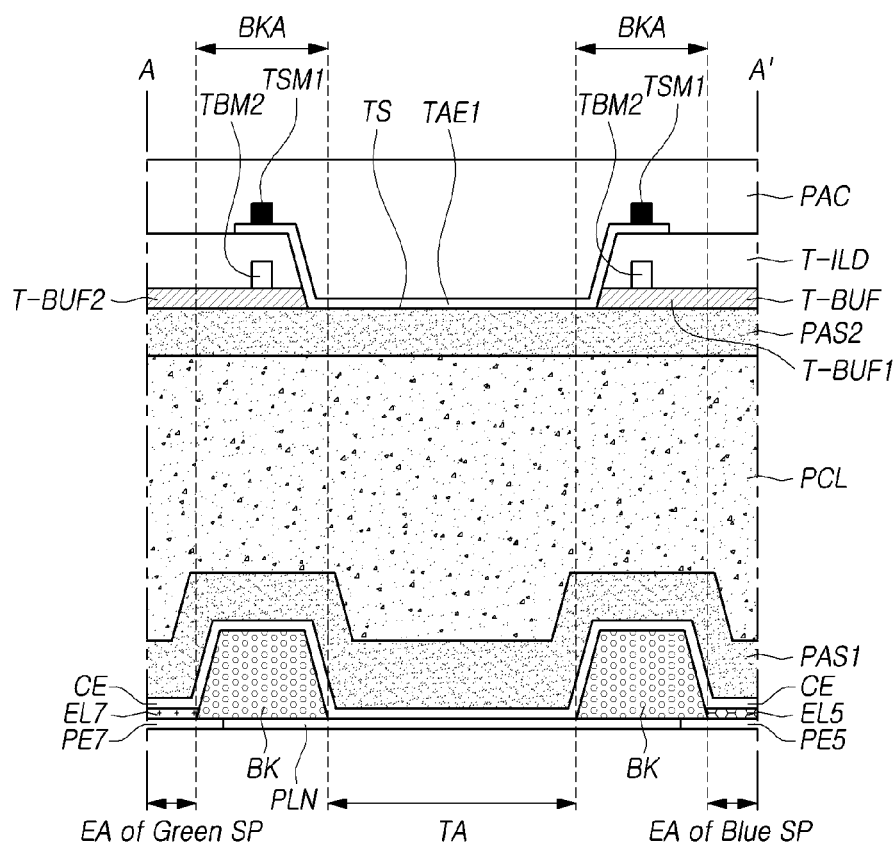
Figure 8E:
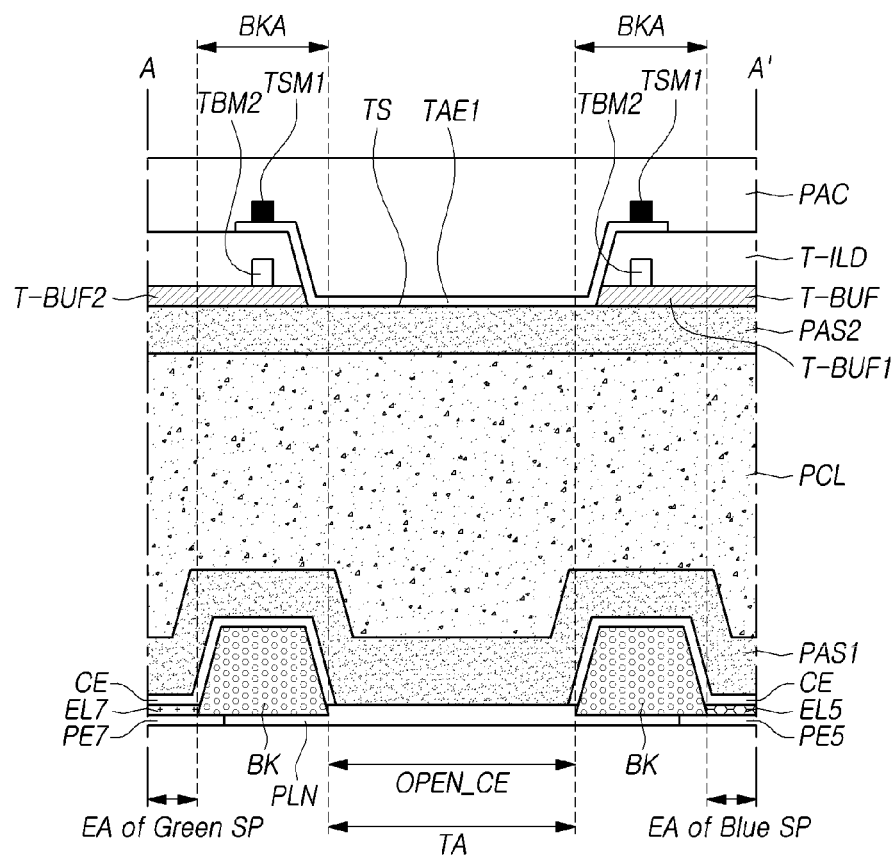
Figure 8F:
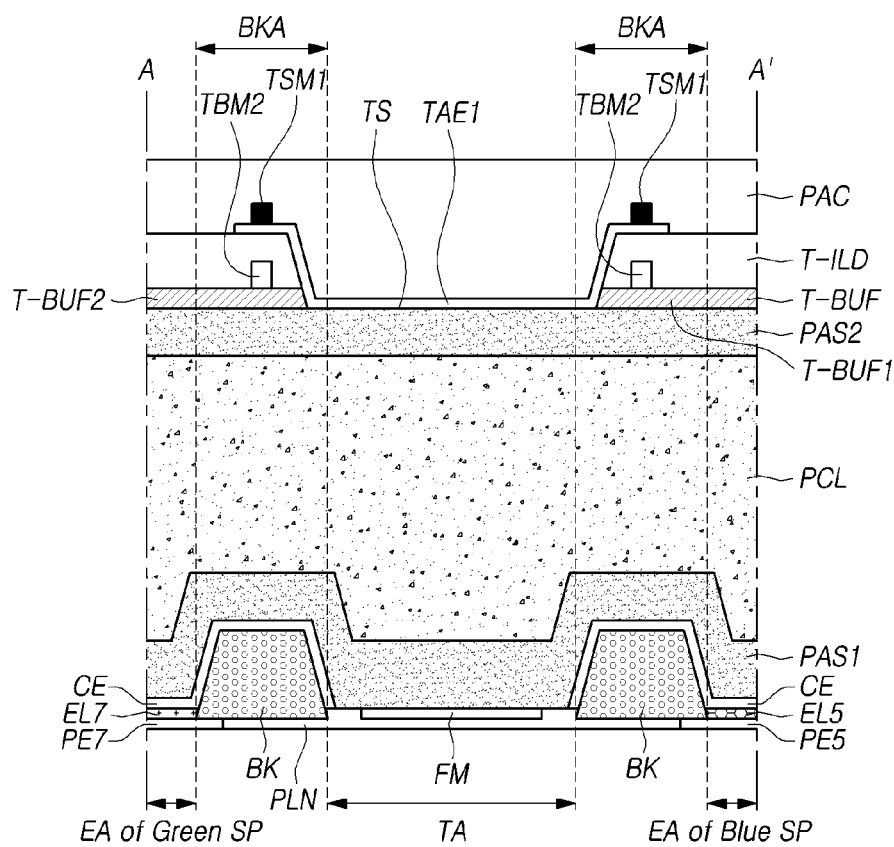

As shown in FIGS. 8D, 8E, and 8F, a top surface TS of the second inorganic encapsulation layer PAS2 is exposed in an area between a first buffer film T-BUF1 and a second buffer film T-BUF2 (collectively T-BUF). The first transparent electrode layer TAE1 directly contacts the top surface of the second inorganic encapsulation layer PAS2 exposed in said area. This area overlaps with the transmissive area TA. In some embodiments, the area where the top surface TS of the second inorganic encapsulation layer PAS2 is exposed partially overlaps with the bank area BKA.

FIGS. 9A to 9F show a cross-sectional structure from point B of the eighth light emitting area EA8 of the eighth subpixel SP8 in FIG. 7A to point B' of the first light emitting area EA1 of the first subpixel SP1. The first color (e.g., red) of the light emitted from the eighth light emitting area EA8 of the eighth subpixel SP8 may be equal to the first color (e.g., red) of the light emitted from the first light emitting area EA1 of the first subpixel SP1.

Figure 9A:
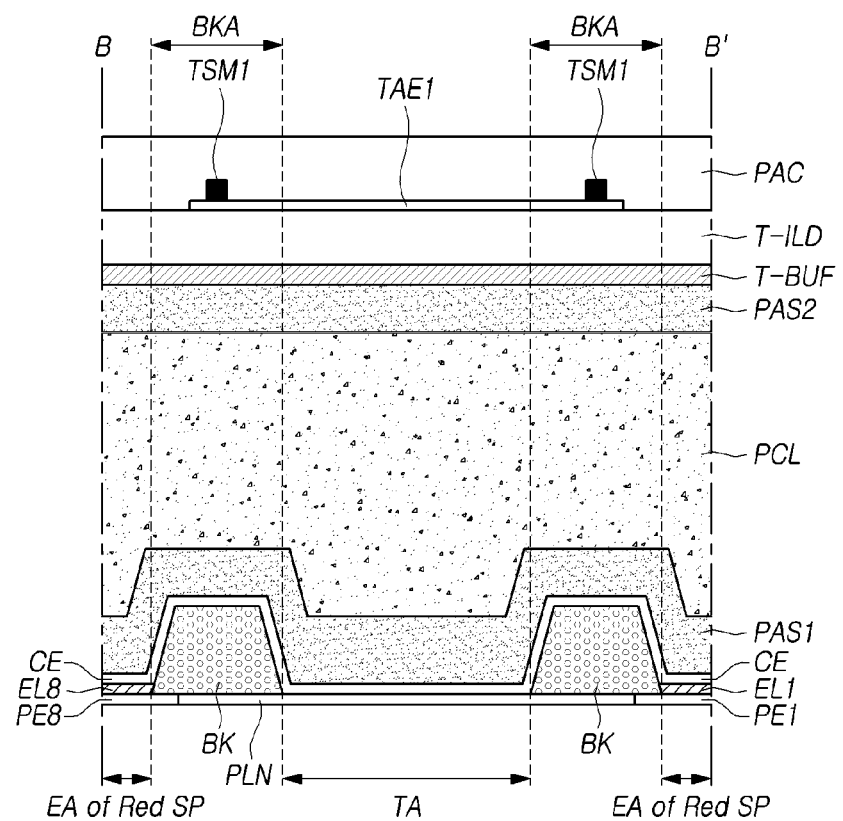
FIGS. 9A, 9B, 9C, 9D, 9E, and 9F are views illustrating examples of the cross-sectional structure taken along line B-B' of FIG. 7A.
Figure 9B:
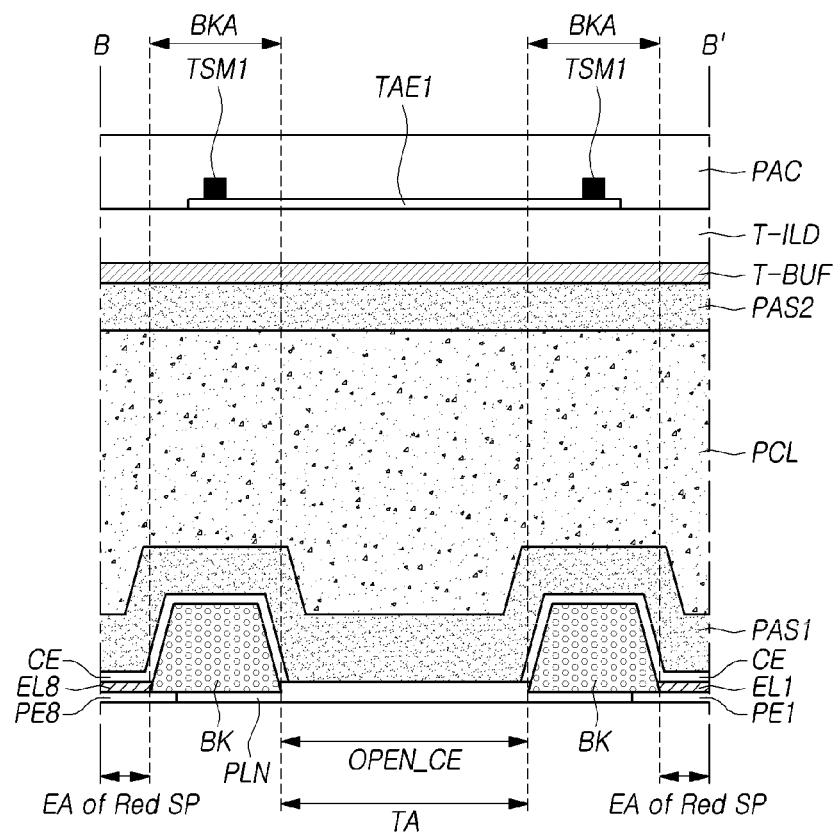
Figure 9C:
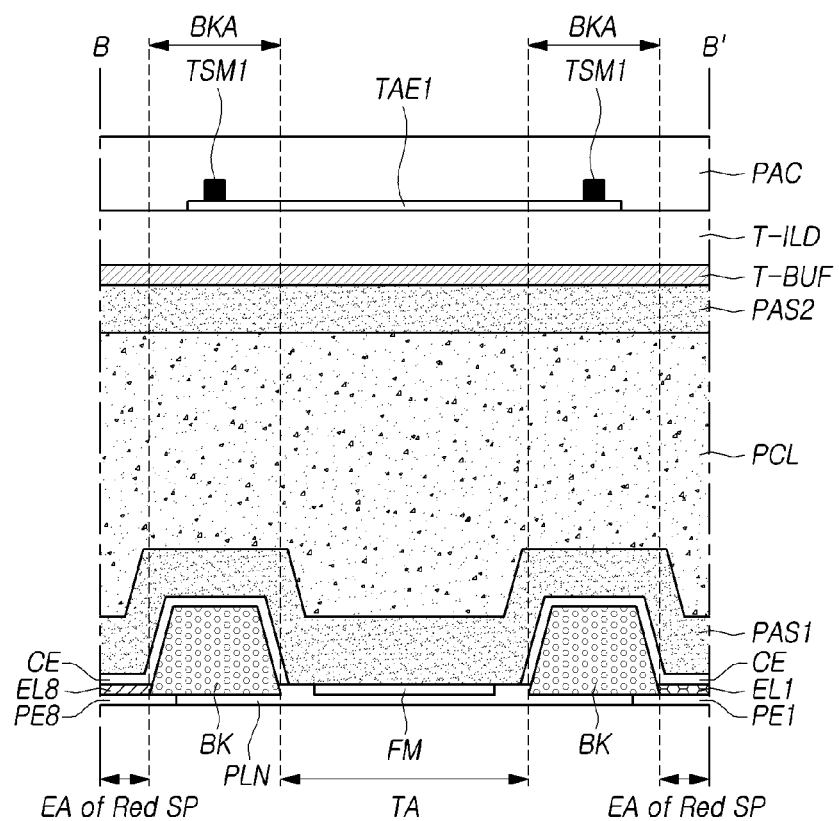
Figure 9D:
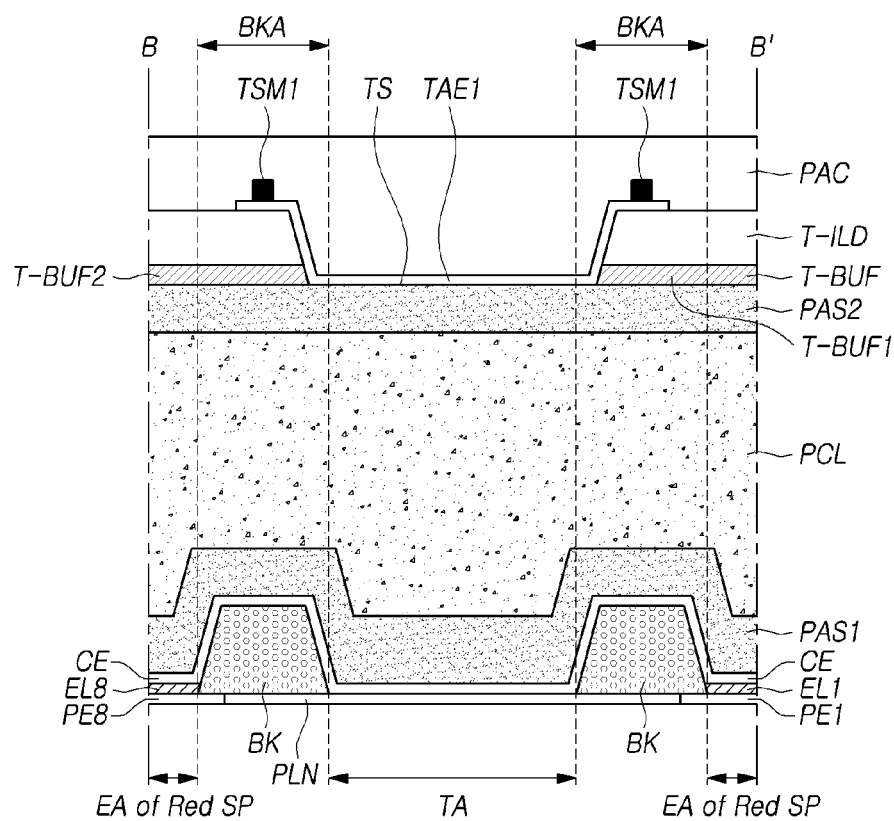
Figure 9E:
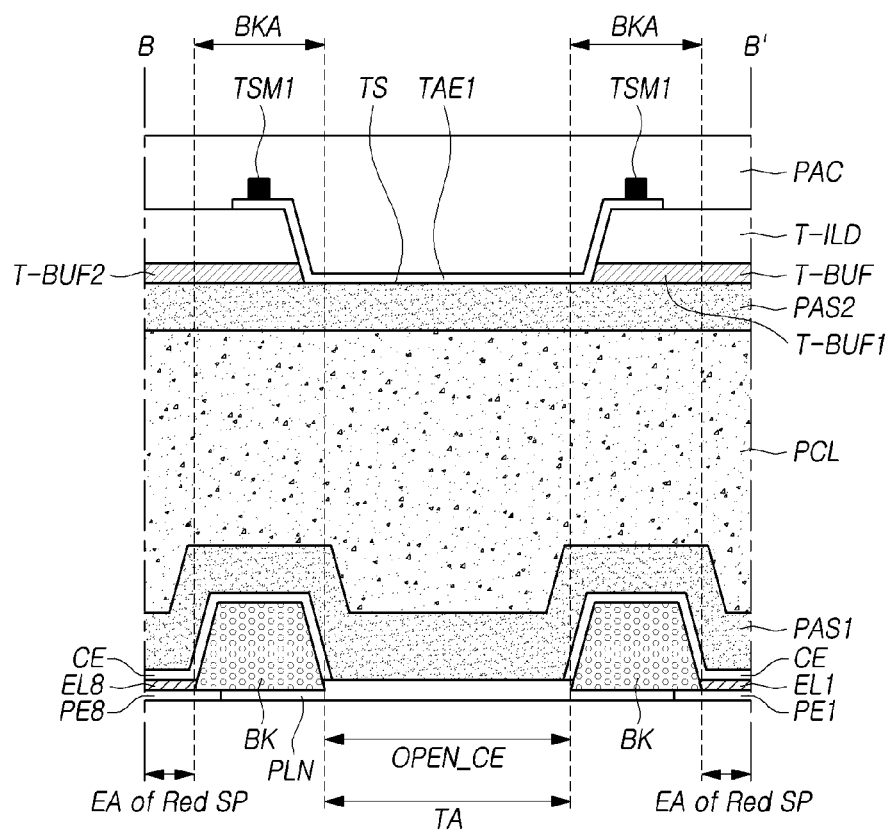
Figure 9F:
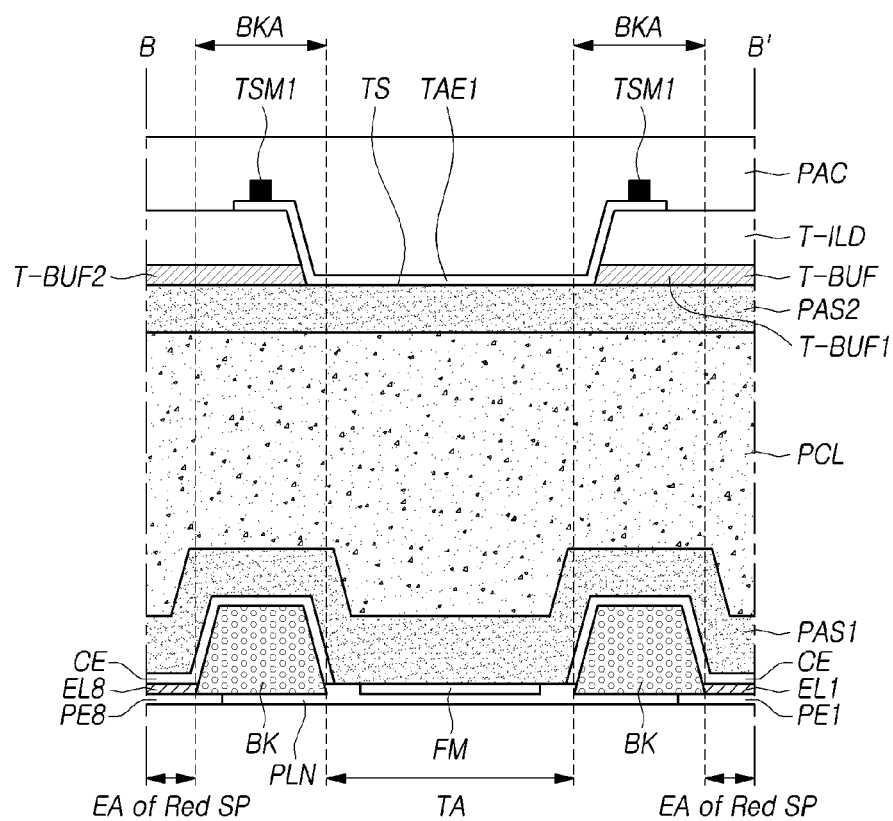

As shown in FIGS. 9D, 9E, and 9F, a top surface TS of the second inorganic encapsulation layer PAS2 is exposed in an area between a first buffer film T-BUF1 and a second buffer film T-BUF2. The first transparent electrode layer TAE1 directly contacts the top surface of the second inorganic encapsulation layer PAS2 exposed in said area. This area overlaps with the transmissive area TA. In some embodiments, the area where the top surface TS of the second inorganic encapsulation layer PAS2 is exposed partially overlaps with the bank area BKA.

Referring to FIGS. 9A to 9F, the second touch bridge metal TBM2 is not seen in the cross-sectional structure from point B to point B'.

FIGS. 10A to 10F show a cross-sectional structure from point C of the first light emitting area EA1 of the first subpixel SP1 in FIG. 7A to point C' of the second light emitting area EA2 of the second subpixel SP2. The first color (e.g., red) of the light emitted from the first light emitting area EA1 of the first subpixel SP1 may be equal to the first color (e.g., red) of the light emitted from the second light emitting area EA2 of the second subpixel SP2.

The area from point C of the first light emitting area EA1 of the first subpixel SP1 to point C' of the second light emitting area EA2 of the second subpixel SP2 includes the border area between the first touch electrode TE #1 and the second touch electrode TE #2. All or at least a part of the first subpixel SP1 may overlap the area of the first touch electrode TE #1, and all or at least a part of the second subpixel SP2 may overlap the area of the second touch electrode TE #2.

Referring to FIGS. 10A to 10F, the second touch bridge metal TBM2 is not seen in the cross-sectional structure from point C to point C'.

Referring to FIGS. 10A to 10F, the touch buffer layer T-BUF may be disposed on the encapsulation layer ENCAP, the touch inter-layer insulation film T-ILD may be disposed on the touch buffer film T-BUF, and the first transparent electrode TAE1 and the second transparent electrode TAE2 may be disposed on the touch inter-layer insulation film T-ILD. The second transparent electrode TAE2 may also be disposed in the transmissive area TA.

Referring to FIGS. 10A to 10F, the first touch sensor metal TSM1 may be disposed on the first transparent electrode TAE1, and the second touch sensor metal TSM2 may be disposed on the second transparent electrode TAE2. In other words, the first and second touch sensor metals TSM1 and TSM2 may be positioned on the touch buffer film T-BUF.

Referring to FIGS. 10A to 10F, the first touch sensor metal TSM1 may be in direct contact with the first transparent electrode TAE1 and may be electrically connected to the first transparent electrode TAE1. Accordingly, the first touch sensor metal TSM1 and the first transparent electrode TAE1 may constitute the first touch electrode TE #1.

Referring to FIGS. 10A to 10F, the second touch sensor metal TSM2 may be in direct contact with the second transparent electrode TAE2 and may be electrically connected to the second transparent electrode TAE2. Accordingly, the second touch sensor metal TSM2 and the second transparent electrode TAE2 may constitute the second touch electrode TE #2.

Referring to FIG. 10A to 10F, all or at least a part of each of the first touch sensor metal TSM1 and the second touch sensor metal TSM2 may be disposed to overlap the bank BK, and may not be disposed in the transmissive area TA.

Referring to FIGS. 7A and 10A to 10F, in the first light emitting area EA1 of the first subpixel SP1 among the plurality of light emitting areas EA, the first pixel electrode PE1 and the first light emitting layer EL1 on the first pixel electrode PE1 may be disposed.

In the second light emitting area EA2 of the second subpixel SP2 positioned in the first direction with respect to the first light emitting area EA1, the second pixel electrode PE2 and the second light emitting layer EL2 on the second pixel electrode PE2 may be disposed.

Referring to FIGS. 10A to 10F, the first touch sensor metal TSM1 included in the first touch electrode TE #1 may be disposed while avoiding the first light emitting area EA1 of the first subpixel SP1. The first touch sensor metal TSM1 may not be disposed in the first light emitting area EA1 of the first subpixel SP1. In other words, the first touch sensor metal TSM1 may not overlap the first light emitting area EA1 of the first subpixel SP1.

The second touch sensor metal TSM2 included in the second touch electrode TE #2 may be disposed while avoiding the second light emitting area EA2 of the second subpixel SP2. The second touch sensor metal TSM2 may not be disposed in the second light emitting area EA2 of the second subpixel SP2. In other words, the second touch sensor metal TSM2 may not overlap the second light emitting area EA2 of the second subpixel SP2.

Referring to FIGS. 7A to 7D, the transparent electrodes TAE1 and TAE2 may be disposed in the first transmissive area TA1 positioned between the first light emitting area EA1 and the second light emitting area EA2, The first light emitting area EA1 may be positioned in the area of the first touch electrode TE #1, and the second light emitting area EA2 may be positioned in the area of the second touch electrode TE #2.

The transparent electrodes TAE1 and TAE2 disposed in the first transmissive area TA1 positioned between the first light emitting area EA1 and the second light emitting area EA2 may be electrically connected to at least one of the first touch sensor metal TSM1 and the second touch sensor metal TSM2.

Referring to FIGS. 10A to 10F and 7A, one transparent electrode TAE1 may be disposed in the first transmissive area TA1. The one transparent electrode TAE2 may be electrically connected to one of the first touch sensor metal TSM1 and the second touch sensor metal TSM2.

According to the example of FIGS. 7A and 7C, one transparent electrode TAE2 disposed in the first transmissive area TA1 positioned between the first light emitting area EA1 and the second light emitting area EA2 may be electrically connected to the second touch sensor metal TSM2.

Referring to FIGS. 10A to 10F, the first bank BK may be positioned around the first light emitting layer EL1, and the bank BK may be positioned around the second light emitting layer EL2. The encapsulation layer ENCAP may be disposed on the first light emitting layer EL1, the first bank BK, the second light emitting layer EL2, and the second bank BK.

Referring to FIGS. 10A to 10F, the first touch sensor metal TSM1, the second touch sensor metal TSM2, and the transparent electrodes TAE1 and TAE2 may be positioned on the encapsulation layer ENCAP.

All or at least a part of the first touch sensor metal TSM1 may overlap the first bank BK positioned around the first light emitting layer EL1. All or at least a part of the second touch sensor metal TSM2 may overlap the second bank BK positioned around the second light emitting layer EL2.

Figure 10A:
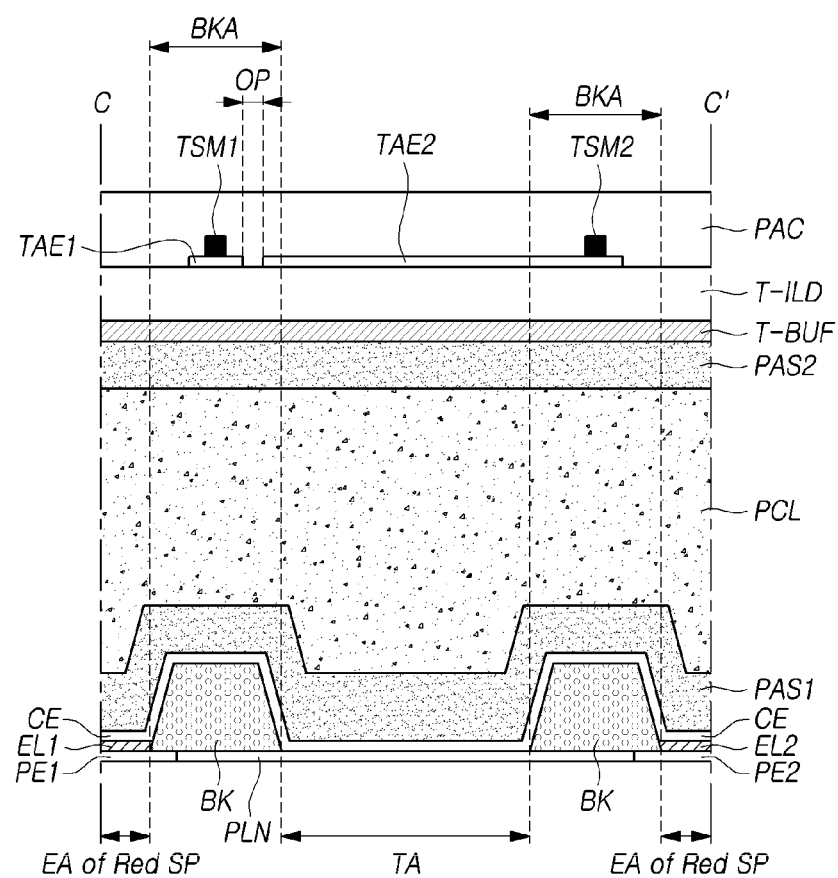
FIGS. 10A, 10B, 10C, 10D, 10E, and 10F are views illustrating examples of the cross-sectional structure taken along line C-C' of FIG. 7A.
Figure 10B:
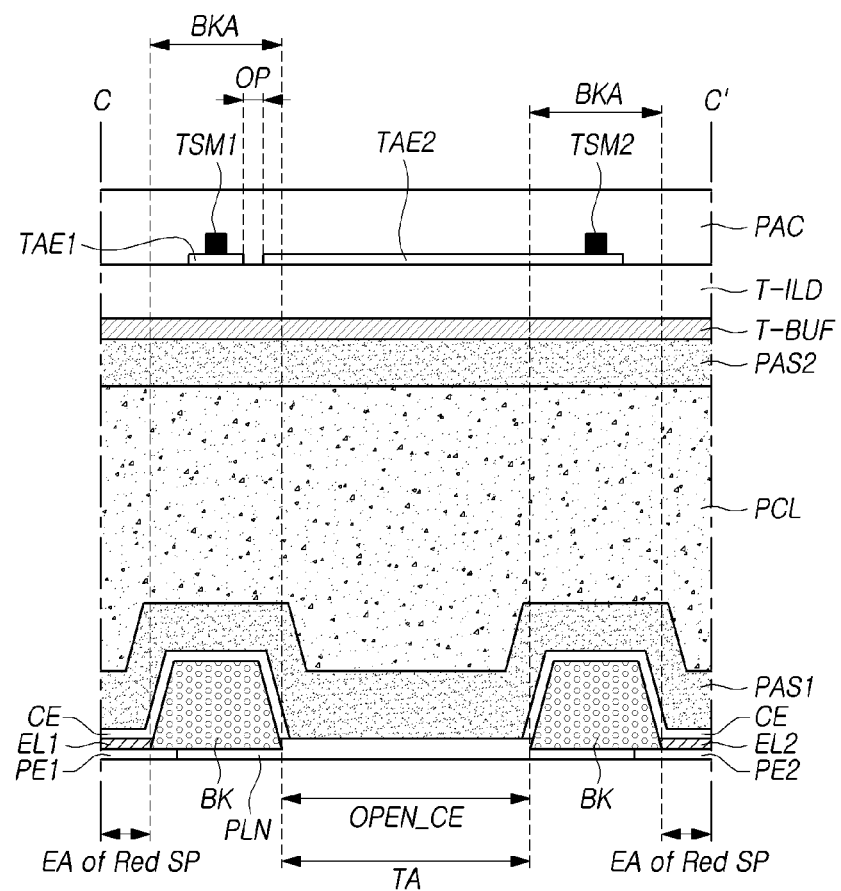
Figure 10C:
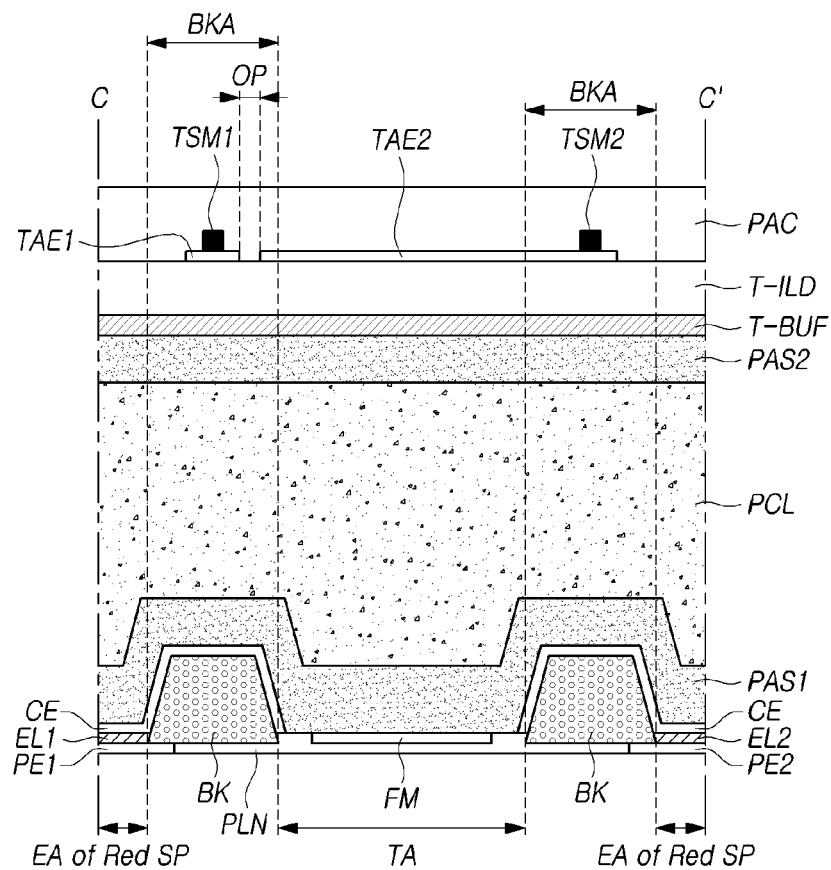
Figure 10D:
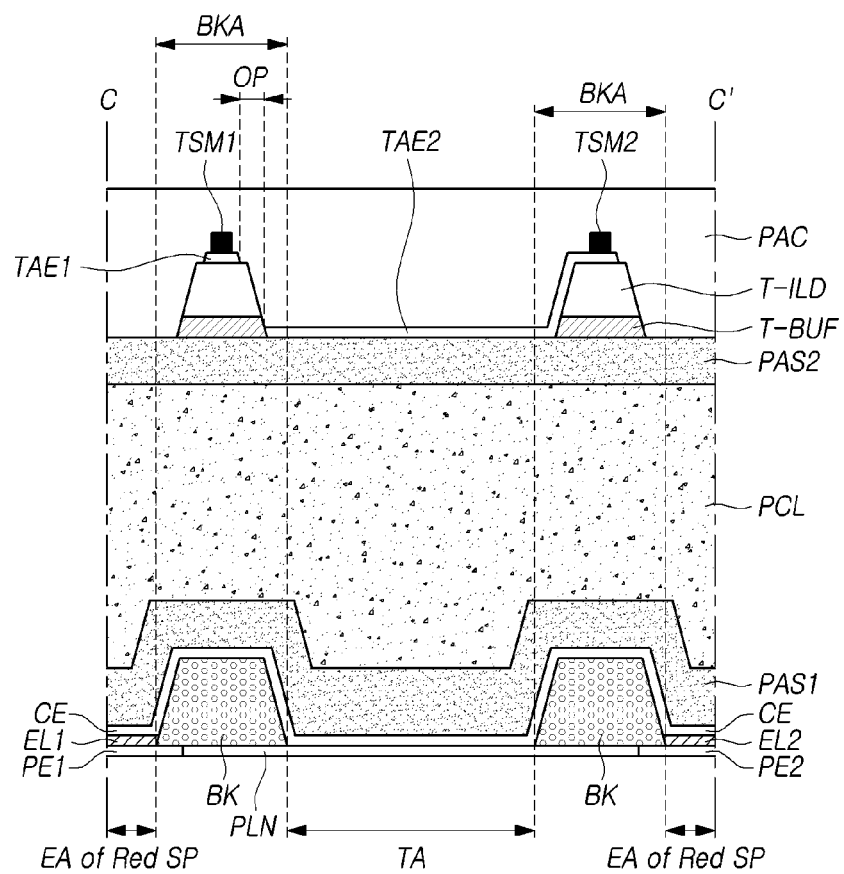
Figure 10E:
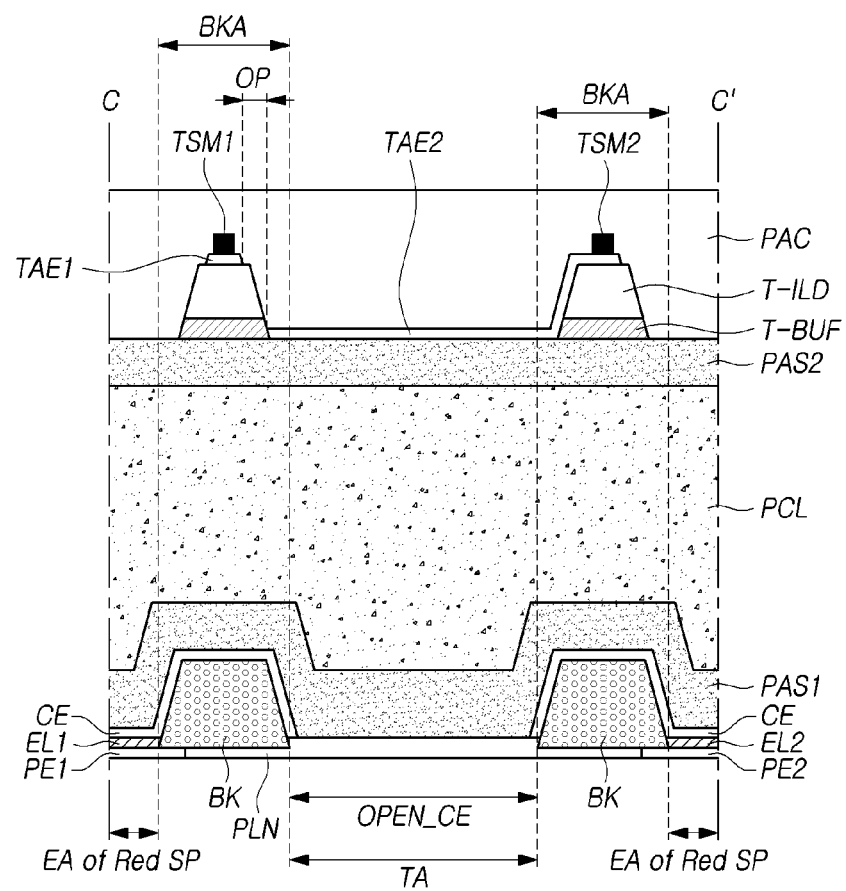
Figure 10F:
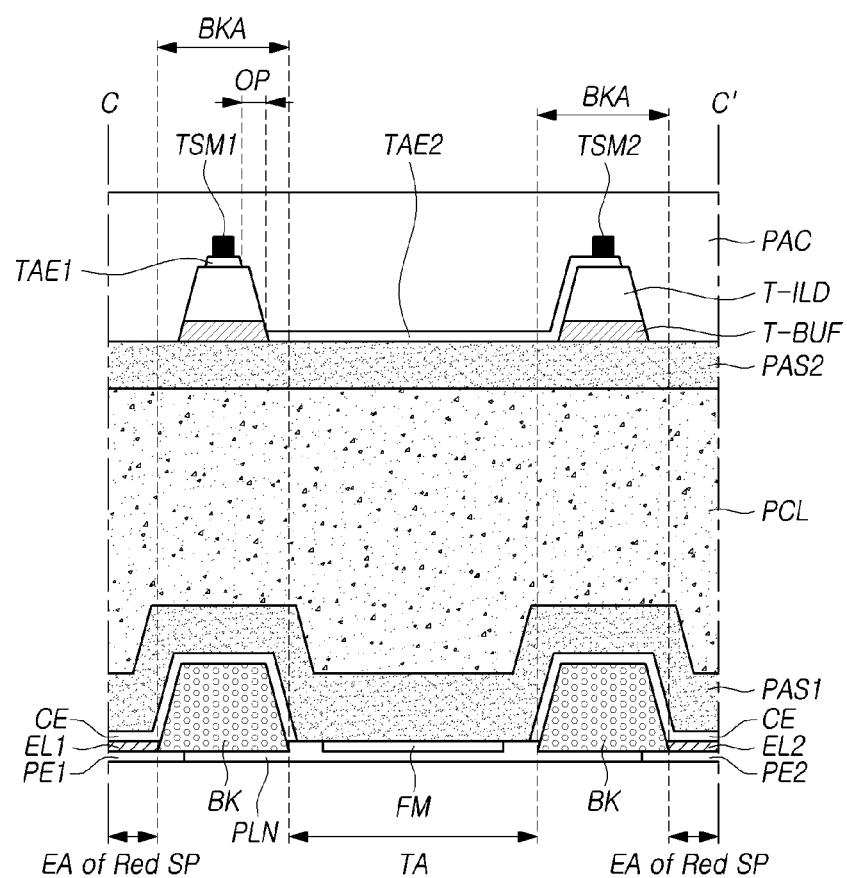

Referring to FIGS. 10D to 10F, in the first transmissive area TA1 positioned between the first light emitting area EA1 and the second light emitting area EA2, the touch buffer layer T-BUF and the touch inter-layer insulation film T-ILD may have an opening.

Referring to FIGS. 10A to 10F, the common electrode CE may be disposed between the first light emitting layer EL1 and the encapsulation layer ENCAP in the first light emitting area EA1 and between the second light emitting layer EL2 and the encapsulation layer ENCAP in the second light emitting area EA2.

Referring to FIGS. 10A and 10D, the common electrode CE may also extend to the first transmissive area TA1 positioned between the first light emitting area EA1 and the second light emitting area EA2. In other words, the common electrode CE may be disposed in all of the first light emitting area EA1, the first transmissive area TA1, and the second light emitting area EA2.

Referring to FIGS. 10B, 10C, 10E, and 10F, the common electrode CE may have an opening OPEN_CE in the first transmissive area TA1 positioned between the first light emitting area EA1 and the second light emitting area EA2.

Referring to FIGS. 10C and 10F, the floating metal FM may be disposed in the opening OPEN_CE of the common electrode CE. The floating metal FM may be electrically disconnected from the common electrode CE. The floating metal FM may include the same material as the common electrode CE. The common voltage EVSS applied to the common electrode CE may not be applied to the floating metal FM.

Referring to FIGS. 10A to 10F, a first space OP (or a first opening OP) between the first transparent electrode TAE1 and the second transparent electrode TAE2 is present. The first transparent electrode TAE1 and the second transparent electrode TAE2 are spaced apart from each other by a distance (e.g., distance OP). In some embodiments, the first space OP overlaps with a bank BK or bank layer BK. That is, the first space OP may overlap with a first bank layer BK that overlaps with the first touch sensor metal TSM1. Even though not shown in the drawings, in another embodiment, the first space OP may overlap with a second bank layer BK that overlaps with the second touch sensor metal TSM2.

FIGS. 11A to 11F show a cross-sectional structure from point D of the first light emitting area EA1 of the first subpixel SP1 in FIG. 7B to point D' of the second light emitting area EA2 of the second subpixel SP2.

The cross-sectional structure taken along D-D' of FIG. 7B, illustrated in FIGS. 11A to 11F, is substantially the same as the cross-sectional structure taken along C-C' of FIG. 7A, illustrated in FIGS. 10A to 10F.

Only a difference lies in the transparent electrode arrangement structure disposed in the first transmissive area TA1 positioned between the first light emitting area EA1 and the second light emitting area EA2.

Referring to FIGS. 11A to 11F and 7B, two transparent electrodes TAE1 and TAE2 may be disposed in the first transmissive area TA1 positioned between the first light emitting area EA1 and the second light emitting area EA2.

In the case of the touch sensor structure of FIGS. 7A and 7B, in the area where the first touch electrode TE #1 is formed, the first touch sensor metal TSM1 and the first touch bridge metal TBM1 may be electrically connected. However, in the area where the first touch electrode TE #1 is formed, the second touch sensor metal TSM2 and the second touch bridge metal TBM2 are not electrically connected.

In the case of the touch sensor structure of FIGS. 7A and 7B, in the area where the second touch electrode TE #2 is formed, the second touch sensor metal TSM2 and the second touch bridge metal TBM2 may be electrically connected. However, in the area where the second touch electrode TE #2 is formed, the first touch sensor metal TSM1 and the first touch bridge metal TBM1 are not electrically connected.

In the case of the touch sensor structure of FIGS. 7A and 7B, only the first touch sensor metal TSM1 may be disposed in the area where the first touch electrode TE #1 is formed, and only the second touch sensor metal TSM2 may be disposed in the area where the second touch electrode TE #2 is formed.

In contrast, in the case of the touch sensor structure of FIGS. 7C and 7D, the first touch sensor metal TSM1 may be disposed in the area where the first touch electrode TE #1 is formed, and so may a portion of the second touch sensor metal TSM2. The portion of the second touch sensor metal TSM2 may be a piece cut off from the first touch sensor metal TSM1 in the area of the first touch electrode TE #1.

In the case of the touch sensor structure of FIGS. 7C and 7D, the second touch sensor metal TSM2 may be disposed in the area where the second touch electrode TE #2 is formed, and so may a portion of the first touch sensor metal TSM1. The portion of the first touch sensor metal TSM1 may be a piece cut off from the second touch sensor metal TSM2 in the area of the second touch electrode TE #2.

In the case of the touch sensor structure of FIGS. 7C and 7D, in the area where the first touch electrode TE #1 is formed, the first touch sensor metal TSM1 and the first touch bridge metal TBM1 may be electrically connected. Further, in the area where the first touch electrode TE #1 is formed, the second touch sensor metal TSM2 and the second touch bridge metal TBM2 may also be connected.

In the case of the touch sensor structure of FIGS. 7C and 7D, in the area where the second touch electrode TE #2 is formed, the second touch sensor metal TSM2 and the second touch bridge metal TBM2 may be electrically connected. Further, in the area where the second touch electrode TE #2 is formed, the first touch sensor metal TSM1 and the first touch bridge metal TBM1 may also be connected.

Referring to FIGS. 12, 7C and 7E, in the PTS1 area in the area where the first touch electrode TE #1 is formed, the touch inter-layer insulation film T-ILD may be disposed between the first touch sensor metal TSM1 and the first touch bridge metal TBM1. The first touch bridge metal TBM1 may be electrically connected to the first touch sensor metal TSM1 through one or more first contact holes CNT1 of the touch inter-layer insulation film T-ILD.

Referring to FIGS. 13, 7C and 7E, in the PTS2 area in the area where the first touch electrode TE #1 is formed, the touch inter-layer insulation film T-ILD may be disposed between the first and second touch sensor metals TSM1 and TSM2 and the second touch bridge metal TBM2.

Referring to FIGS. 13, 7C, and 7E, in the PTS2 area in the area where the first touch electrode TE #1 is formed, the second touch bridge metal TBM2 may be electrically connected to the second touch sensor metal TSM2 through one or more second contact holes CNT2 of the touch inter-layer insulation film T-ILD. There may be at least one second contact hole CNT2 where the second touch sensor metal TSM2 and the second touch bridge metal TBM2 are electrically connected to each other in the area of the first touch electrode TE #1.

Referring to FIGS. 13, 7C, and 7E, in the area where the first touch electrode TE #1 is formed, as the portion of the second touch sensor metal TSM2, included in the second touch electrode TE #2, is electrically connected to the second touch bridge metal TBM2, the resistance of the second touch electrode TE #2 may be reduced. Accordingly, resistance capacitance (RC) delay in the second touch electrode TE #2 may be reduced, and thus touch sensitivity may be enhanced.

According to the example of FIGS. 7B and 7D, the two transparent electrodes TAE1 and TAE2 may include a first transparent electrode TAE1 electrically connected to the first touch sensor metal TSM1 and a second transparent electrode TAE2 electrically connected to the second touch sensor metal TSM2. The first transparent electrode TAE1 and the second transparent electrode TAE2 may be electrically separated from each other.

Referring to FIGS. 7A to 7D, the second light emitting area EA2 may emit light of the same first color as the light emitted from the first light emitting area EA1.

Referring to FIGS. 7A to 7D, the plurality of light emitting areas EA may further include a third light emitting area EA3 positioned in a second direction different from the first direction, with respect to the first light emitting area EA1 and emitting the first color of light and a fourth light emitting area EA4 positioned in the second direction with respect to the second light emitting area EA2 and emitting the first color of light. The fourth light emitting area EA4 may be positioned in the first direction with respect to the third light emitting area EA3.

Referring to FIGS. 7A and 7D, no transmissive area TA may be disposed between the first light emitting area EA1 and the third light emitting area EA3 and between the second light emitting area EA2 and the fourth light emitting area EA4.

Referring to FIGS. 7A to 7D, a second transmissive area TA2 may be disposed between the third light emitting area EA3 and the fourth light emitting area EA4.

Referring to FIGS. 7A to 7D, the plurality of light emitting areas EA may further include a fifth light emitting area EA5 positioned between the first light emitting area EA1 and the third light emitting area EA3 and a sixth light emitting area EA6 positioned between the second light emitting area EA2 and the fourth light emitting area EA4. The sixth light emitting area EA6 may be positioned in the first direction with respect to the fifth light emitting area EA5.

Referring to FIGS. 7A to 7D, the fifth light emitting area EA5 may emit a second color of light different from the first color, and the sixth light emitting area EA6 may emit the third color of light different from the first color and the second color.

Referring to FIGS. 7A to 7D, each of the fifth light emitting area EA5 and the sixth light emitting area EA6 may be larger in size than each of the first light emitting area EA1, the second light emitting area EA2, the third light emitting area EA3, and the fourth light emitting area EA4.

For example, the first light emitting area EA1, the second light emitting area EA2, the third light emitting area EA3, and the fourth light emitting area EA4 may emit the same first color of light. The first color may be a color (e.g., red) having the longest wavelength among the first to third colors.

The wavelength of the light emitted from the fifth light emitting area EA5 and the sixth light emitting area EA6 may be shorter than the wavelength of the light emitted from the first light emitting area EA1, the second light emitting area EA2, the third light emitting area EA3, and the fourth light emitting area EA4.

Referring to FIGS. 7A to 7D, the first touch sensor metal TSM1 may be disposed while avoiding the first light emitting area EA1, the fifth light emitting area EA5, and the third light emitting area EA3. The second touch sensor metal TSM2 may be disposed while avoiding the second light emitting area EA2, the sixth light emitting area EA6, and the fourth light emitting area EA4.

The first touch routing line TL #1 may be electrically connected to the first touch sensor metal TSM1, and the second touch routing line TL #2 may be electrically connected to the second touch sensor metal TSM2.

The first touch routing line TL #1 may electrically connect the first touch sensor metal TSM1 to the touch pad unit TP. The second touch routing line TL #2 may electrically connect the second touch sensor metal TSM2 to the touch pad unit TP.

The first touch routing line TL #1 may be disposed to extend along the inclined surface SLP of the encapsulation layer ENCAP and may be connected to the touch pad unit TP through an upper portion of the at least one dam DAM1 and DAM2.

The at least one dam DAM1 and DAM2 may be positioned near the outermost point of the inclined surface SLP of the encapsulation layer ENCAP. The touch driving circuit 160 may be electrically connected to the touch pad unit TP.

Figure 11A:
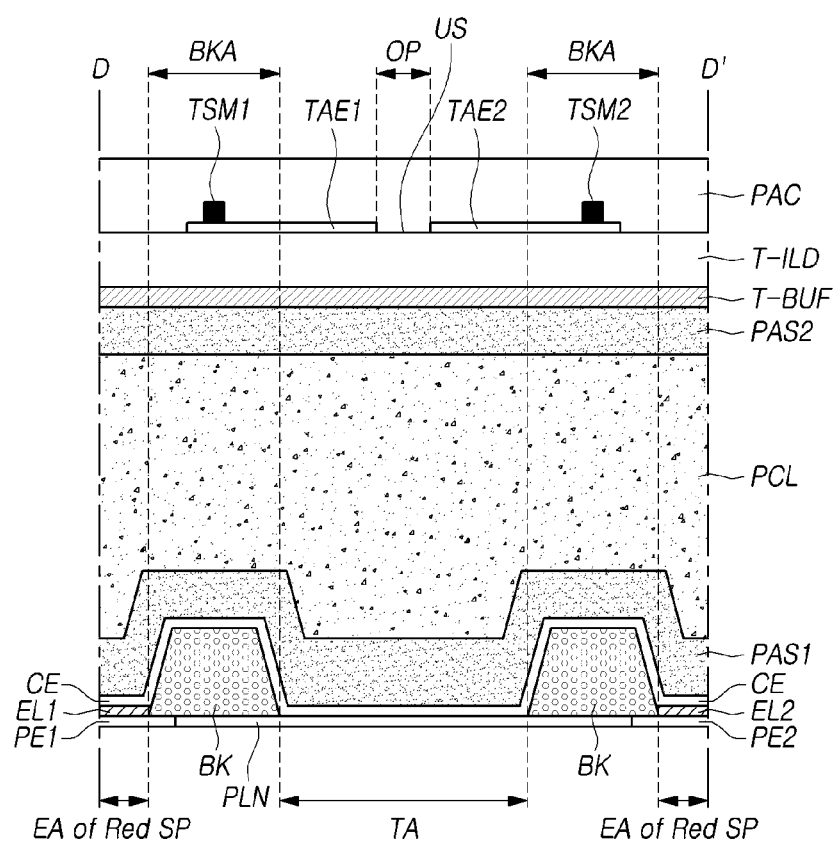
FIGS. 11A, 11B, 11C, 11D, 11E, and 11F are views illustrating examples of the cross-sectional structure taken along line D-D' of FIG. 7B.
Figure 11B:
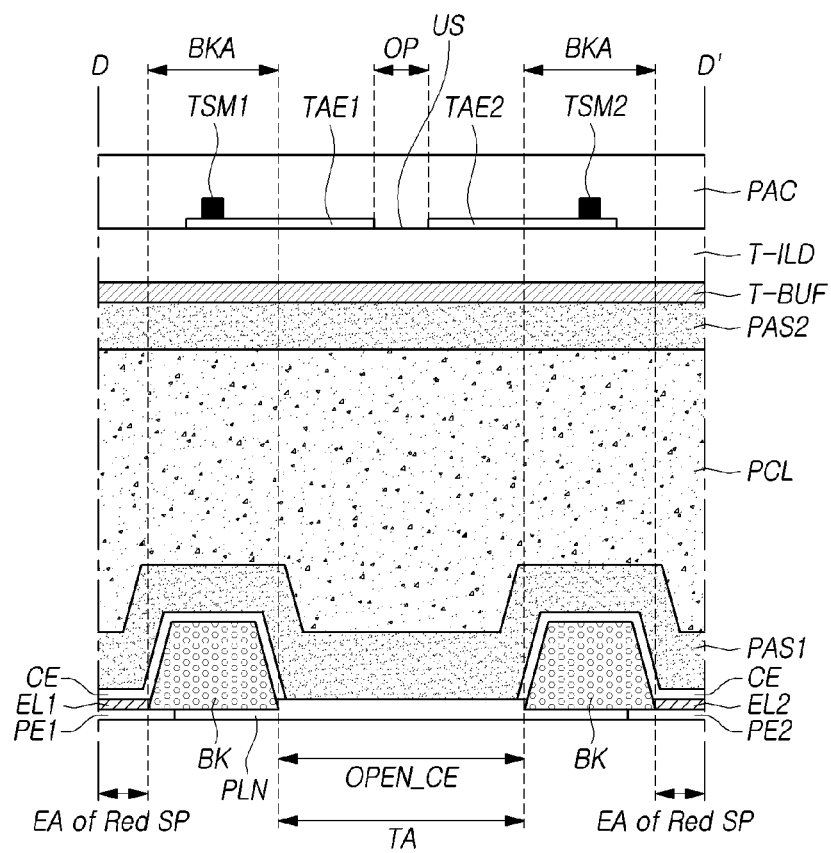
Figure 11C:
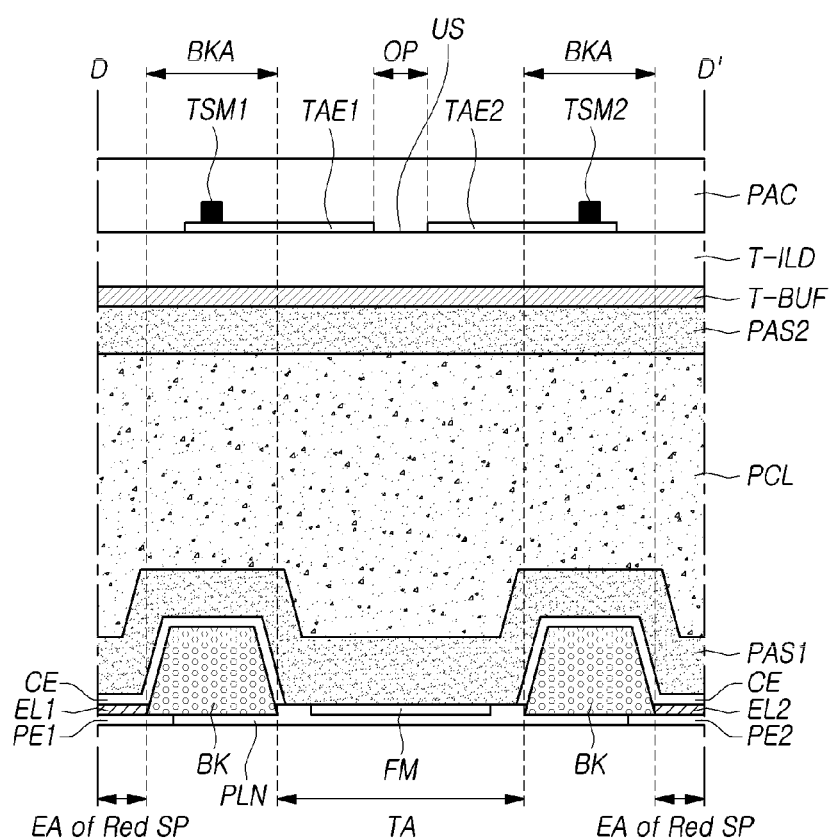

Referring to FIGS. 11A to 11C, a space OP (or an opening OP) between the first transparent electrode TAE1 and the second transparent electrode TAE2 is present. The first transparent electrode TAE1 and the second transparent electrode TAE2 are spaced apart from each other by a distance (e.g., distance OP). In some embodiments, the first space OP overlaps with the transmissive area TA. A top surface US of the touch inter-layer insulation film T-ILD is exposed by the space OP or the opening OP.

Figure 11D:
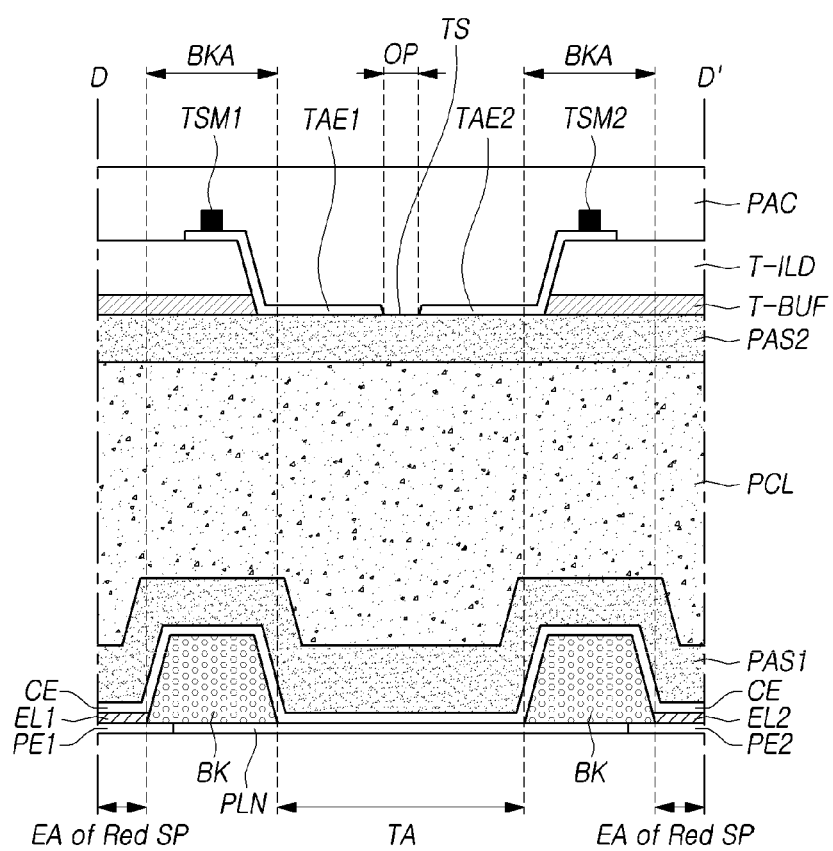
Figure 11E:
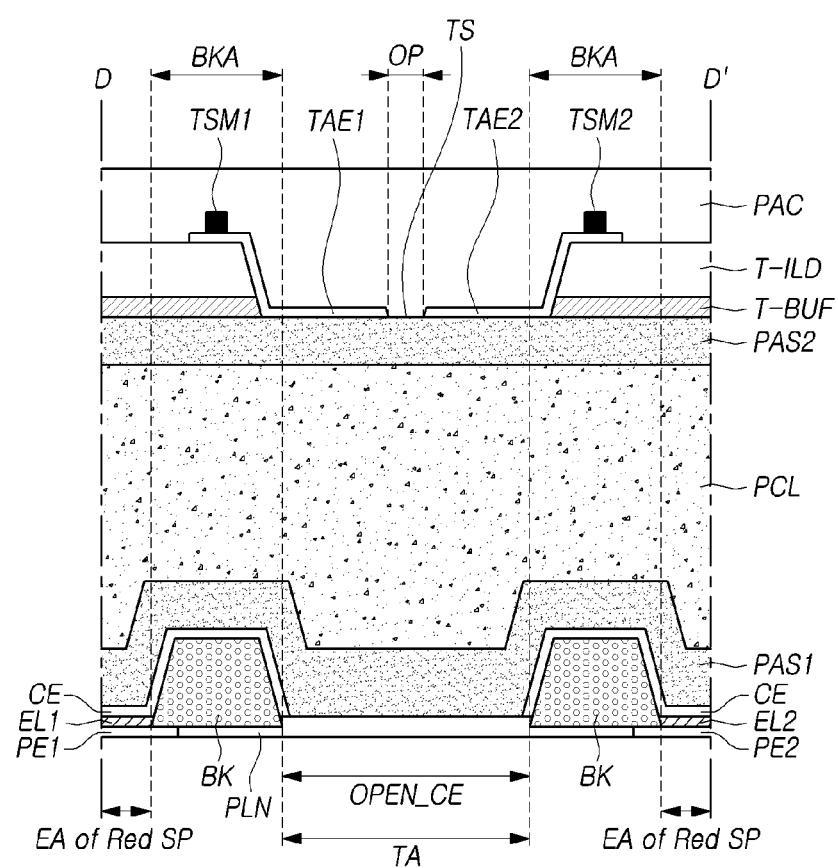
Figure 11F:
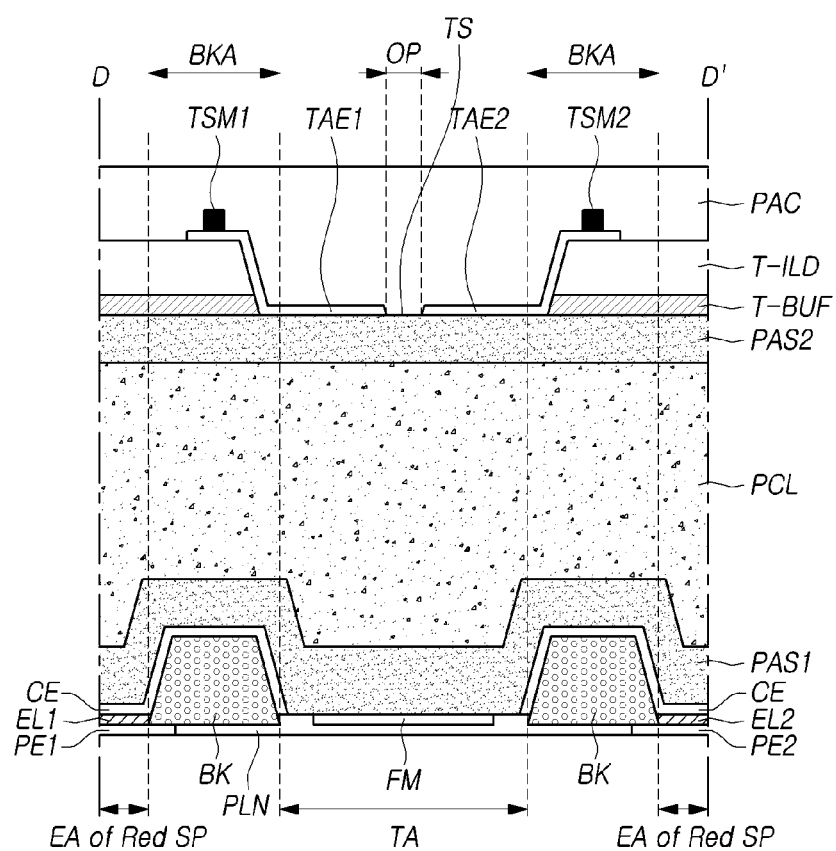

Referring to FIGS. 11D to 11F, a space OP (or an opening OP) between the first transparent electrode TAE1 and the second transparent electrode TAE2 is present. The first transparent electrode TAE1 and the second transparent electrode TAE2 are spaced apart from each other by a distance (e.g., distance OP). In some embodiments, the first space OP overlaps with the transmissive area TA. A top surface TS of the second inorganic encapsulation layer PAS2 is exposed by the space OP or the opening OP. As shown in FIG. 11F, the space OP overlaps with the floating metal FM.

Referring to FIGS. 14 and 15, transmissive areas TA may be positioned on two opposite sides of the first touch sensor metal TSM1. In this case, the first touch bridge metal TBM1 or the second touch bridge metal TBM2 may be disposed under the first touch sensor metal TSM1.

Referring to FIG. 14, when the transmissive areas TA positioned on two opposite sides of the first touch sensor metal TSM1 are included in the same area of the first touch electrode TE #1, the first transparent electrode TAE1 positioned under the first touch sensor metal TSM1 may be disposed in both the transmissive areas TA positioned on the two opposite sides of the first touch sensor metal TSM1.

Referring to FIG. 15, when the transmissive areas TA positioned on two opposite sides of the first touch sensor metal TSM1 are included in the areas of the different touch electrodes TE #1 and TE #2, respectively, the first transparent electrode TAE1 positioned under the first touch sensor metal TSM1 may be disposed in only one of the transmissive areas TA positioned on the two opposite sides of the first touch sensor metal TSM1.

Referring to FIG. 15, the first transparent electrode TAE1 and the second transparent electrode TAE2 respectively disposed in the transmissive areas TA positioned on two opposite sides of the first touch sensor metal TSM1 may be spaced apart from each other and thus be electrically separated from each other.

As shown in FIG. 15, a first opening OP1 and a second opening OP2 overlaps with a bank layer BK in the bank area BKA. The first opening OP1 and a second opening OP2 exposes a top surface US of the touch inter-layer insulation film T-ILD. Here, the first transparent electrode TAE1 and a third transparent electrode TAE3 are spaced apart from each other by the first opening OP1 having a first distance. Similarly, the second transparent electrode TAE2 and the third transparent electrode TAE3 are spaced apart from each other by the second opening OP2 having a second distance.

According to embodiments of the disclosure described above, it is possible to provide a transparent touch display device having high transmittance and high touch sensitivity.

According to embodiments of the disclosure, it is possible to provide a transparent touch display device having a structure capable of increasing the area of the touch sensor without reducing the area of the transmissive areas.

According to embodiments of the disclosure, it is possible to enhance touch sensitivity by placing the transparent electrode in the transmissive area to thereby increase the capacitance for touch sensing (e.g., finger capacitance or mutual-capacitance).

According to embodiments of the disclosure, it is possible to increase transmittance by removing the common electrode and insulation film (touch buffer film or touch inter-layer insulation film) from the transmissive area, e.g., by forming an opening in the common electrode and insulation film (touch buffer film or touch inter-layer insulation film) in the transmissive area.

According to embodiments of the disclosure, as the common electrode is removed from the transmissive area, an opening is formed in the common electrode positioned under the transparent electrode in the transmissive area, so that the overlap capacitance between the transparent electrode and the common electrode does not occur in the transmissive area, thereby rendering it possible to reduce parasitic capacitance. Therefore, touch sensitivity may be enhanced.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present invention should be construed based on the following claims, and all technical ideas within the scope of equivalents thereof should be construed as being included within the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent touch display device, comprising:
a display area displaying an image and a non-display area not displaying the image, the display area including a plurality of light emitting areas and a plurality of transmissive areas;
a first pixel electrode disposed in a first light emitting area of a first subpixel among the plurality of light emitting areas;
a first light emitting layer on the first pixel electrode;
a second pixel electrode disposed in a second light emitting area of a second subpixel positioned in a first direction with respect to the first light emitting area;
a second light emitting layer on the second pixel electrode;
a first touch sensor metal disposed to avoid overlap with the first light emitting area;
a second touch sensor metal disposed to avoid overlap with the second light emitting area;
a transparent electrode disposed in a first transmissive area positioned between the first light emitting area and the second light emitting area and electrically connected with at least one of the first touch sensor metal and the second touch sensor metal; and
a common electrode disposed on the first light emitting layer and the second light emitting layer,
wherein the common electrode extends to the first transmissive area positioned between the first light emitting area and the second light emitting area and has an opening in the first transmissive area.

2. The transparent touch display device of claim 1, further comprising:
a first bank positioned around the first light emitting layer;
a second bank positioned around the second light emitting layer; and
an encapsulation layer over the first light emitting layer, the first bank, the second light emitting layer, and the second bank,
wherein the first touch sensor metal, the second touch sensor metal, and the transparent electrode are positioned on or over the encapsulation layer,
wherein all or at least a part of the first touch sensor metal overlaps the first bank, and
wherein all or at least a part of the second touch sensor metal overlaps the second bank.

3. The transparent touch display device of claim 2, further comprising a touch buffer film on the encapsulation layer,
wherein the first touch sensor metal and the second touch sensor metal are positioned on or over the touch buffer film.

4. The transparent touch display device of claim 3, wherein in the first transmissive area, the touch buffer film has an opening.

5. The transparent touch display device of claim 3, further comprising:
a touch inter-layer insulation film on or over the touch buffer film; and
a touch bridge metal positioned between the touch buffer film and the touch inter-layer insulation film, and
wherein the first touch sensor metal and the second touch sensor metal are positioned on or over the touch inter-layer insulation film.

6. The transparent touch display device of claim 5, wherein the touch buffer film and the touch inter-layer insulation film have an opening in the first transmissive area.

7. The transparent touch display device of claim 2, wherein the common electrode is disposed between the first light emitting layer and the encapsulation layer in the first light emitting area and between the second light emitting layer and the encapsulation layer in the second light emitting area.

8. The transparent touch display device of claim 7, further comprising a floating metal disposed in the opening of the common electrode and electrically disconnected from the common electrode,
wherein the floating metal includes a same material as the common electrode, and wherein a common voltage applied to the common electrode is not applied to the floating metal.

9. The transparent touch display device of claim 1, wherein the second light emitting area emits a first color of light equal to light emitted from the first light emitting area, wherein the plurality of light emitting areas further include:

a third light emitting area positioned in a second direction different from the first direction with respect to the first light emitting area and emitting the first color of light; and a fourth light emitting area positioned in the second direction with respect to the second light emitting area and emitting the first color of light, wherein the fourth light emitting area is positioned in the first direction with respect to the third light emitting area, wherein no transmissive area is disposed between the first light emitting area and the third light emitting area and between the second light emitting area and the fourth light emitting area, and wherein the second transmissive area is disposed between the third light emitting area and the fourth light emitting area.

10. The transparent touch display device of claim 9, wherein the plurality of light emitting areas further include:

a fifth light emitting area positioned between the first light emitting area and the third light emitting area; and a sixth light emitting area positioned between the second light emitting area and the fourth light emitting area, wherein the sixth light emitting area is positioned in the first direction with respect to the fifth light emitting area, wherein the fifth light emitting area emits a second color of light different from the first color, and wherein the sixth light emitting area emits a third color of light different from the first color and the second color.

11. The transparent touch display device of claim 10, wherein each of the fifth light emitting area and the sixth light emitting area is larger in size than each of the first light emitting area, the second light emitting area, the third light emitting area, and the fourth light emitting area.

12. The transparent touch display device of claim 10, wherein the first touch sensor metal is disposed to not overlap with the first light emitting area, the fifth light emitting area, and the third light emitting area, wherein the second touch sensor metal is disposed to not overlap with the second light emitting area, the sixth light emitting area, and the fourth light emitting area, and wherein the transparent touch display device further comprises:

a first touch routing line electrically connected with the first touch sensor metal; and a second touch routing line electrically connected with the second touch sensor metal.

13. The transparent touch display device of claim 1, further comprising:

a first touch bridge metal electrically connected with the first touch sensor metal; and a second touch bridge metal electrically connected with the second touch sensor metal, wherein the first touch sensor metal and the first touch bridge metal are electrically connected with each other to constitute a first touch electrode, and the second touch sensor metal and the second touch bridge metal are electrically connected with each other to constitute a second touch electrode, and wherein the first touch bridge metal and the second touch bridge metal are disposed to not overlap with the first light emitting area, the first transmissive area, and the second light emitting area.

14. The transparent touch display device of claim 13, wherein in an area of the first touch electrode, the first touch sensor metal and the first touch bridge metal are electrically connected with each other, and wherein a contact hole where the second touch sensor metal and the second touch bridge metal are electrically connected with each other is present in an area of the first touch electrode.

15. The transparent touch display device of claim 1, wherein the transparent electrode directly contacts at least one of the first touch sensor metal and the second touch sensor metal.

16. The transparent touch display device of claim 1, wherein a transparent electrode is disposed in the first transmissive area, and wherein the transparent electrode is electrically connected with one of the first touch sensor metal and the second touch sensor metal.

17. The transparent touch display device of claim 1, wherein two transparent electrodes are disposed in the first transmissive area, wherein the two transparent electrodes include a first transparent electrode electrically connected with the first touch sensor metal and a second transparent electrode electrically connected with the second touch sensor metal, and wherein the first transparent electrode and the second transparent electrode are electrically separated from each other.

18. A transparent touch display device, comprising:

a substrate including a display area displaying an image and a non-display area not displaying the image, the display area including a plurality of light emitting areas and a plurality of transmissive areas;

a touch sensor including a touch sensor metal disposed on while avoiding overlap with the plurality of light emitting areas and the plurality of transmissive areas and a transparent electrode disposed in the transmissive areas and electrically connected with the touch sensor metal;

first and second light emitting layers disposed in respective first and second light emitting areas of first and second subpixels among the plurality of light emitting areas; and a common electrode disposed on the first and second light emitting layers, wherein the common electrode extends to a transmissive area positioned between the first light emitting area and the second light emitting area among the plurality of transmissive areas and has an opening in the transmissive area.

19. The transparent touch display device of claim 18, further comprising:

a plurality of light emitting elements disposed over the substrate; and an encapsulation layer disposed over the plurality of light emitting elements, wherein the touch sensor is disposed on or over the encapsulation layer.

20. A display device, comprising:

a display area including a first light emitting area, a second light emitting area, and a first transmissive area between the first light emitting area and the second light emitting area;

a first bank area including a first bank layer, the first bank layer between the first transmissive area and the first light emitting area;

a first pixel electrode layer disposed in the first light emitting area of a first subpixel;

a first light emitting layer on the first pixel electrode layer;

a first touch sensor metal on the first bank layer, the first touch sensor metal not overlapping with the first light emitting area and the first transmissive area;

a second pixel electrode layer disposed in the second light emitting area of a second subpixel;

a second light emitting layer on the second pixel electrode layer;

a second bank area including a second bank layer, the second bank layer between the first transmissive area and the second light emitting area; and a common electrode layer disposed on the first light emitting layer, the second light emitting layer, the first bank layer, and the second bank layer, wherein the common electrode layer includes an opening between the first bank layer and the second bank layer.

21. The display device of claim 20, further comprising:

a second touch sensor metal on the second bank layer, the second touch sensor metal not overlapping with the second light emitting area and the first transmissive area; and a transparent electrode layer between the first light emitting area and the second light emitting area, the transparent electrode layer electrically connected with at least one of the first touch sensor metal and the second touch sensor metal, the transparent electrode layer overlapping the first bank layer and the second bank layer.

22. The display device of claim 20, wherein the common electrode layer extends continuously from the first bank layer to the second bank layer and over the first transmissive area.

23. The display device of claim 20, further comprising a floating metal, wherein the floating metal is disposed in the opening of the common electrode layer and is electrically disconnected from the common electrode layer.

24. The display device of claim 21, further comprising:

an encapsulation layer between the common electrode layer and the transparent electrode layer;

a first buffer film on the encapsulation layer and below the first touch sensor metal; and a second buffer film on the encapsulation layer and below the second touch sensor metal.

25. The display device of claim 24, wherein a top surface of the encapsulation layer is exposed in an area between the first buffer film and the second buffer film, and wherein the transparent electrode layer contacts the top surface of the encapsulation layer.

26. The display device of claim 21, comprising:

a first touch bridge metal electrically connected with the first touch sensor metal, the first touch bridge metal disposed in a different layer from the first touch sensor metal, wherein the first touch bridge metal overlaps the first touch sensor metal, and wherein the transparent electrode layer is between the first touch bridge metal and the first touch sensor metal.

27. The display device of claim 26, wherein the first touch bridge metal does not overlap with the first transmissive area, the first light emitting area, and the second light emitting area.

28. The display device of claim 27, comprising:

a second touch bridge metal electrically connected with the second touch sensor metal, the second touch bridge metal disposed in a different layer from the second touch sensor metal, wherein the second touch bridge metal overlaps the second touch sensor metal, and wherein the transparent electrode layer is between the second touch bridge metal and the second touch sensor metal.

29. The display device of claim 27, wherein the transparent electrode layer includes:

a first transparent electrode electrically connected to the first touch sensor metal; and a second transparent electrode electrically connected to the second touch sensor metal, wherein the first transparent electrode is spaced apart from the second transparent electrode.

30. The display device of claim 29, comprising a first opening between the first transparent electrode and the second transparent electrode, wherein the first opening overlaps with the first transmissive area.

31. The display device of claim 29, comprising a first opening between the first transparent electrode and the second transparent electrode, wherein the first opening overlaps with at least one of the first bank layer or the second bank layer.

\* \* \* \* \*